US011614594B2

(12) United States Patent
Geens et al.

(10) Patent No.: US 11,614,594 B2
(45) Date of Patent: *Mar. 28, 2023

(54) OPTICAL FIBER DISTRIBUTION SYSTEM

(71) Applicant: CommScope Connectivity Belgium BVBA, Kessel-Lo (BE)

(72) Inventors: Johan Geens, Bunsbeek (BE); Kristof Vastmans, Boutersen (BE); Eric Marcel M. Keustermans, Houwaart (BE); Pieter Vermeulen, Westerlo (BE); Bart Vos, Geel (BE); Dirk Jozef G. Van De Weyer, Beringen (BE); Lukas Desmond Elias Van Campenhout, Kessel-Lo (BE); Yves Peeters, Langdorp (BE); Matthias Cyriel George Corneel Alderweireldt, Kortssem (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,698

(22) Filed: Mar. 31, 2022

(65) Prior Publication Data

US 2022/0221675 A1    Jul. 14, 2022

Related U.S. Application Data

(63) Continuation of application No. 16/942,085, filed on Jul. 29, 2020, now Pat. No. 11,320,618, which is a
(Continued)

(51) Int. Cl.
*G02B 6/44* (2006.01)
*H04Q 1/02* (2006.01)
(Continued)

(52) U.S. Cl.
CPC ......... *G02B 6/4455* (2013.01); *G02B 6/3897* (2013.01); *G02B 6/4452* (2013.01);
(Continued)

(58) Field of Classification Search
CPC .................................................. G02B 6/4465
See application file for complete search history.

(56) References Cited

U.S. PATENT DOCUMENTS 2,805,106 A    9/1957  Penkala
2,864,656 A    12/1958 Yorinks
(Continued)

FOREIGN PATENT DOCUMENTS

AU    40995/85    4/1985
AU    55314/86    3/1986
(Continued)

OTHER PUBLICATIONS

International Search Report and Written Opinion for International Application No. PCT/EP2014/058136 dated Jul. 11, 2014 (9 pages).
(Continued)

*Primary Examiner* — Eric Wong
(74) *Attorney, Agent, or Firm* — Merchant & Gould P.C.

(57) ABSTRACT

An optical fiber distribution system including a rack and elements which populate the rack including fiber terminations. Each element includes a chassis and a movable tray. The movable tray includes a synchronized movement device for moving a cable radius limiter. The tray includes cable terminations which extend in a line generally parallel to a direction of movement of the movable tray. Each of the cable terminations are mounted on hinged frame members positioned on each tray. The cables entering and exiting the movable tray follow a generally S-shaped pathway.

23 Claims, 51 Drawing Sheets

Related U.S. Application Data continuation of application No. 16/178,322, filed on Nov. 1, 2018, now Pat. No. 10,732,373, which is a continuation of application No. 15/428,607, filed on Feb. 9, 2017, now Pat. No. 10,126,515, which is a continuation of application No. 14/764,486, filed as application No. PCT/EP2014/051714 on Jan. 29, 2014, now Pat. No. 9,568,699.

(60) Provisional application No. 61/892,558, filed on Oct. 18, 2013, provisional application No. 61/815,500, filed on Apr. 24, 2013, provisional application No. 61/798,256, filed on Mar. 15, 2013, provisional application No. 61/758,266, filed on Jan. 29, 2013.

(51) Int. Cl.
  H04Q 1/06      (2006.01)
  G02B 6/38      (2006.01)

(52) U.S. Cl.
  CPC ........... *G02B 6/4478* (2013.01); *H04Q 1/023* (2013.01); *H04Q 1/06* (2013.01)

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,359,262 A | 1/1982 | Dolan |
| 4,320,934 A | 3/1982 | Röck et al. |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,991,928 A | 2/1991 | Zimmer |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,715,348 A | 2/1998 | Falkenberg et al. |
| 5,717,810 A | 2/1998 | Wheeler |
| 5,717,811 A | 2/1998 | Macken |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,099,224 A | 8/2000 | Uchida et al. |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,256,444 B1 | 7/2001 | Bechamps et al. |
| 6,263,141 B1 | 7/2001 | Smith |
| 6,269,214 B1 | 7/2001 | Naudin et al. |
| 6,301,424 B1 | 10/2001 | Hwang |
| 6,360,050 B1 | 3/2002 | Moua et al. |
| 6,381,393 B1 | 4/2002 | Matthews et al. |
| 6,438,310 B1 | 8/2002 | Lance et al. |
| 6,439,523 B1 | 8/2002 | Chandler et al. |
| 6,480,660 B1 | 11/2002 | Reitmeier et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| 6,612,515 B1 | 9/2003 | Tinucci et al. |
| 6,625,374 B2 | 9/2003 | Holman et al. |
| RE38,311 E | 11/2003 | Burmeister et al. |
| 6,677,520 B1 | 1/2004 | Kim et al. |
| 6,695,491 B1 | 2/2004 | Leeman et al. |
| 6,711,339 B2 | 3/2004 | Puetz et al. |
| 6,715,619 B2 | 4/2004 | Kim et al. |
| 6,748,155 B2 | 6/2004 | Kim et al. |
| 6,768,860 B2 | 7/2004 | Liberty |
| 6,796,437 B2 | 9/2004 | Krampotich et al. |
| 6,804,447 B2 | 10/2004 | Smith et al. |
| 6,809,258 B1 | 10/2004 | Dang et al. |
| 6,810,193 B1 | 10/2004 | Müller |
| 6,819,857 B2 | 11/2004 | Douglas et al. |
| 6,845,208 B2 | 1/2005 | Thibault et al. |
| 6,850,685 B2 | 2/2005 | Tinucci et al. |
| 6,865,331 B2 | 3/2005 | Mertesdorf |
| 6,870,734 B2 | 3/2005 | Mertesdorf et al. |
| 6,915,057 B2 | 7/2005 | Vincent et al. |
| 6,925,241 B2 | 8/2005 | Bohle et al. |
| 6,934,457 B2 | 8/2005 | Vincent et al. |
| 6,937,807 B2 | 8/2005 | Franklin et al. |
| 6,944,383 B1 | 9/2005 | Herzog et al. |
| 6,945,620 B2 | 9/2005 | Lam et al. |
| 6,968,111 B2 | 11/2005 | Trebesch et al. |
| 6,981,750 B2 | 1/2006 | Krampotich |

(56) References Cited

U.S. PATENT DOCUMENTS

| | | |
|---|---|---|
| 7,006,748 B2 | 2/2006 | Dagley et al. |
| 7,068,907 B2 | 6/2006 | Schray |
| 7,079,744 B2 | 7/2006 | Douglas et al. |
| 7,086,539 B2 | 8/2006 | Knudsen et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,231,125 B2 | 6/2007 | Douglas et al. |
| 7,274,852 B1 | 9/2007 | Smrha et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,362,942 B2 | 4/2008 | Beck |
| 7,367,823 B2 | 5/2008 | Rapp et al. |
| 7,373,071 B2 | 5/2008 | Douglas et al. |
| 7,397,996 B2 | 7/2008 | Herzog et al. |
| 7,406,240 B2 | 7/2008 | Murano |
| 7,409,137 B1 | 8/2008 | Barnes |
| 7,418,182 B2 | 8/2008 | Krampotich |
| 7,437,049 B2 | 10/2008 | Krampotich |
| 7,454,113 B2 | 11/2008 | Barnes |
| 7,457,504 B2 | 11/2008 | Smrha et al. |
| 7,460,757 B2 | 12/2008 | Hoehne et al. |
| 7,463,811 B2 | 12/2008 | Trebesch et al. |
| 7,480,438 B2 | 1/2009 | Douglas et al. |
| 7,496,268 B2 | 2/2009 | Escoto et al. |
| 7,499,623 B2 | 3/2009 | Barnes et al. |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,599,599 B2 | 10/2009 | Herzog et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,978,957 B2 | 7/2011 | Sano et al. |
| 8,027,558 B2 | 9/2011 | Barnes et al. |
| 8,041,175 B2 | 10/2011 | Krampotich et al. |
| 8,059,932 B2 | 11/2011 | Hill et al. |
| 8,078,030 B2 | 12/2011 | Trebesch et al. |
| 8,179,684 B2 | 5/2012 | Smrha et al. |
| 8,195,022 B2 | 6/2012 | Coburn et al. |
| 8,285,104 B2 | 10/2012 | Davis et al. |
| 8,315,498 B2 | 11/2012 | Redmann et al. |
| 8,452,149 B2 | 5/2013 | Krampotich et al. |
| 8,526,774 B2 | 9/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 8,731,361 B2 | 5/2014 | Anderson et al. |
| 8,801,299 B2 | 8/2014 | Shimotsu et al. |
| 8,816,222 B2 | 8/2014 | Pimentel |
| 8,864,085 B2 | 10/2014 | He et al. |
| 8,885,998 B2 | 11/2014 | Marcouiller et al. |
| 8,903,216 B2 | 12/2014 | Thompson et al. |
| 9,081,164 B2 | 7/2015 | Badar et al. |
| 9,128,262 B2 | 9/2015 | Campbell et al. |
| 9,435,975 B2 | 9/2016 | Ott |
| 9,541,726 B2 | 1/2017 | Geens et al. |
| 9,568,699 B2 | 2/2017 | Geens et al. |
| 9,958,631 B2 | 5/2018 | Geens et al. |
| 10,107,984 B2 | 10/2018 | Geens et al. |
| 10,126,515 B2 | 11/2018 | Geens et al. |
| 10,345,546 B2 | 7/2019 | Geens et al. |
| 10,732,373 B2 | 8/2020 | Geens et al. |
| 10,746,950 B2 | 8/2020 | Geens et al. |
| 11,002,936 B2 | 5/2021 | Geens et al. |
| 11,320,618 B2 | 5/2022 | Geens et al. |
| 2001/0001270 A1 | 5/2001 | Williams Vigliaturo |
| 2002/0131750 A1 | 9/2002 | Holman et al. |
| 2002/0159746 A1 | 10/2002 | Howell et al. |
| 2002/0181922 A1 | 12/2002 | Xin et al. |
| 2003/0007767 A1 | 1/2003 | Douglas et al. |
| 2003/0020379 A1 | 1/2003 | Larsen et al. |
| 2003/0119385 A1 | 6/2003 | Elliot et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0136676 A1 | 7/2004 | Mertesdorf |
| 2004/0175090 A1 | 9/2004 | Vastmans et al. |
| 2004/0227443 A1 | 11/2004 | Sandoval |
| 2004/0228582 A1 | 11/2004 | Yamada et al. |
| 2004/0258384 A1 | 12/2004 | Trebesch et al. |
| 2005/0025444 A1 | 2/2005 | Barnes et al. |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2006/0093302 A1 | 5/2006 | Solheid et al. |
| 2006/0116084 A1 | 6/2006 | Miki et al. |
| 2006/0193586 A1 | 8/2006 | Hoehne et al. |
| 2006/0275008 A1 | 12/2006 | Xin |
| 2007/0003204 A1 | 1/2007 | Saravanos et al. |
| 2007/0031099 A1 | 2/2007 | Herzog et al. |
| 2007/0058918 A1 | 3/2007 | Trebesch et al. |
| 2007/0201806 A1 | 8/2007 | Douglas et al. |
| 2007/0280618 A1 | 12/2007 | Xin et al. |
| 2008/0048935 A1 | 2/2008 | Yoshioka et al. |
| 2008/0063350 A1 | 3/2008 | Trebesch et al. |
| 2008/0124038 A1 | 5/2008 | Kowalczyk et al. |
| 2008/0169116 A1 | 7/2008 | Mullaney et al. |
| 2008/0175550 A1 | 7/2008 | Coburn et al. |
| 2008/0205843 A1 | 8/2008 | Castonguay et al. |
| 2008/0292260 A1 | 11/2008 | Weinegger et al. |
| 2008/0298026 A1 | 12/2008 | Wang et al. |
| 2009/0060439 A1 | 3/2009 | Cox et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0129033 A1 | 5/2009 | Smrha et al. |
| 2009/0136196 A1 | 5/2009 | Trebesch et al. |
| 2009/0245746 A1 | 10/2009 | Krampotich et al. |
| 2009/0274430 A1 | 11/2009 | Krampotich et al. |
| 2009/0274431 A1 | 11/2009 | Krampotich et al. |
| 2010/0061693 A1 | 3/2010 | Bran de Leon et al. |
| 2010/0142910 A1 | 6/2010 | Hill et al. |
| 2010/0158465 A1 | 6/2010 | Smrha |
| 2010/0150518 A1 | 7/2010 | Leon et al. |
| 2010/0195968 A1 | 8/2010 | Trebesch et al. |
| 2010/0266253 A1 | 10/2010 | Krampotich et al. |
| 2010/0310225 A1 | 12/2010 | Anderson et al. |
| 2010/0316346 A1 | 12/2010 | Krampotich et al. |
| 2010/0322578 A1 | 12/2010 | Cooke et al. |
| 2011/0123165 A1 | 5/2011 | Barth et al. |
| 2011/0188809 A1 | 8/2011 | LeBlanc et al. |
| 2011/0206336 A1 | 8/2011 | Krampotich et al. |
| 2011/0211329 A1 | 9/2011 | Dean, Jr. et al. |
| 2011/0211799 A1 | 9/2011 | Conner et al. |
| 2011/0211801 A1 | 9/2011 | McGranahan et al. |
| 2011/0217016 A1 | 9/2011 | Mullsteff |
| 2011/0228473 A1 | 9/2011 | Anderson et al. |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0057838 A1 | 3/2012 | Hill et al. |
| 2012/0093475 A1 | 4/2012 | Trebesch et al. |
| 2012/0230646 A1 | 9/2012 | Thompson et al. |
| 2013/0028567 A1 | 1/2013 | Parikh et al. |

(56) References Cited

U.S. PATENT DOCUMENTS

| | | |
|---|---|---|
| 2013/0034334 A1 | 2/2013 | Fariello et al. |
| 2013/0084050 A1 | 4/2013 | Vastmans et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2013/0287356 A1 | 10/2013 | Solheid et al. |
| 2013/0287357 A1 | 10/2013 | Solheid et al. |
| 2014/0086545 A1 | 3/2014 | Solheid et al. |
| 2014/0133819 A1 | 5/2014 | Trebesch et al. |
| 2014/0241691 A1 | 8/2014 | Solheid et al. |
| 2015/0378106 A1 | 12/2015 | Allen et al. |
| 2015/0380918 A1 | 12/2015 | Kellerman |
| 2017/0293099 A1 | 10/2017 | Alexi et al. |
| 2018/0123273 A1 | 5/2018 | Ishii et al. |
| 2021/0011243 A1 | 1/2021 | Geens et al. |
| 2021/0181430 A1 | 6/2021 | Van Baelen et al. |
| 2021/0181446 A1 | 6/2021 | Van Baelen et al. |
| 2021/0181447 A1 | 6/2021 | Van Baelen et al. |
| 2021/0181448 A1 | 6/2021 | Van Baelen et al. |
| 2021/0181449 A1 | 6/2021 | Van Baelen et al. |
| 2021/0271045 A1 | 9/2021 | Geens et al. |

FOREIGN PATENT DOCUMENTS

| | | |
|---|---|---|
| AU | 2010246577 A1 | 12/2010 |
| CN | 1133640 A | 10/1996 |
| CN | 1319194 A | 10/2001 |
| CN | 1448746 A | 10/2003 |
| CN | 201335897 | 10/2009 |
| CN | 102483500 A | 5/2012 |
| DE | 2735106 | 2/1979 |
| DE | 2918309 | 11/1980 |
| DE | 3308682 | 9/1984 |
| DE | 3836273 | 4/1990 |
| DE | 4413136 | 5/1995 |
| DE | 29504191 | 3/1996 |
| EP | 0146478 | 6/1985 |
| EP | 0149250 | 7/1985 |
| EP | 0356942 | 3/1990 |
| EP | 0406151 | 1/1991 |
| EP | 0464570 | 1/1992 |
| EP | 0479226 | 4/1992 |
| EP | 0196102 | 3/1993 |
| EP | 0538164 | 4/1993 |
| EP | 0563995 | 10/1999 |
| EP | 1 228 389 B1 | 5/2003 |
| EP | 2 093 596 A2 | 8/2009 |
| EP | 2 450 729 A2 | 5/2012 |
| FR | 2531576 | 2/1984 |
| FR | 2587127 | 3/1987 |
| FR | 2678076 | 12/1992 |
| JP | 59-74523 | 4/1984 |
| JP | 60-169811 | 9/1985 |
| JP | 61-55607 | 3/1986 |
| JP | 61-90104 | 5/1986 |
| JP | 2000-286574 A | 10/2000 |
| KR | 200337929 | 1/2004 |
| KR | 20080033420 | 4/2008 |
| RU | 45207 U1 | 4/2005 |
| WO | WO 91/10927 | 7/1991 |
| WO | WO 95/07480 | 3/1995 |
| WO | WO 96/10203 | 4/1996 |
| WO | WO 99/00619 | 1/1999 |
| WO | 99/38042 A1 | 7/1999 |
| WO | WO 03/005095 | 1/2003 |
| WO | 2008048935 | 4/2008 |
| WO | 2009/032330 A1 | 3/2009 |
| WO | 2011/100616 A2 | 8/2011 |
| WO | 2012/068013 A2 | 5/2012 |
| WO | 2014/090843 A1 | 6/2014 |
| WO | 2014118227 | 8/2014 |
| WO | 2014/173896 A1 | 10/2014 |
| WO | 2014/173930 A1 | 10/2014 |
| WO | 2014/207210 A1 | 12/2014 |
| WO | 2015/055586 A1 | 4/2015 |
| WO | 2016/012550 A2 | 1/2016 |
| WO | 2016/156611 A1 | 10/2016 |

OTHER PUBLICATIONS

International Search Report and Written Opinion for International Application No. PCT/EP2014/058196 dated Jul. 31, 2014 (10 pages).

International Search Report for International Application No. PCT/EP2014/051714 dated Apr. 29, 2014 (2 pages).

"ITU Fiber Handbook" with English translation, 14 pages, Mar. 1992.

"Precision Mechanical" with English translation, 5 pages.

Northern Telecom Bulletin #91-004, Issue #2, May 1991.

AT&T Product Bulletin 2987D-DLH-7/89, "High Density Interconnect System (HDIC)," Issue 2 (Copyright 1989).

Preface to the book "Structure, Installation, Connection and Protection of Communication Optical Fiber Cable," in Chinese with English Translation, 14 pages (Mar. 1992).

Complaint relating to Civil Action No. 5:11-cv-02509-JS, *ADC Telecommunications, Inc v. Opterna Am, Inc.* filed Apr. 11, 2011 (14 pages).

Complaint relating to Civil Action No. 1:11cv-735 (GBL-IDD), *ADC Telecommunications, Inc v. Opterna Am, Inc.* filed Jul. 12, 2011 (5 pages).

Plaintiff's Notice of Dismissal relating to Civil Action No. 5:11-cv-02509-JS, *ADC Telecommunications, Inc v. Opterna Am, Inc.* filed Jul. 12, 2011 (1 page).

Stipulation and Order of Dismissal relating to Civil Action No. 1:11-cv-735-GBL-IDD, *ADC Telecommunications, Inc v. Opterna Am, Inc.* filed Feb. 21, 2012 (2 pages).

Extended European Search Report for Application No. 20172802.9 dated Aug. 20, 2020.

OPTICAL FIBER DISTRIBUTION SYSTEM

This application is a Continuation of U.S. patent application Ser. No. 16/942,085, filed on 29 Jul. 2020, now U.S. Pat. No. 11,320,618; which is a Continuation of U.S. patent application Ser. No. 16/178,322, filed on 1 Nov. 2018, now U.S. Pat. No. 10,732,373; which is a Continuation of U.S. patent application Ser. No. 15/428,607, filed on 9 Feb. 2017, now U.S. Pat. No. 10,126,515; which is a Continuation of U.S. patent application Ser. No. 14/764,486, filed 29 Jul. 2015, now U.S. Pat. No. 9,568,699; which is a National Stage Application of PCT/EP2014/051714, filed 29 Jan. 2014; which claims benefit of U.S. Provisional Ser. No. 61/758,266, filed 29 Jan. 2013; U.S. Provisional Ser. No. 61/798,256, filed 15 Mar. 2013; U.S. Provisional Ser. No. 61/815,500, filed 24 Apr. 2013; and U.S. Provisional Ser. No. 61/892,558, filed 18 Oct. 2013, and which applications are incorporated herein by reference. To the extent appropriate, a claim of priority is made to each of the above disclosed applications.

FIELD OF THE INVENTION

The present invention relates to an optical fiber distribution system, including a rack, and elements which populate the rack, including fiber terminations, patching, fiber splitters, and fiber splices.

BACKGROUND OF THE INVENTION

Optical fiber distribution systems include fiber terminations and other equipment which is typically rack mounted. Various concerns exist for the optical fiber distribution systems, including density, ease of use, and cable management. There is a continuing need for improvements in the optical fiber distribution area.

SUMMARY OF THE INVENTION

One implementation of a system in accordance with the examples of the disclosure includes a building block element mountable to a rack or other structure. The element includes a chassis and a movable tray. The tray is movably mounted to the chassis with a slide mechanism that allows the tray to slide relative to the chassis. The slide mechanism includes a synchronized movement feature for managing the cables extending to and from the tray, such that cable pull at the entry and exit locations is reduced or eliminated as the tray is moved.

One synchronized movement feature includes gears, including a rack and pinion system. Another synchronized movement feature includes wheels and wires.

The tray preferably includes mounting structures for holding cable terminations, splitters, and/or splices. One mounting structure includes an open shaped frame member for connector access. In one example, two frame members are provided, one positioned over the other. For improved access, the frame members are hingedly mounted to the tray. In a termination arrangement, the adapters are arranged so that the connector axes are horizontal and extend in a perpendicular direction to the direction of travel for the tray.

Each frame member can be populated with adapter blocks. Pathways guide cables to the adapter ports of the adapter blocks for fiber optic cables terminated with connectors to be received therein. The cables follow a general S-shaped pathway from a side of each element to the adapter blocks. The S-shaped pathway includes two levels inside of the tray to segregate cables between the two frame members. Various flanges and radius limiters can be provided to assist with cable management.

The elements can be stacked in a column with each tray mounted horizontally, or used in a group or block mounted vertically. In the case of a column of elements, a selected tray is pulled outward to access the desired tray, and then the frame members on the tray can be pivoted as needed.

One side of each element can be for patch cables, and the opposite side can be for cable termination of an incoming cable, such as a distribution cable or a feeder cable. Because of the synchronized movement feature, cables can be secured along the sides of the elements and still allow for sliding movement of the trays without a need for large amounts or any cable slack.

The tray and the frame members allow for easy top and bottom access to connectors on either side of the adapters. Openings are provided in the tray bottom for hand access if desired.

The cable mounts for the distribution cables or feeder cables can be snap mounted to the elements and/or mounted in a longitudinal slide mount, and include strength member clamps and cable clamps.

Groupings of loose cables can be managed with cable wraps or other cable guides such as flexible troughs.

The elements can be configured as desired and form building blocks for an optical fiber distribution system (ODF).

When the elements are mounted in a column in a rack, the cables can be placed in vertical cable guides to enter and exit the selected element.

The example rack is front accessible, however, the elements can be used in other racks, frames, cabinets or boxes including in arrangements where rear access is desirable or useful.

DETAILED DESCRIPTION

Figure 1:
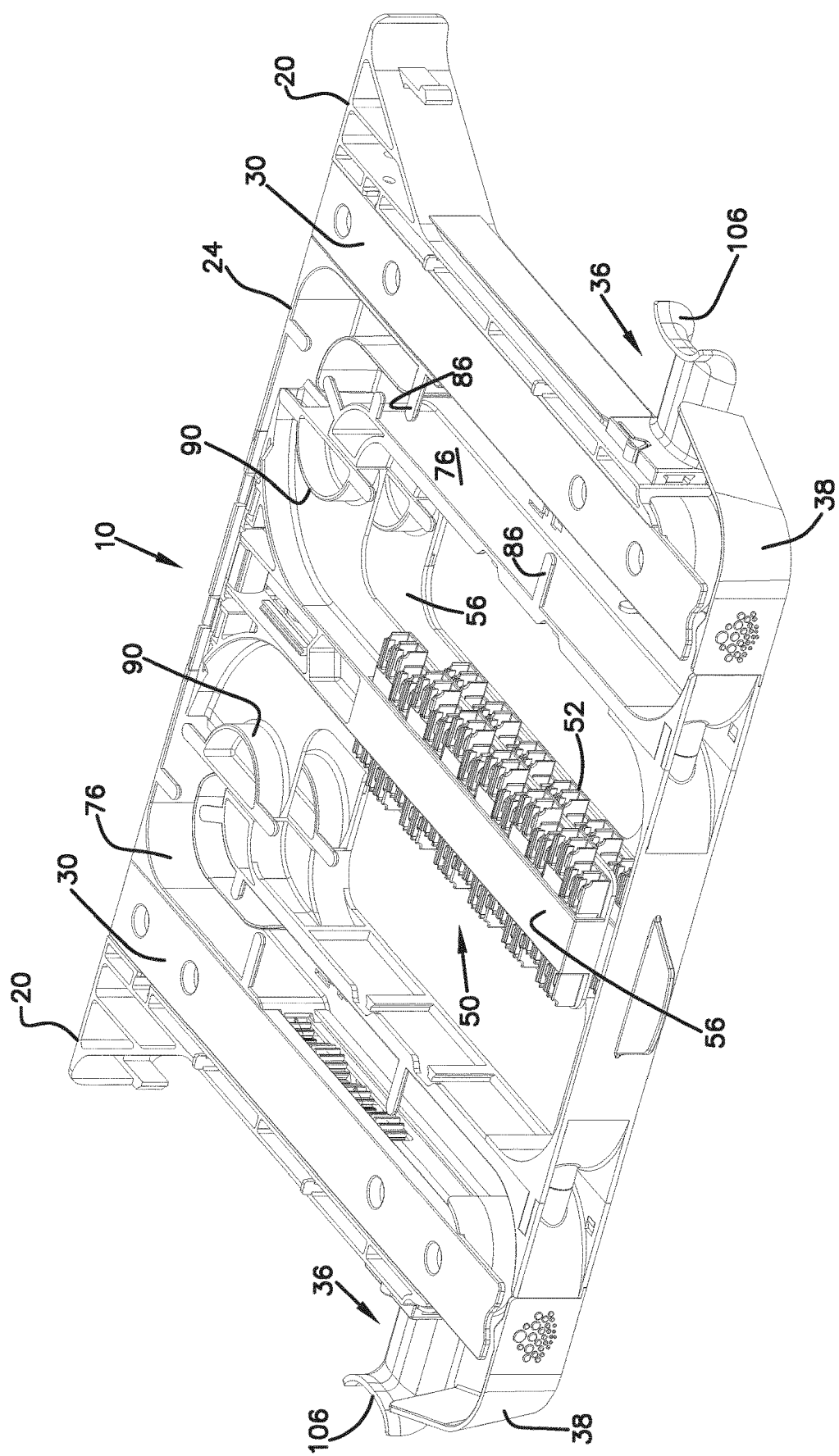
FIG. 1 is a perspective view of a first embodiment of an optical fiber distribution element in accordance of aspects of the present disclosure.
Figure 2:
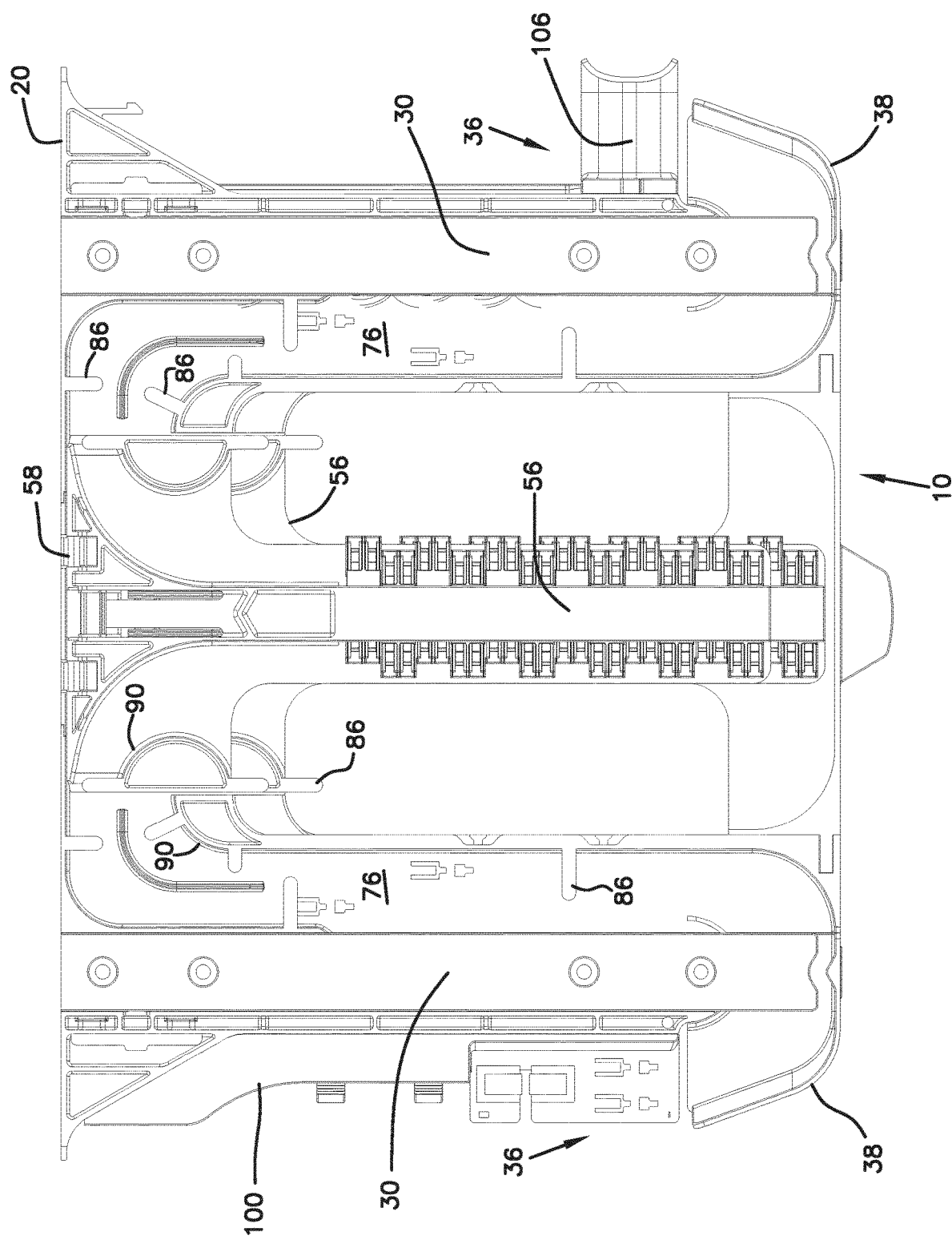
FIG. 2 is a top view of the element of FIG. 1.
Figure 3:
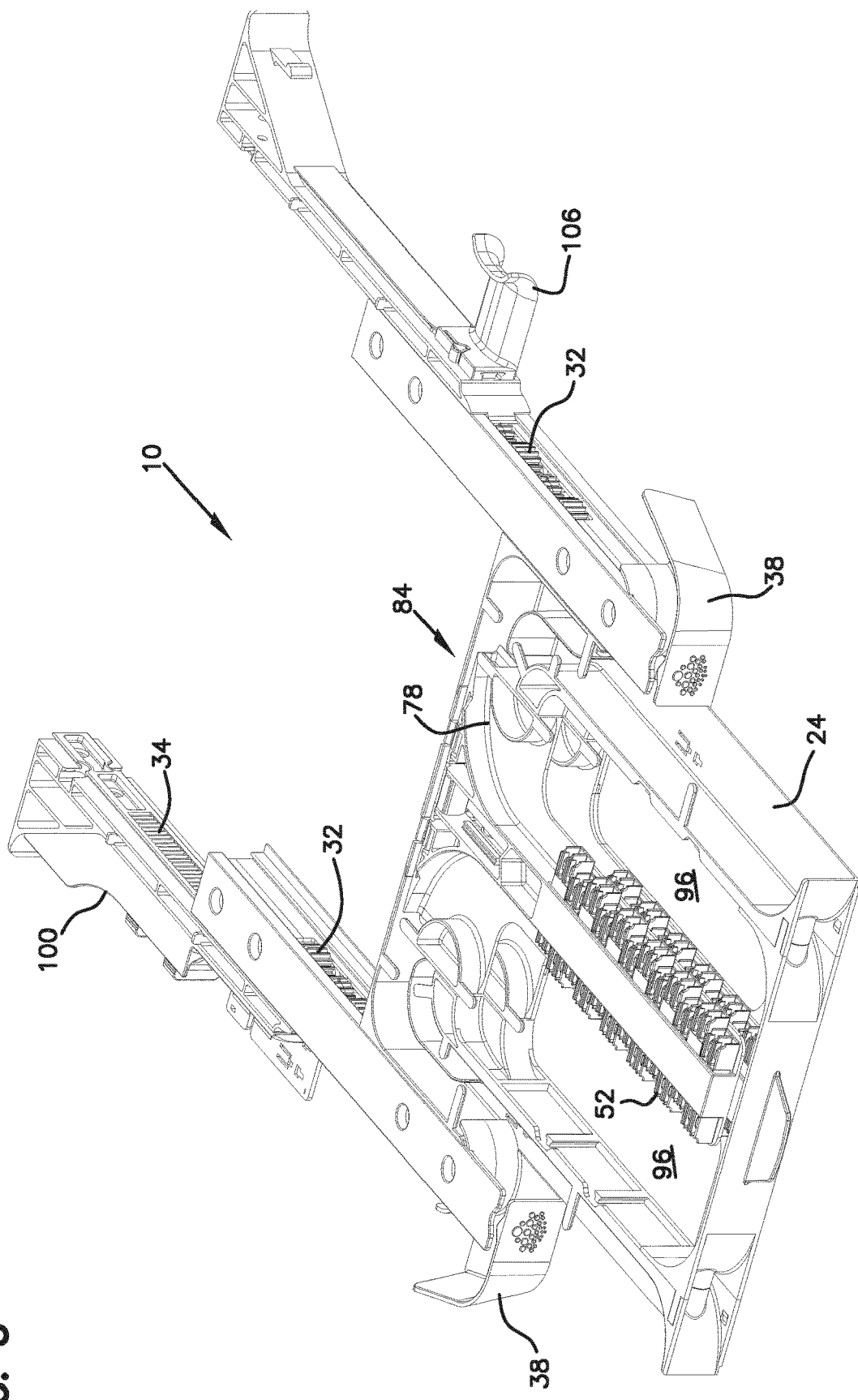
FIG. 3 is a perspective view of the element of FIG. 1 showing the tray pulled forward from the chassis.
Figure 4:
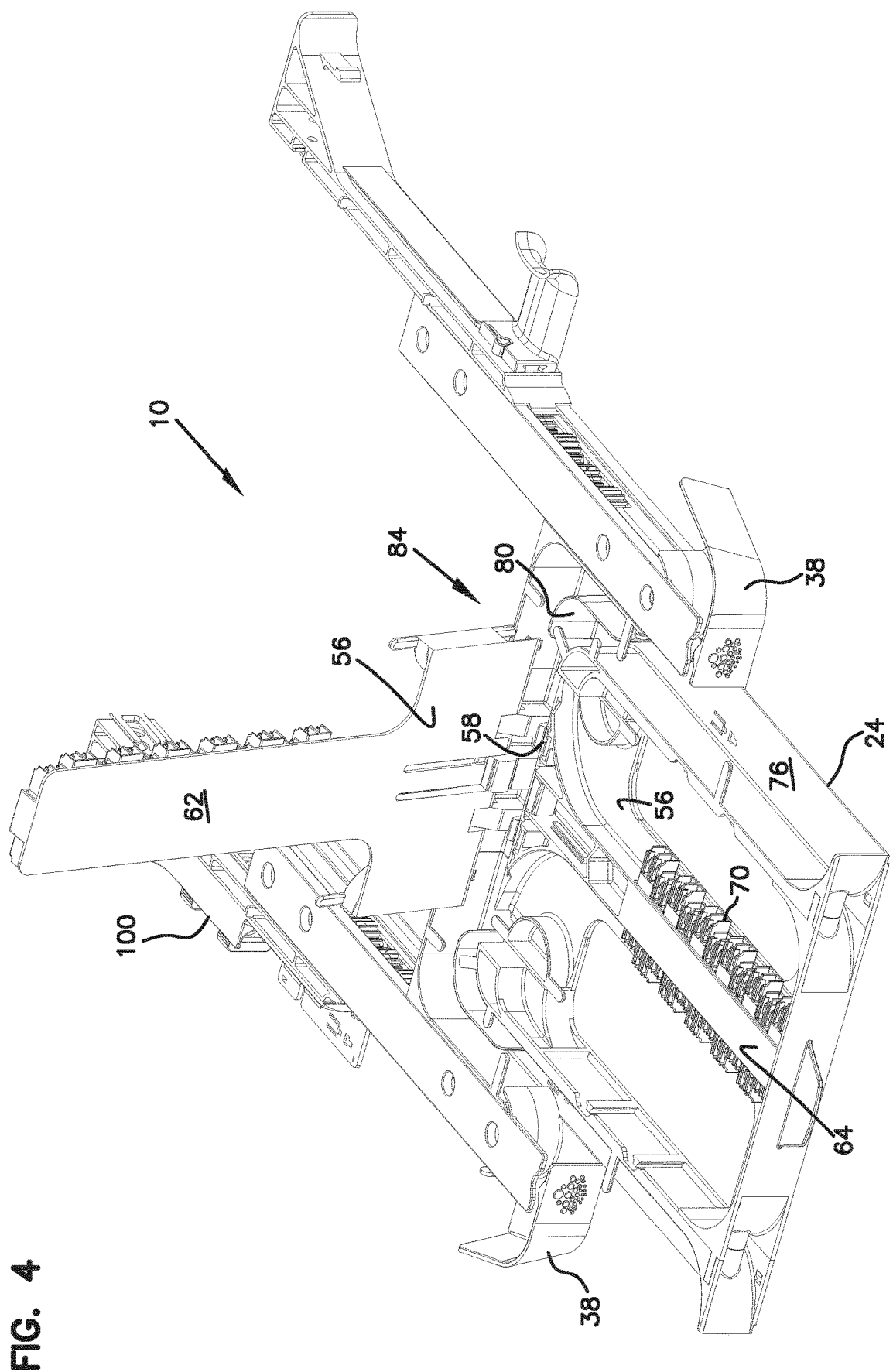
FIG. 4 shows one of the tray frame members pivoted upwardly from the tray.
Figure 5:
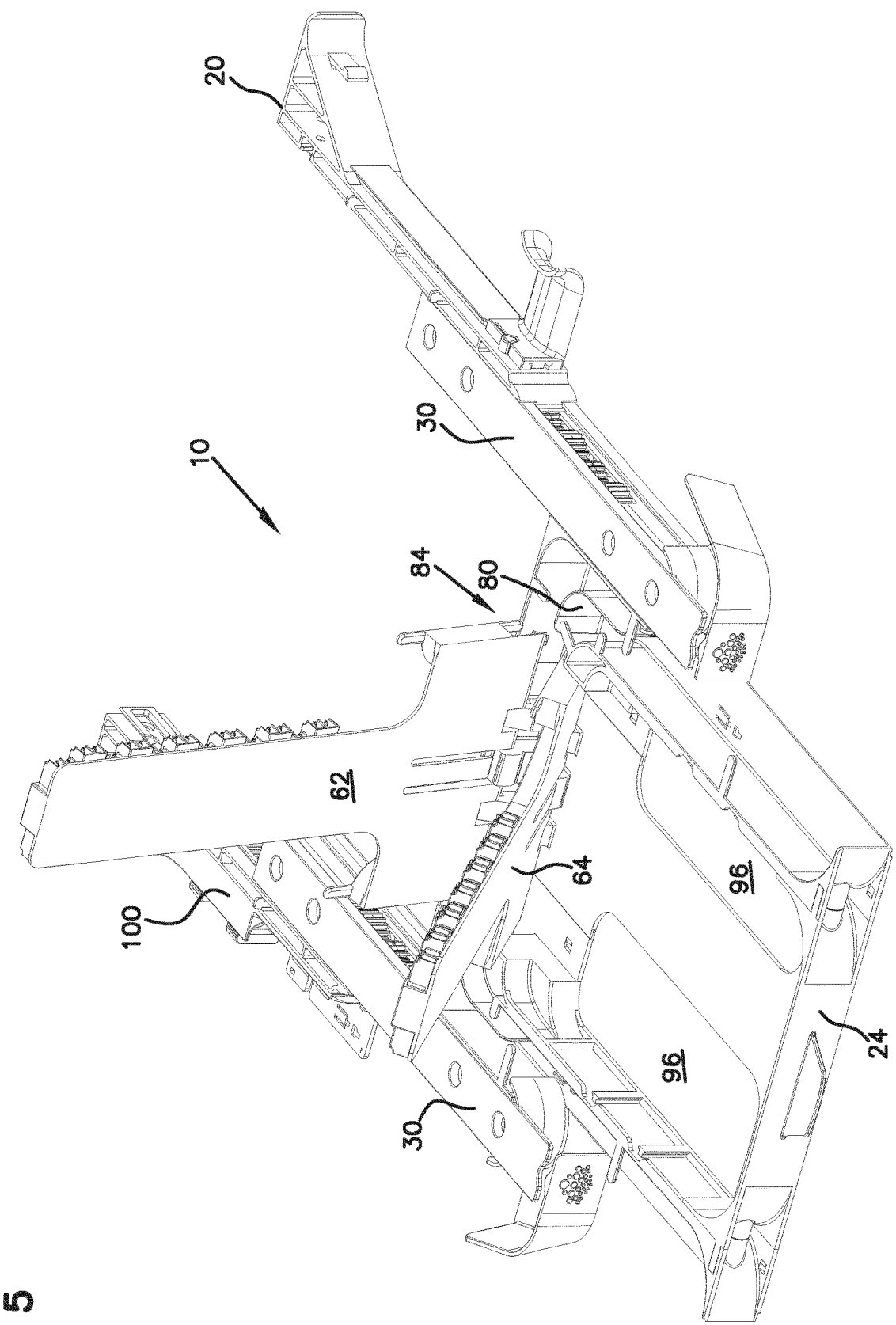
FIG. 5 shows a second frame member pivoted upwardly relative to the tray.
Figure 6:
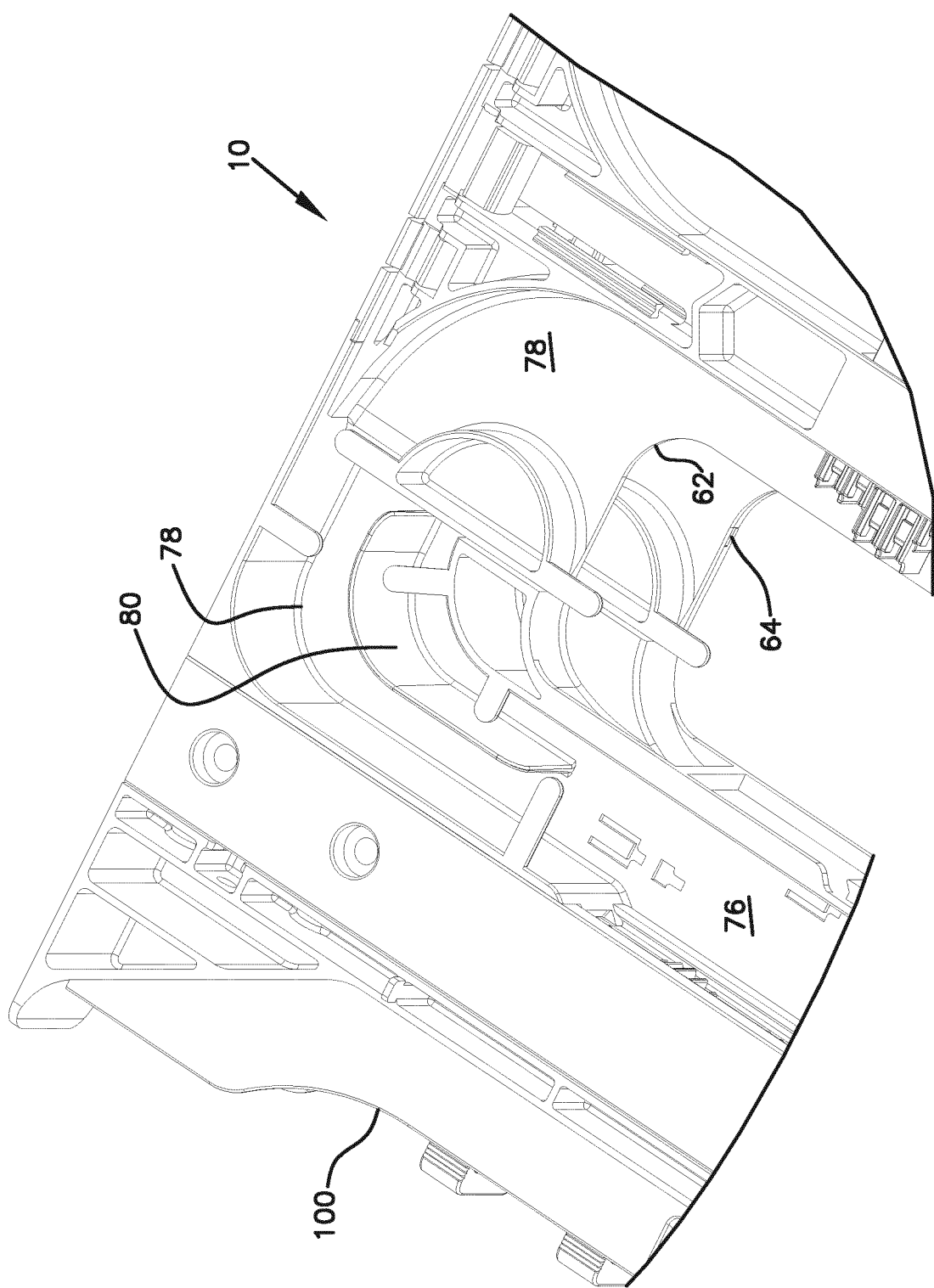
FIG. 6 shows a portion of a cable management area of the element of FIG. 1.
Figure 7:
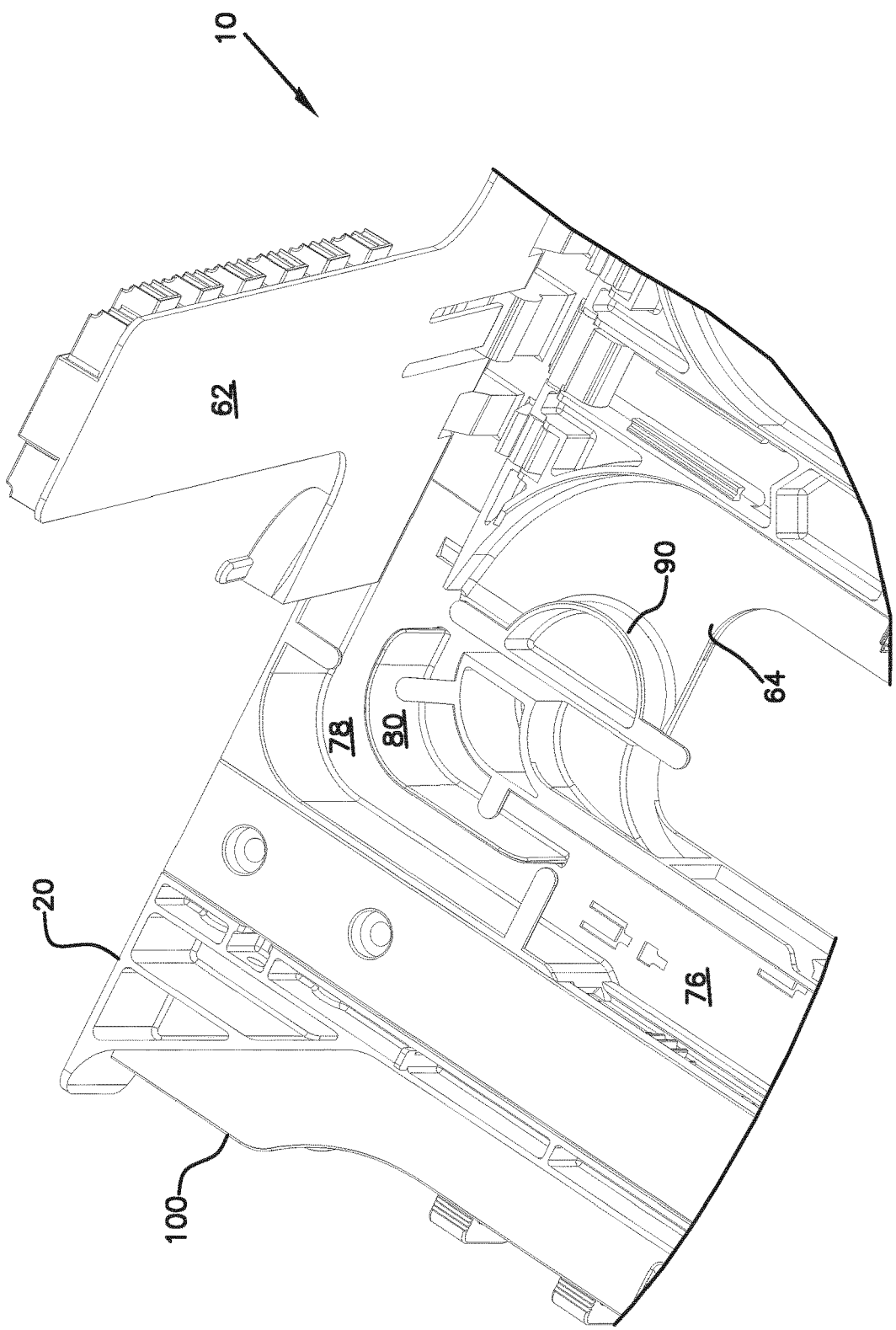
FIG. 7 shows a similar view to FIG. 6, with one of the frame members pivoted upwardly.
Figure 8:
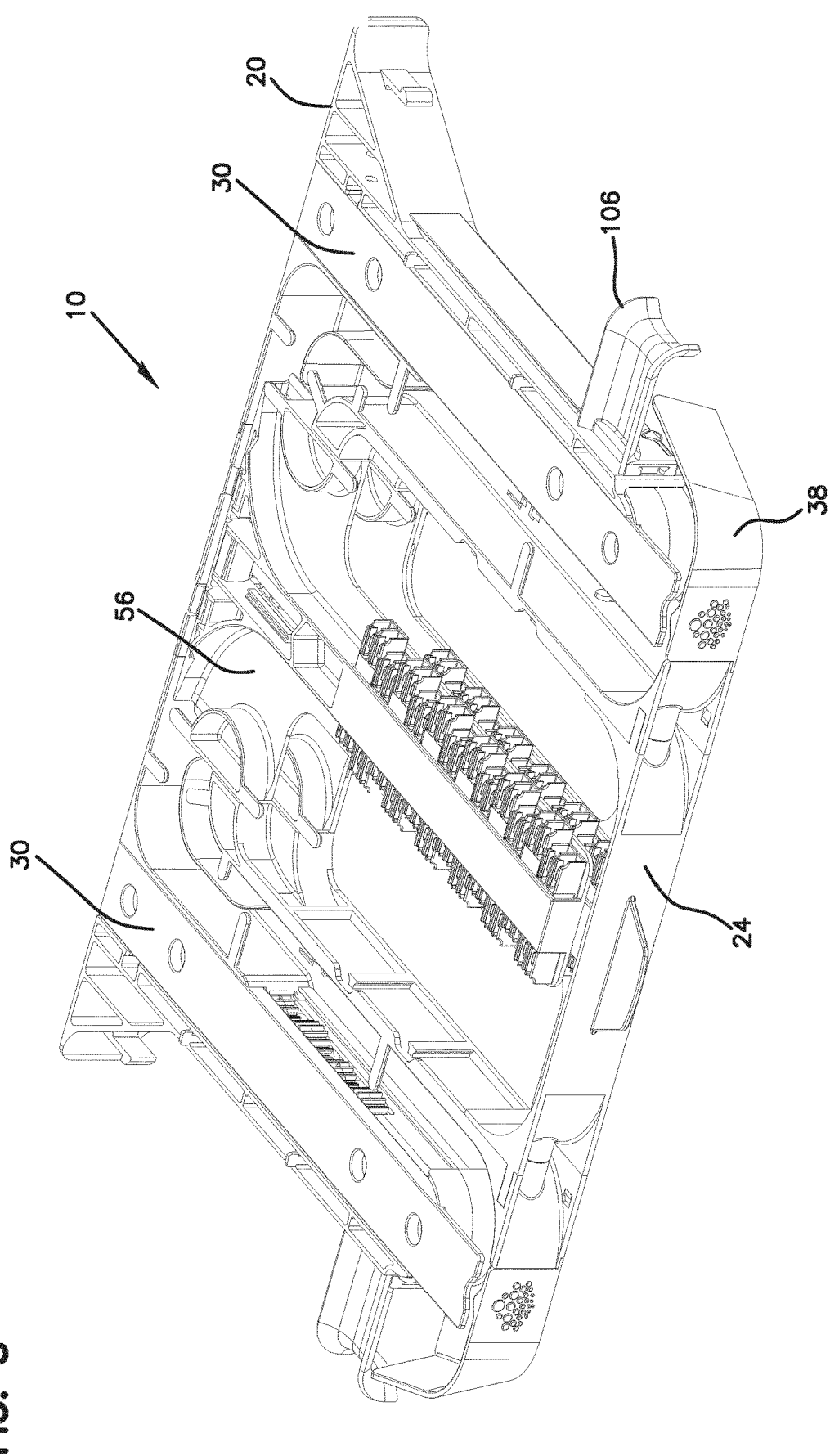
FIG. 8 shows an alternative embodiment of an element with different cable management at the entry points.
Figure 9:
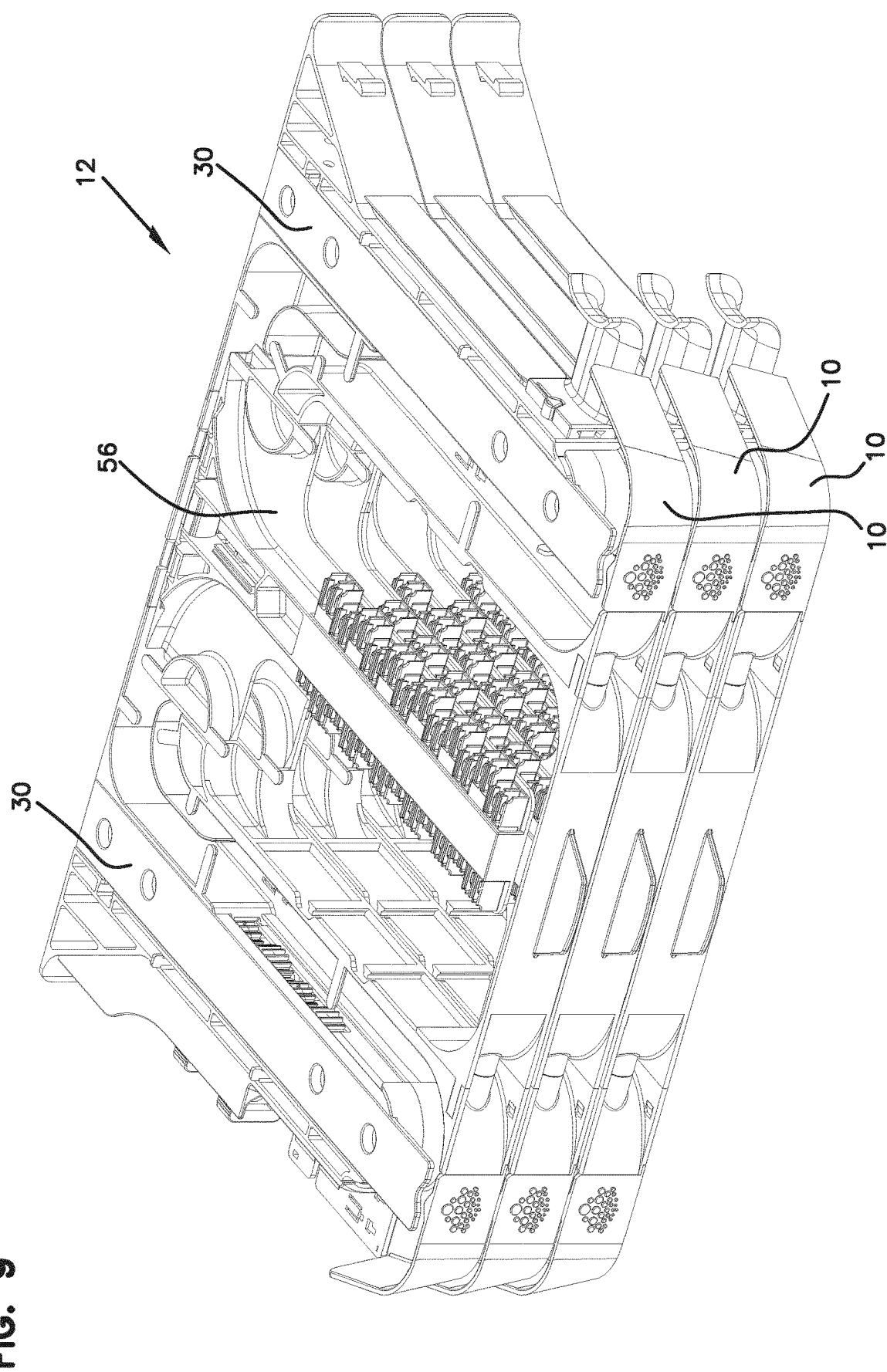
FIG. 9 shows three of the elements of FIG. 8 mounted in a block formation, with cable radius limiters at the entry point mounted in an alternative position.
Figure 10:
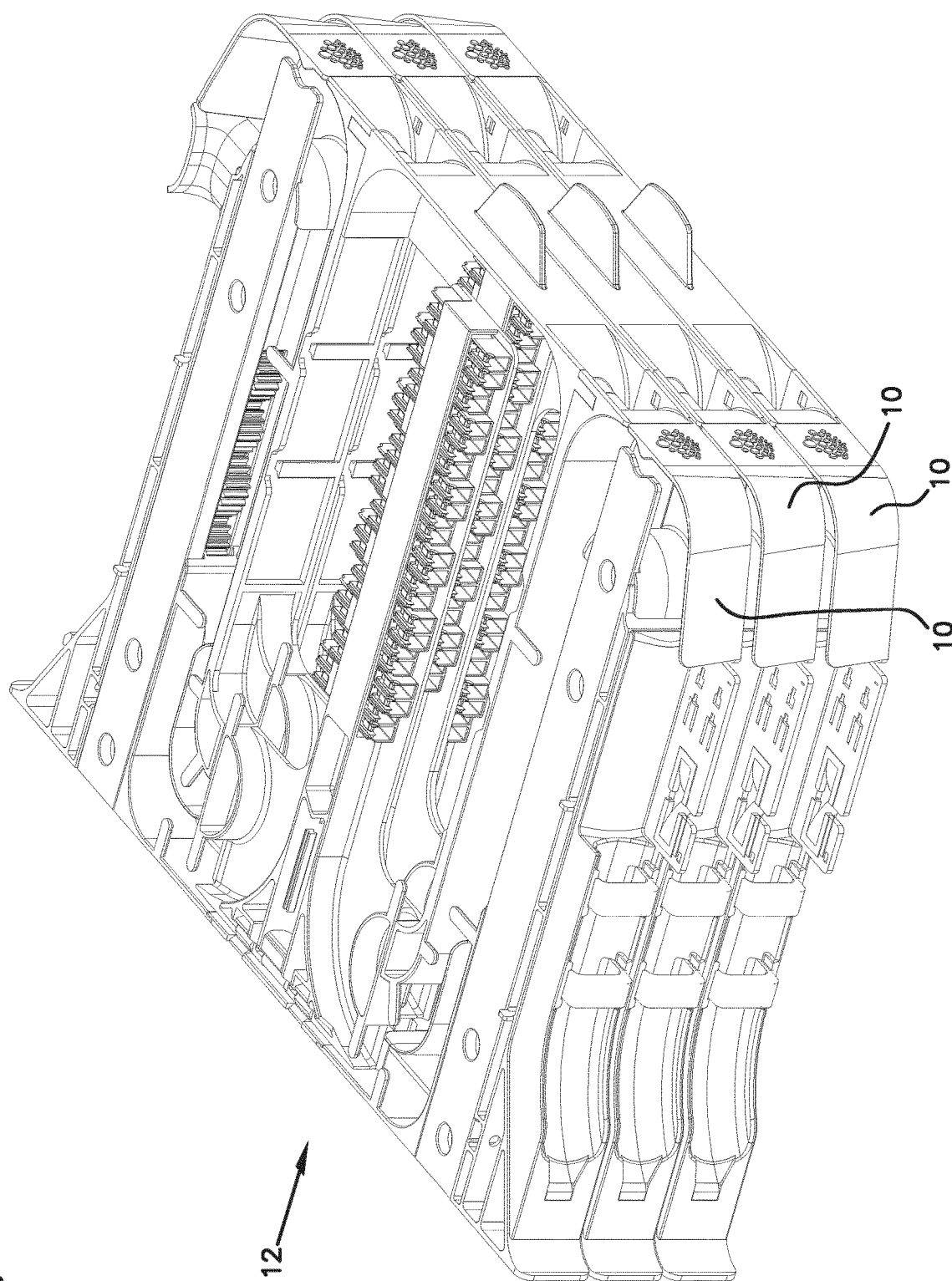
FIG. 10 is a perspective view of the block of FIG. 9.
Figure 11:
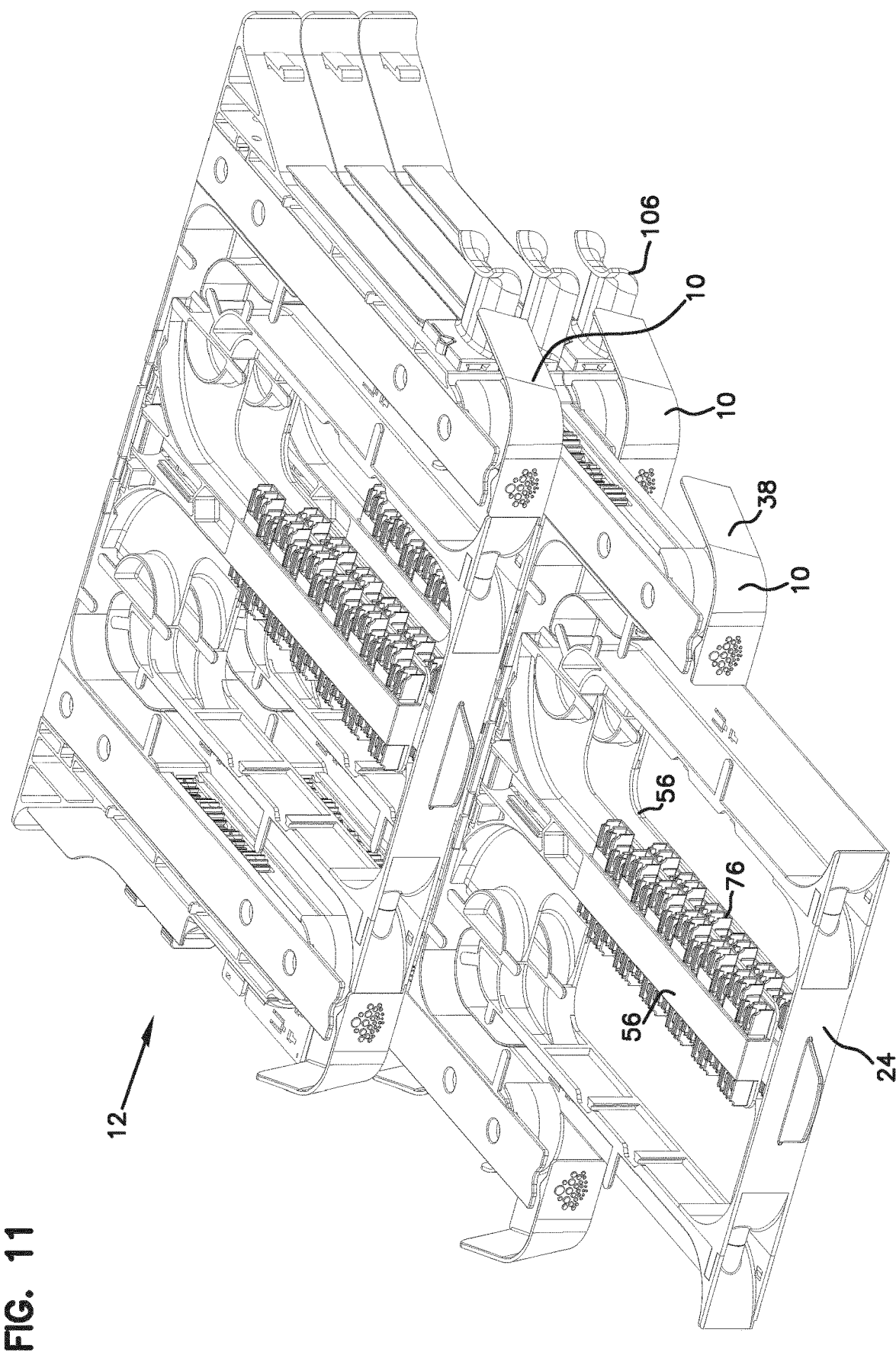
FIG. 11 is a view of the block of FIG. 9, with the tray of the middle element pulled forward for access to the fiber terminations.
Figure 12:
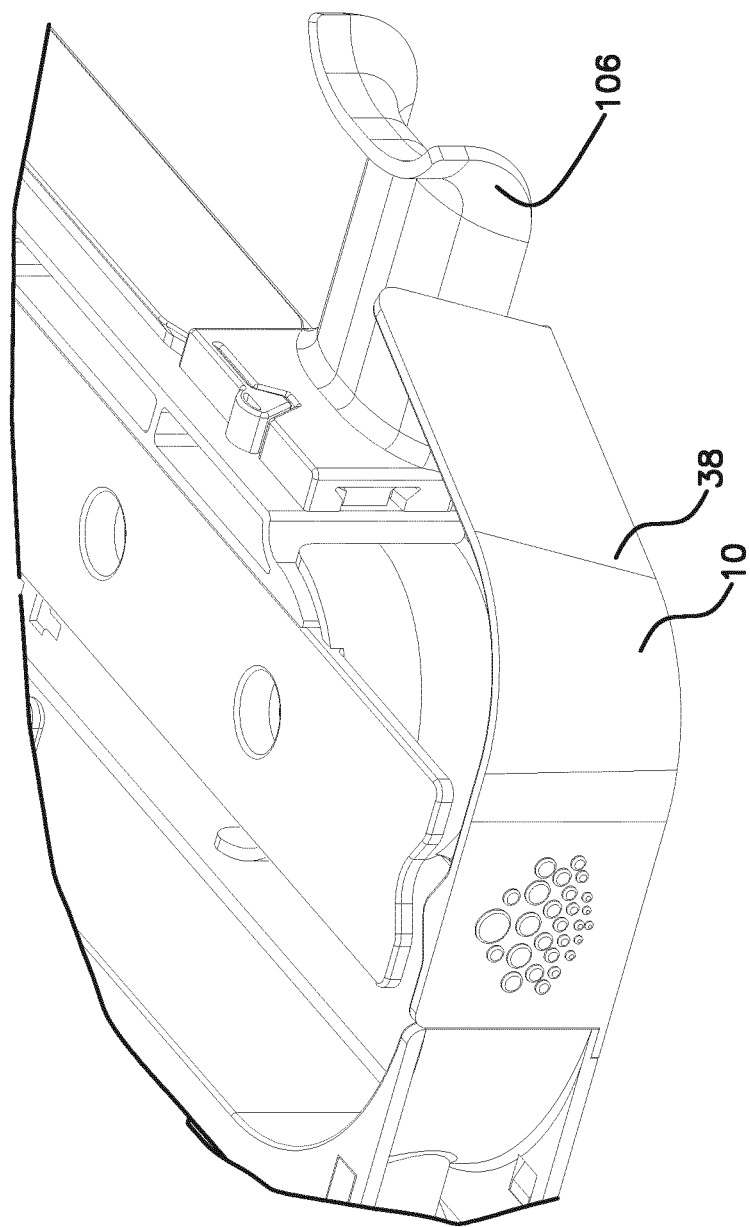
FIG. 12 shows an enlarged portion of an entry point for one of the elements with a cable radius limiter in a first position.
Figure 13:
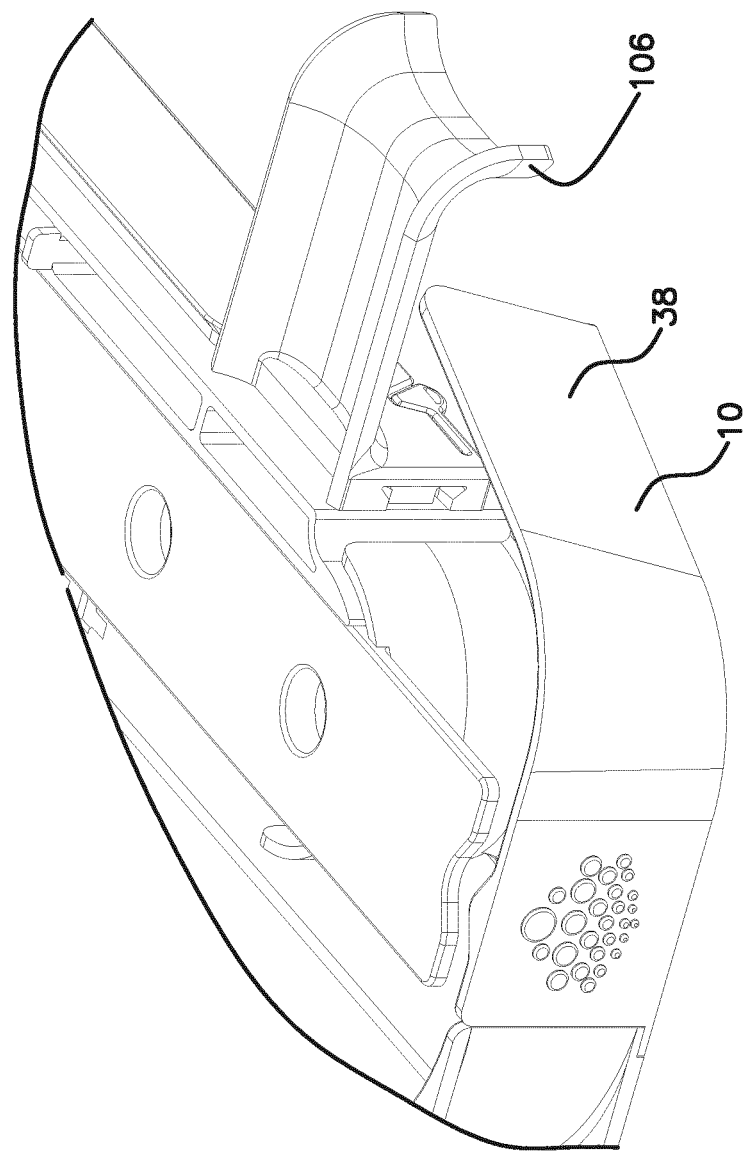
FIG. 13 shows a similar view as in FIG. 12, with the cable radius limiter positioned in an alternate position.
Figure 14:
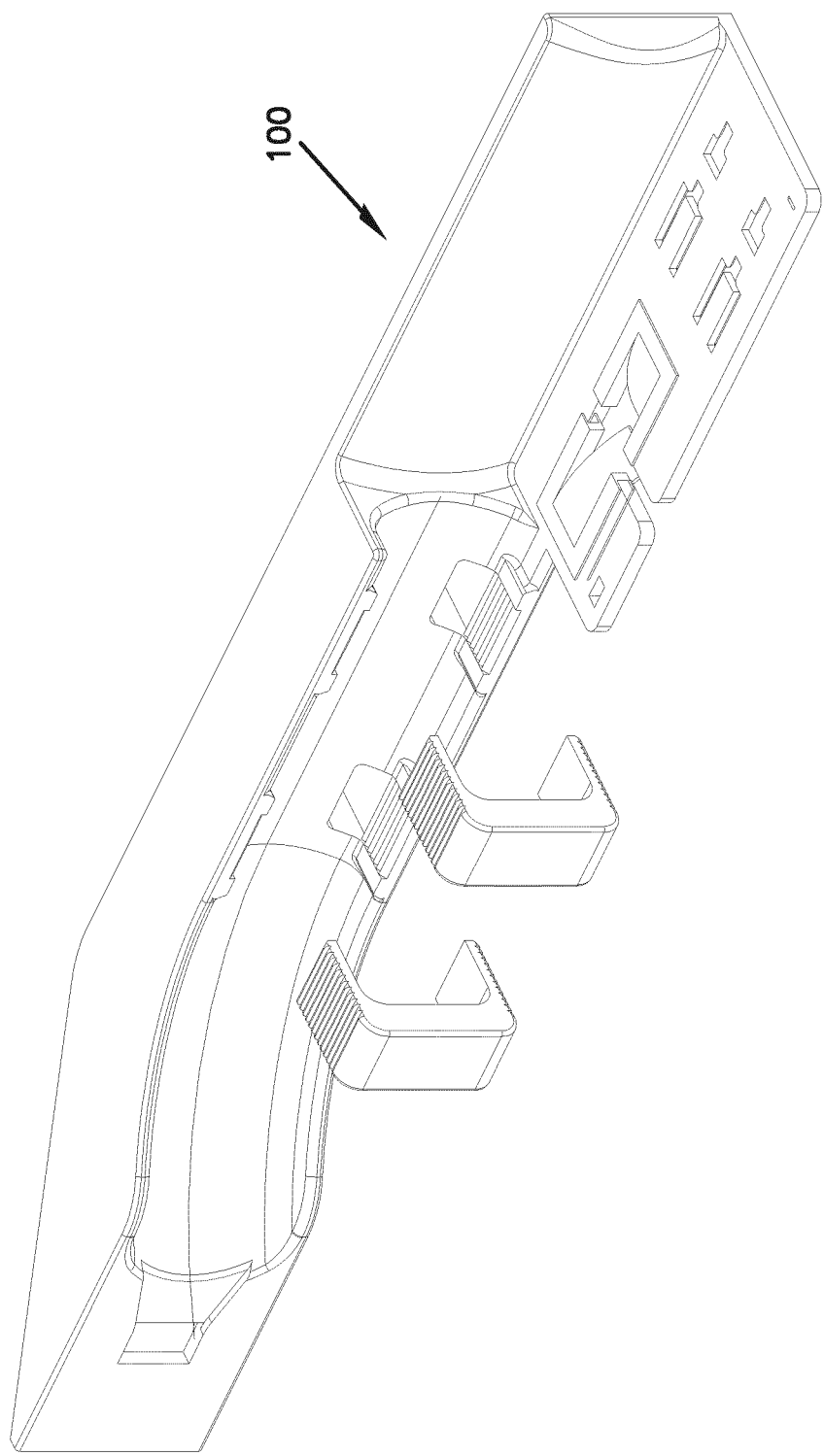
FIG. 14 shows an exploded view of a cable mount.
Figure 15:
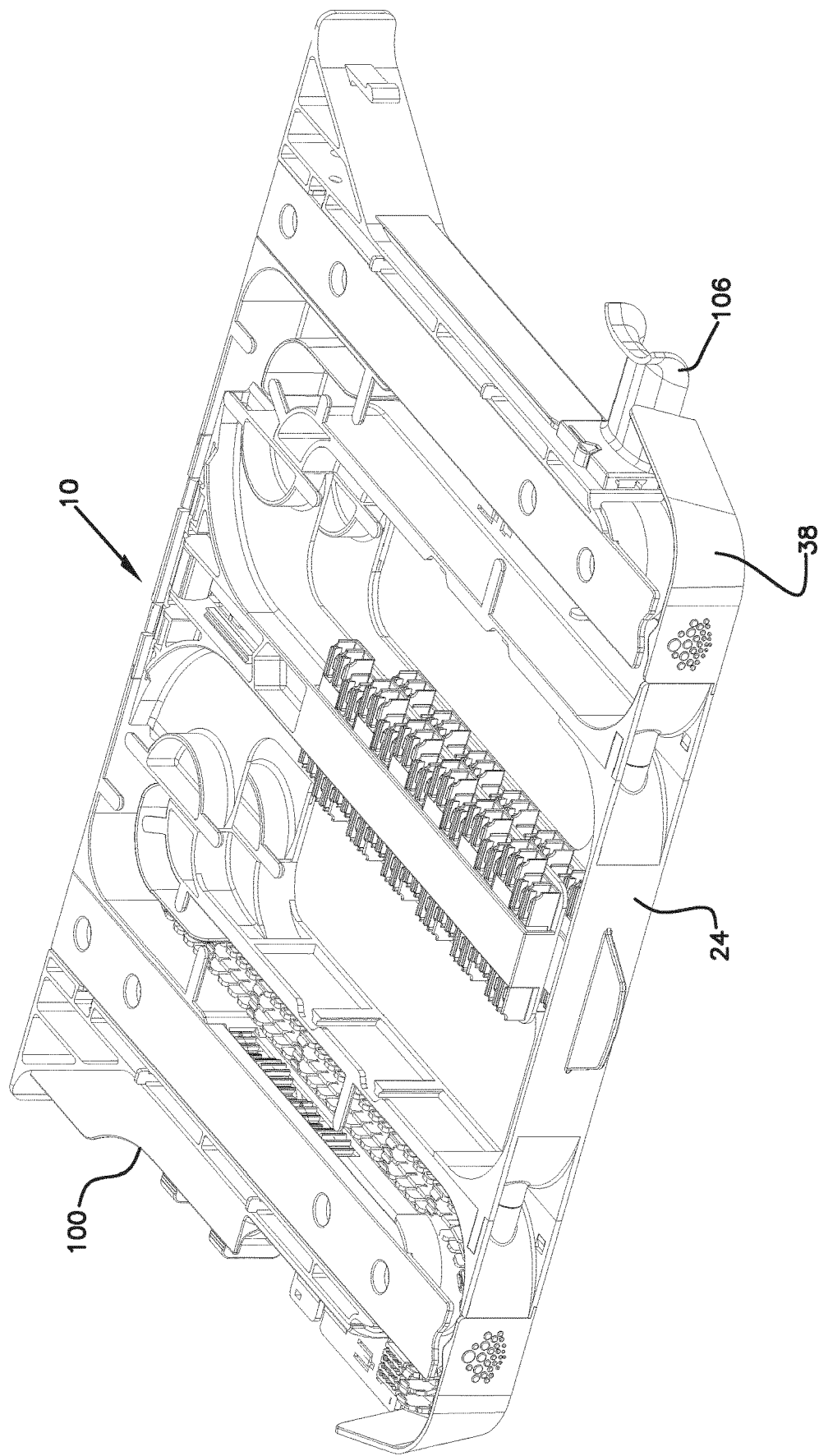
FIG. 15 shows an element with a cable mount on one side, and a cable radius limiter on an opposite side.
Figure 16:
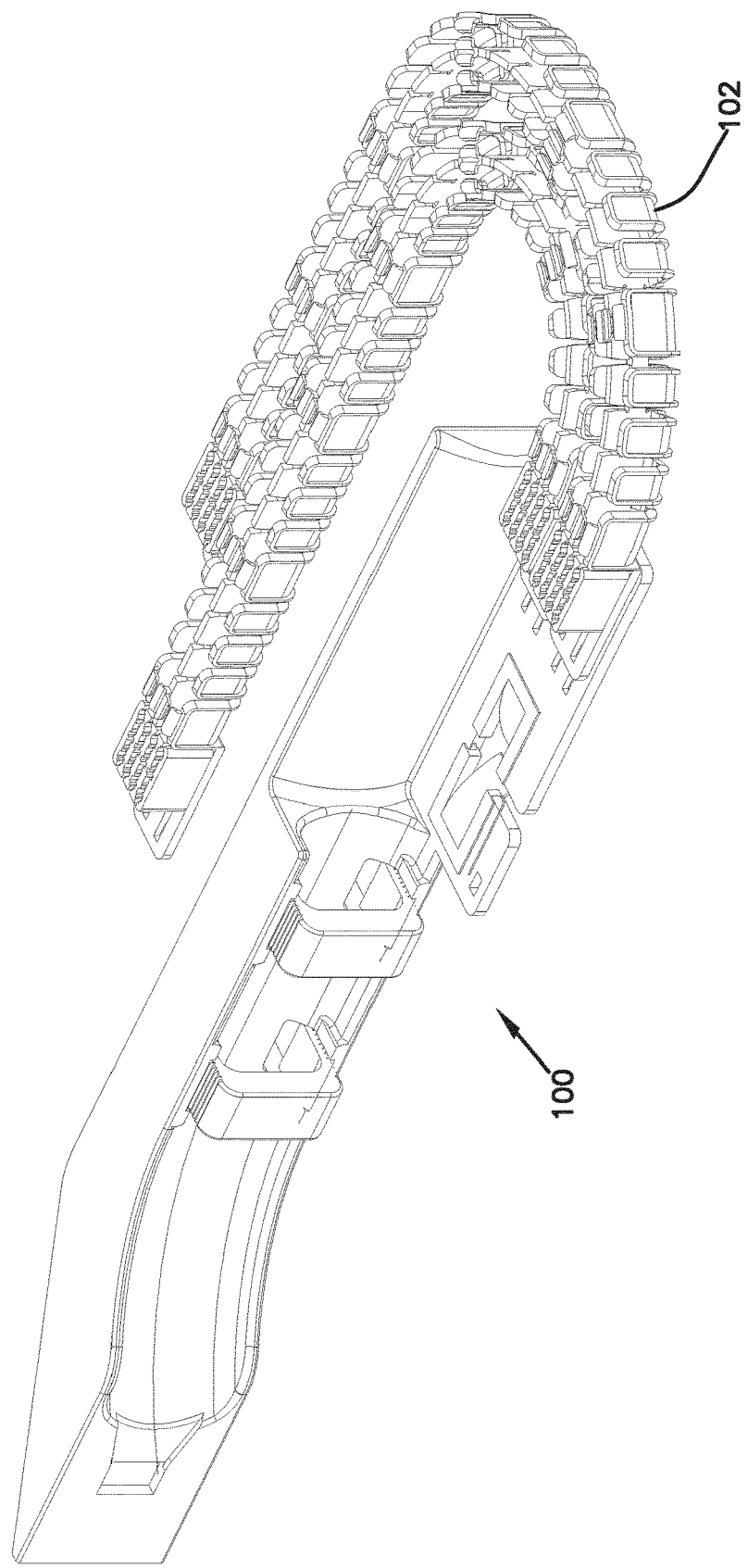
FIG. 16 shows an alternative cable mount.
Figure 17:
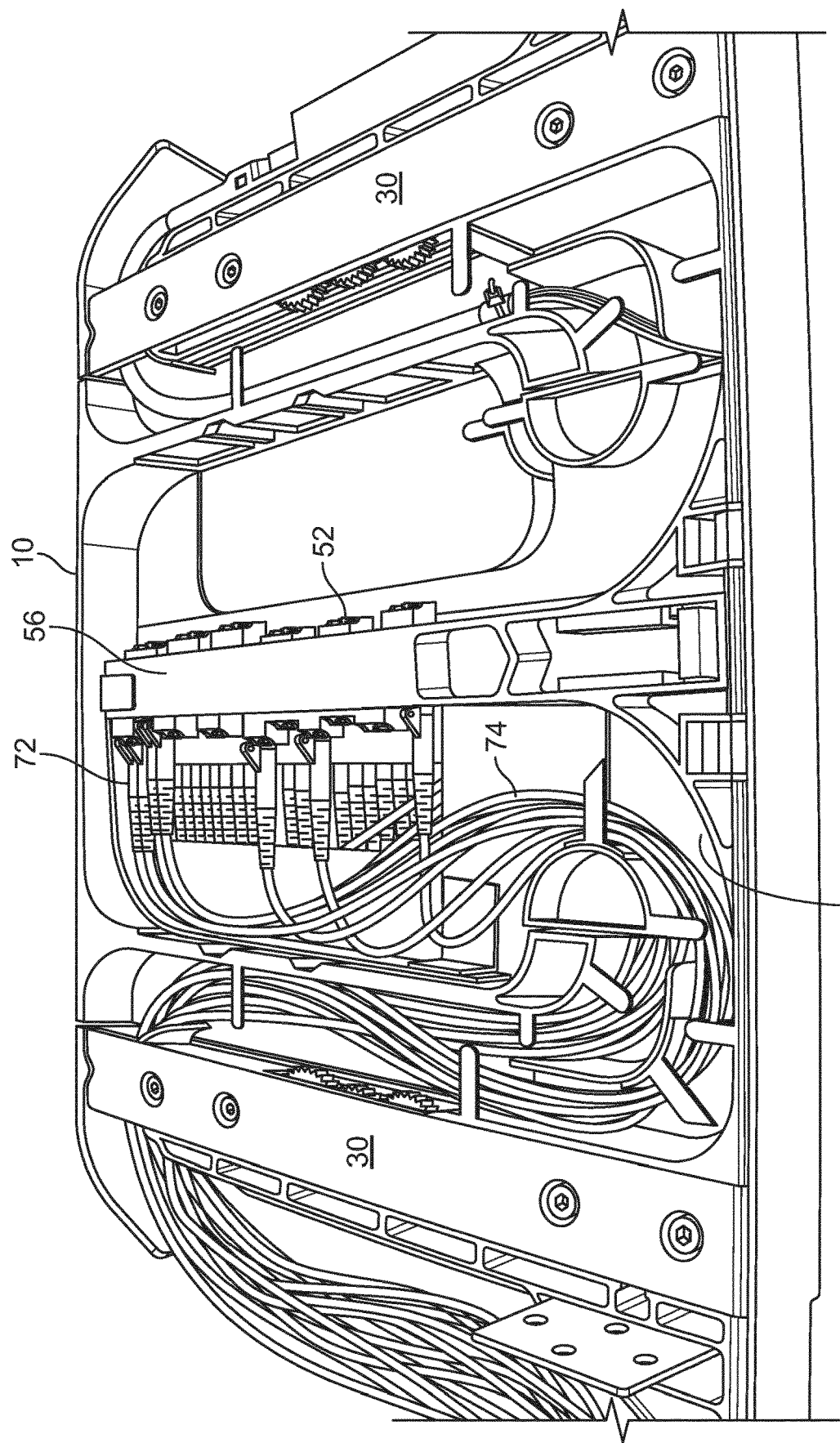
FIGS. 17-29 show various views of the elements shown in FIGS. 1-16 including additional details and cable routings shown for illustration purposes.
Figure 18:
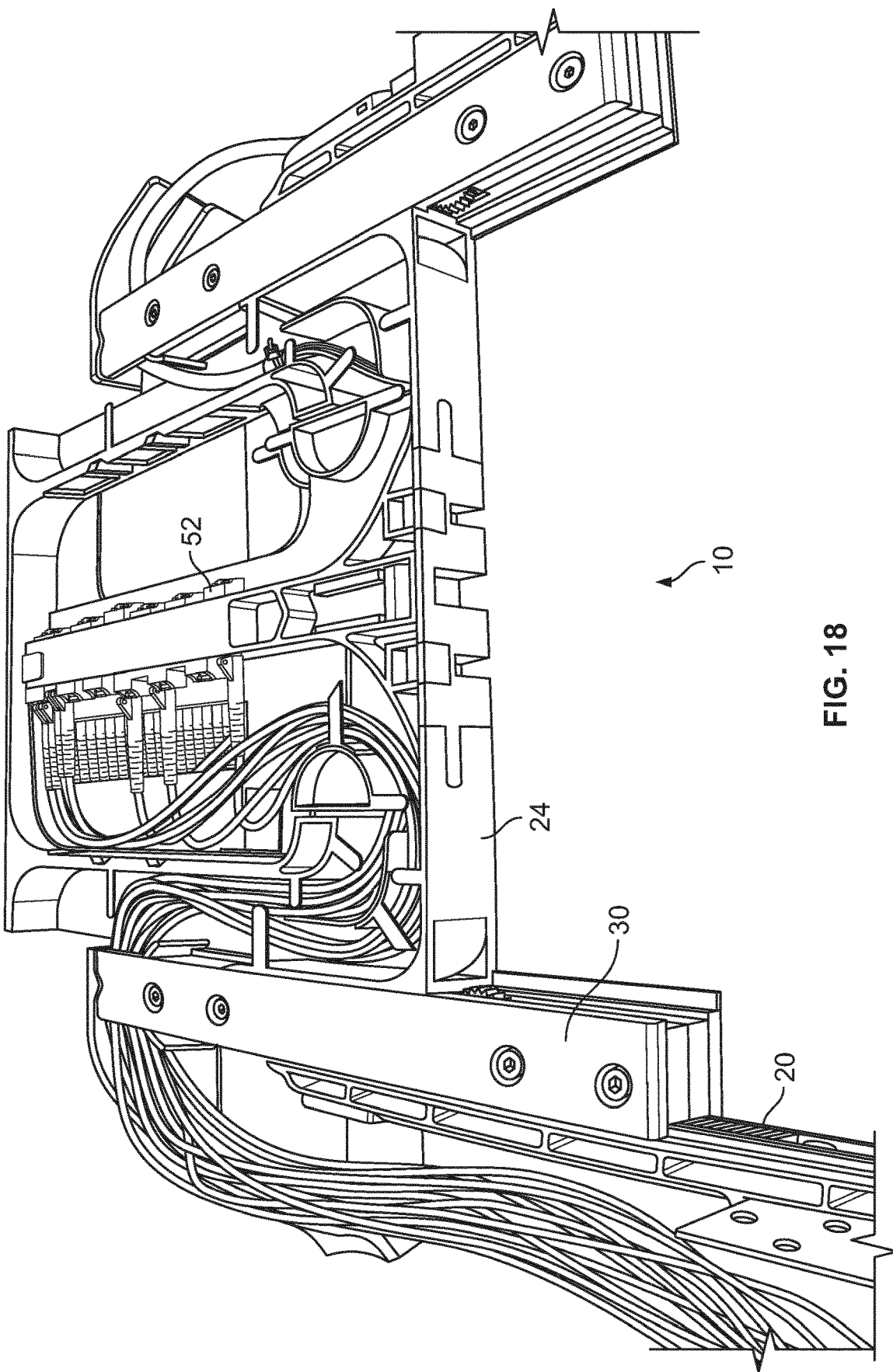
Figure 19:
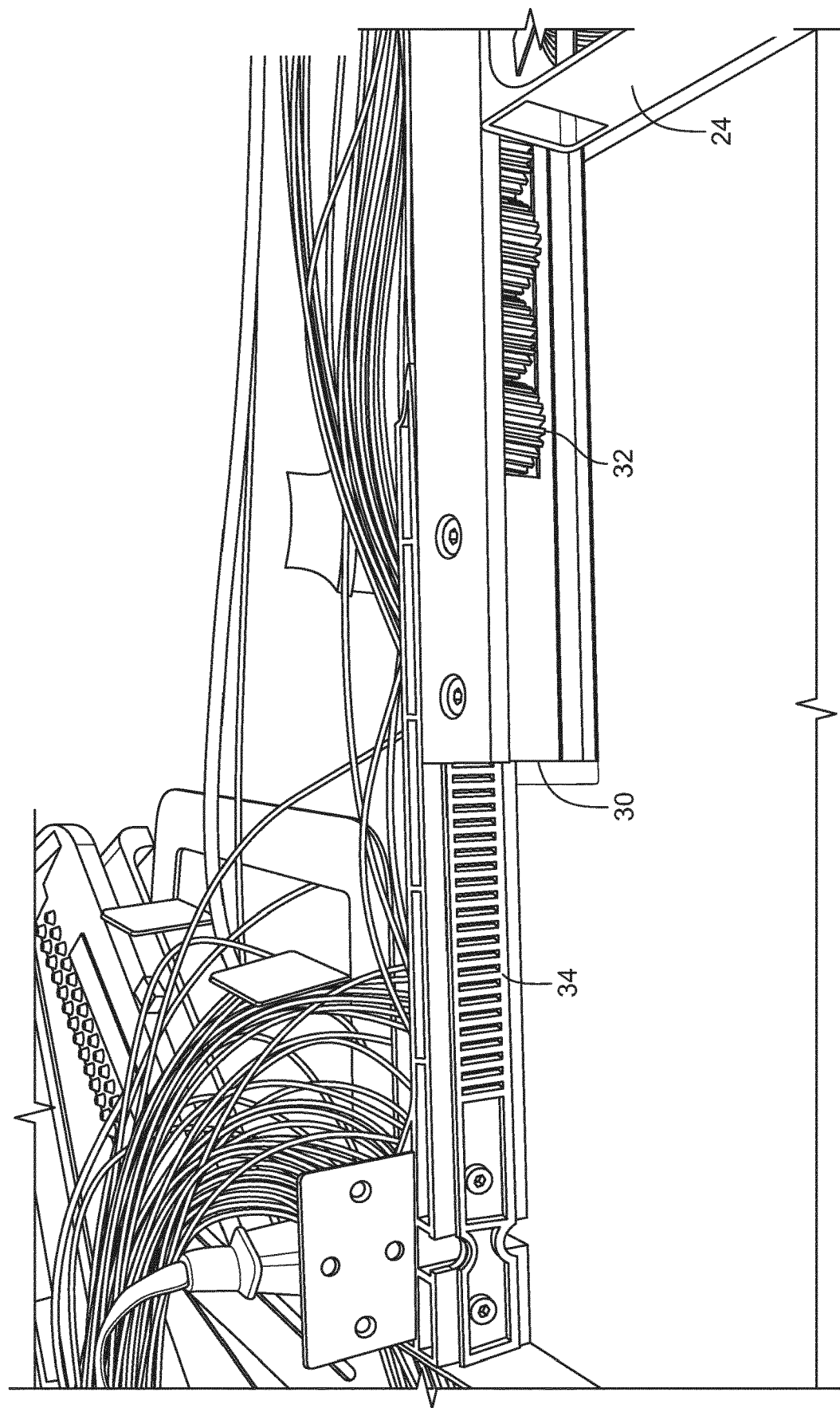
Figure 20:
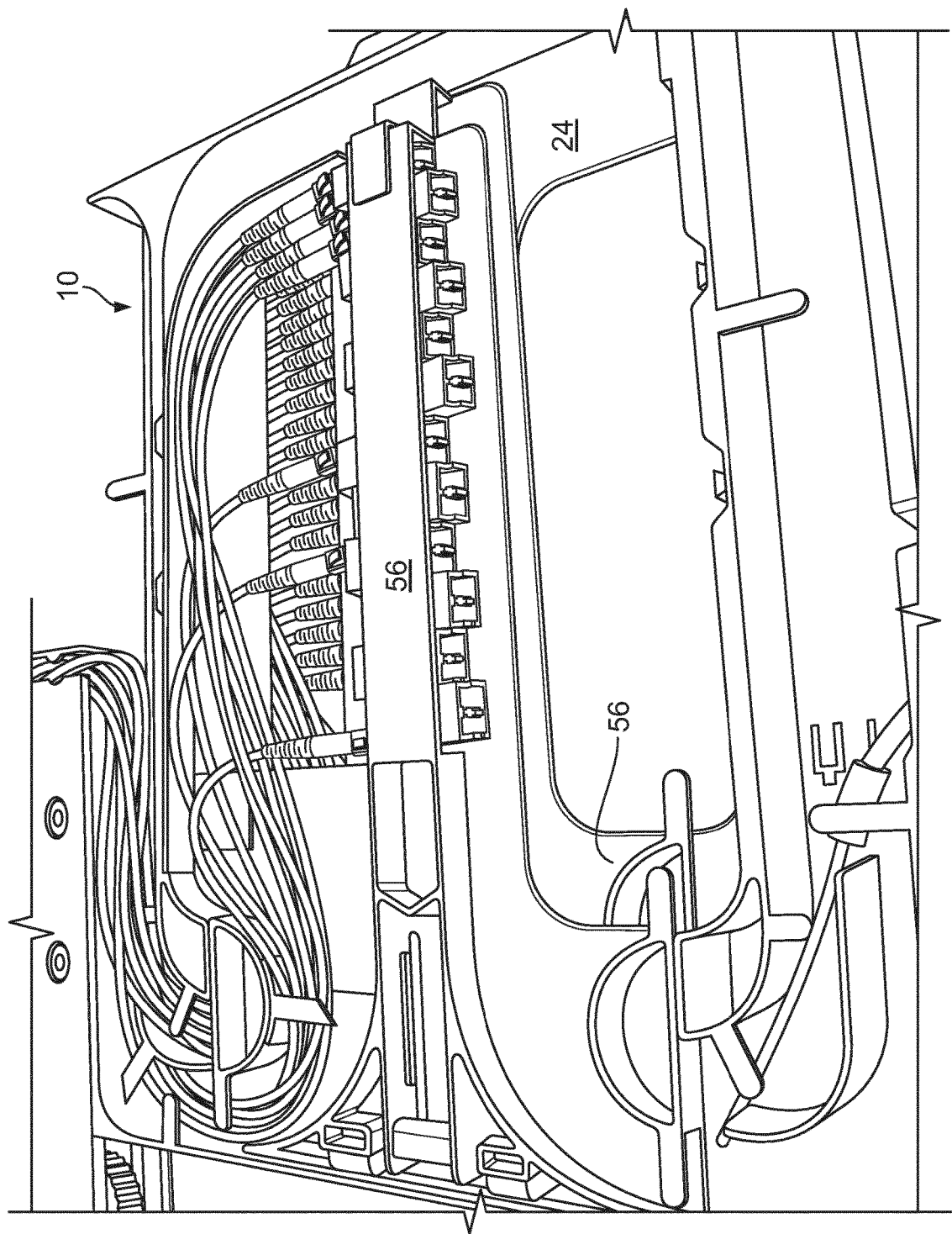
Figure 21:
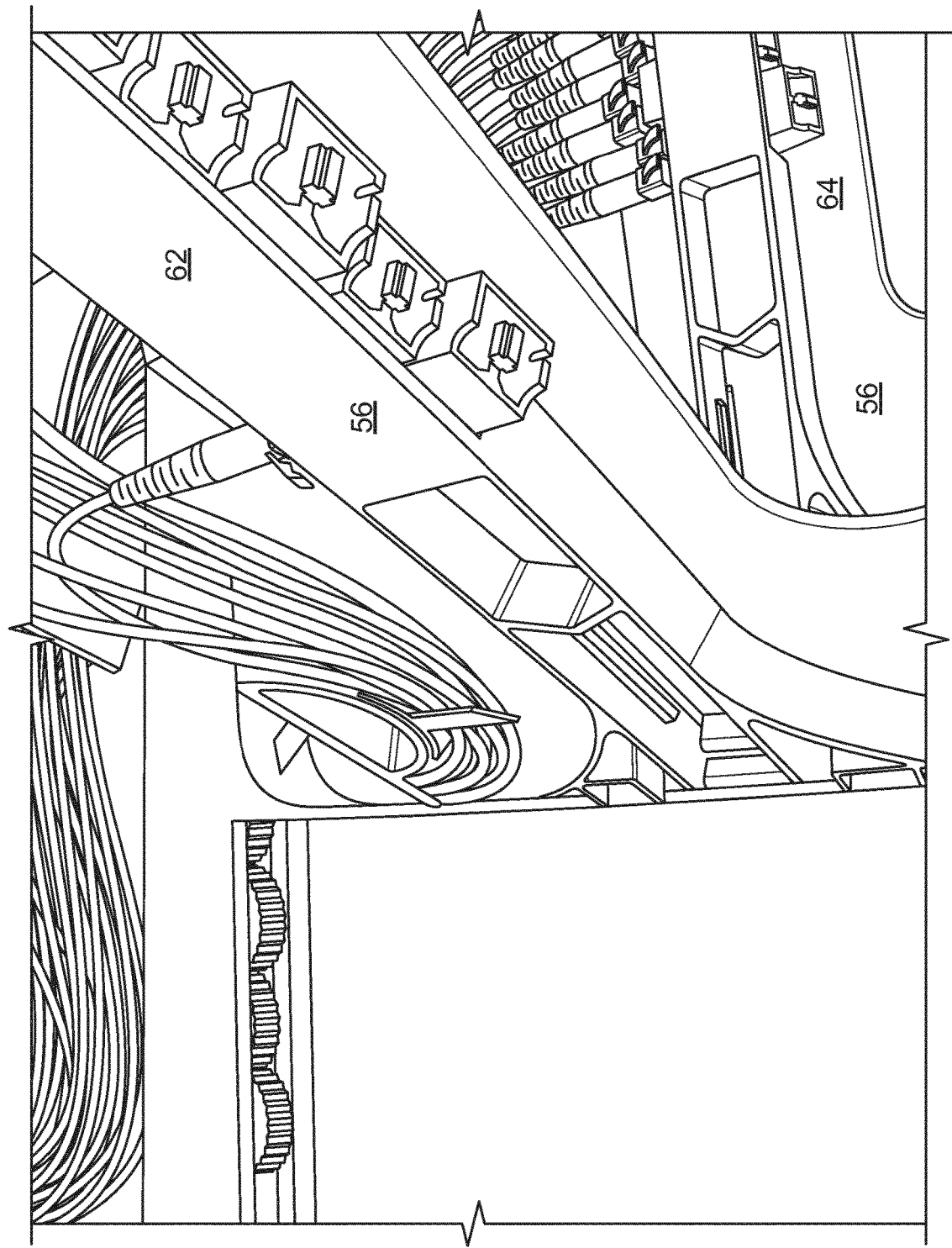
Figure 22:
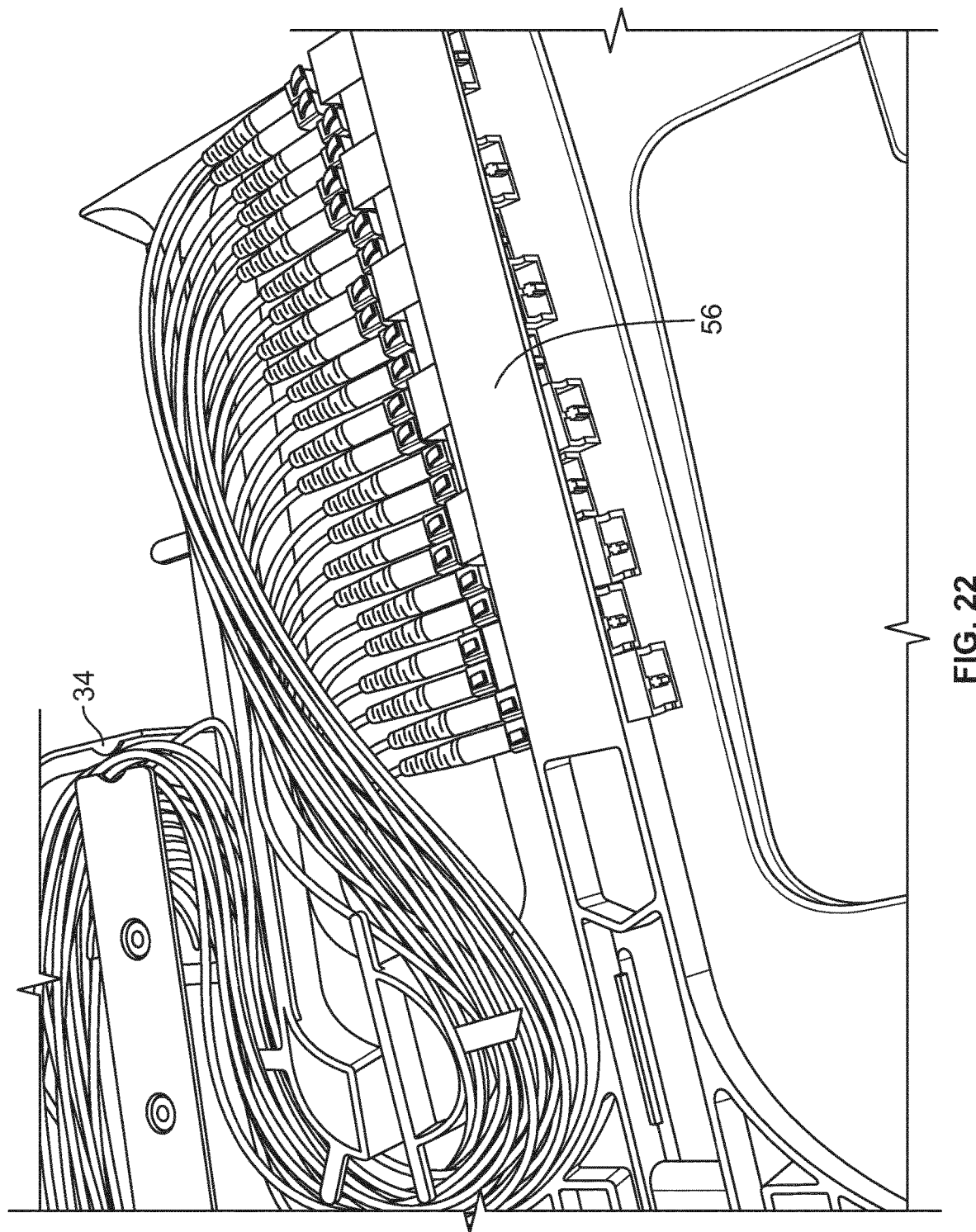
Figure 23:
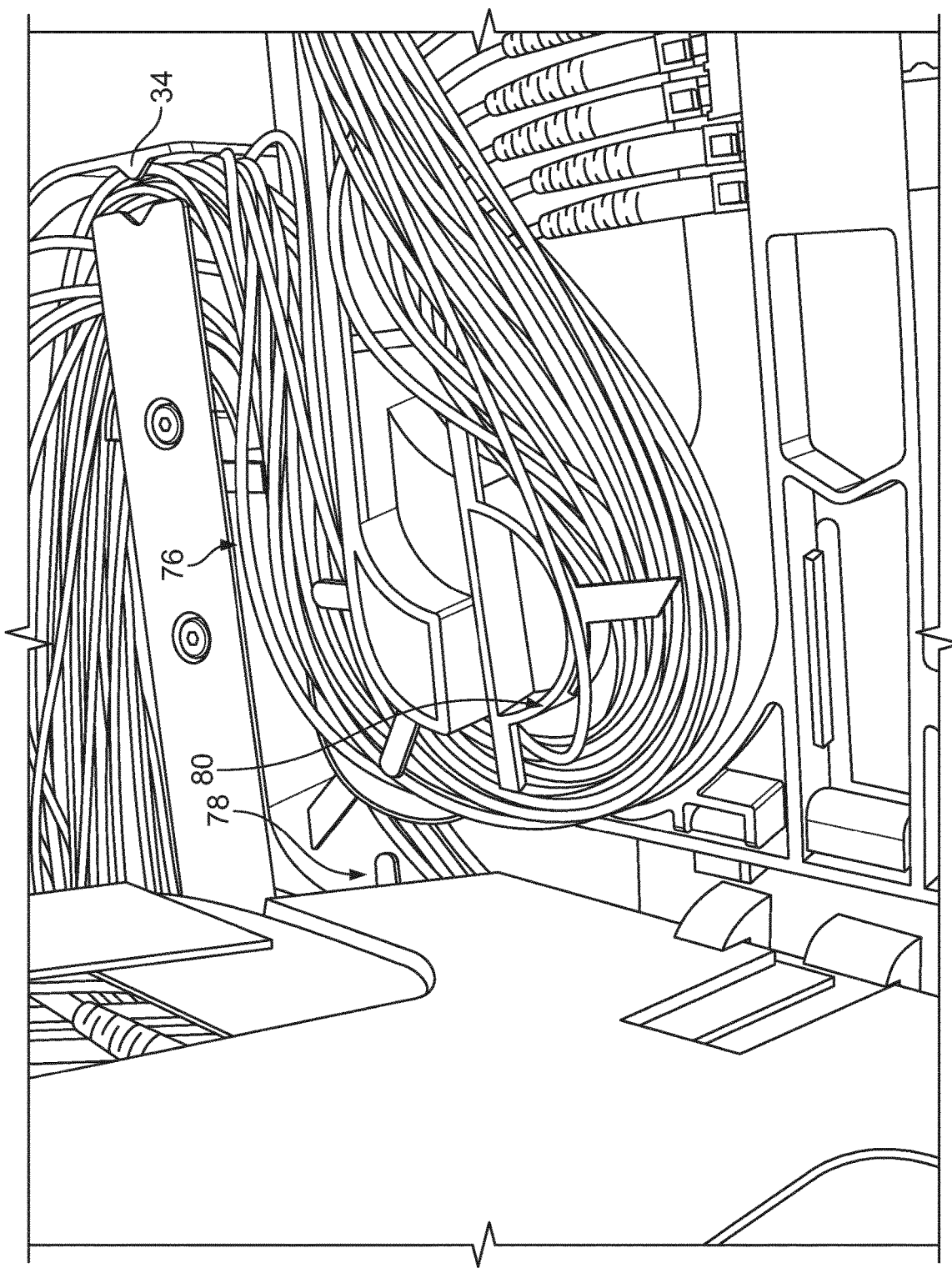
Figure 24:
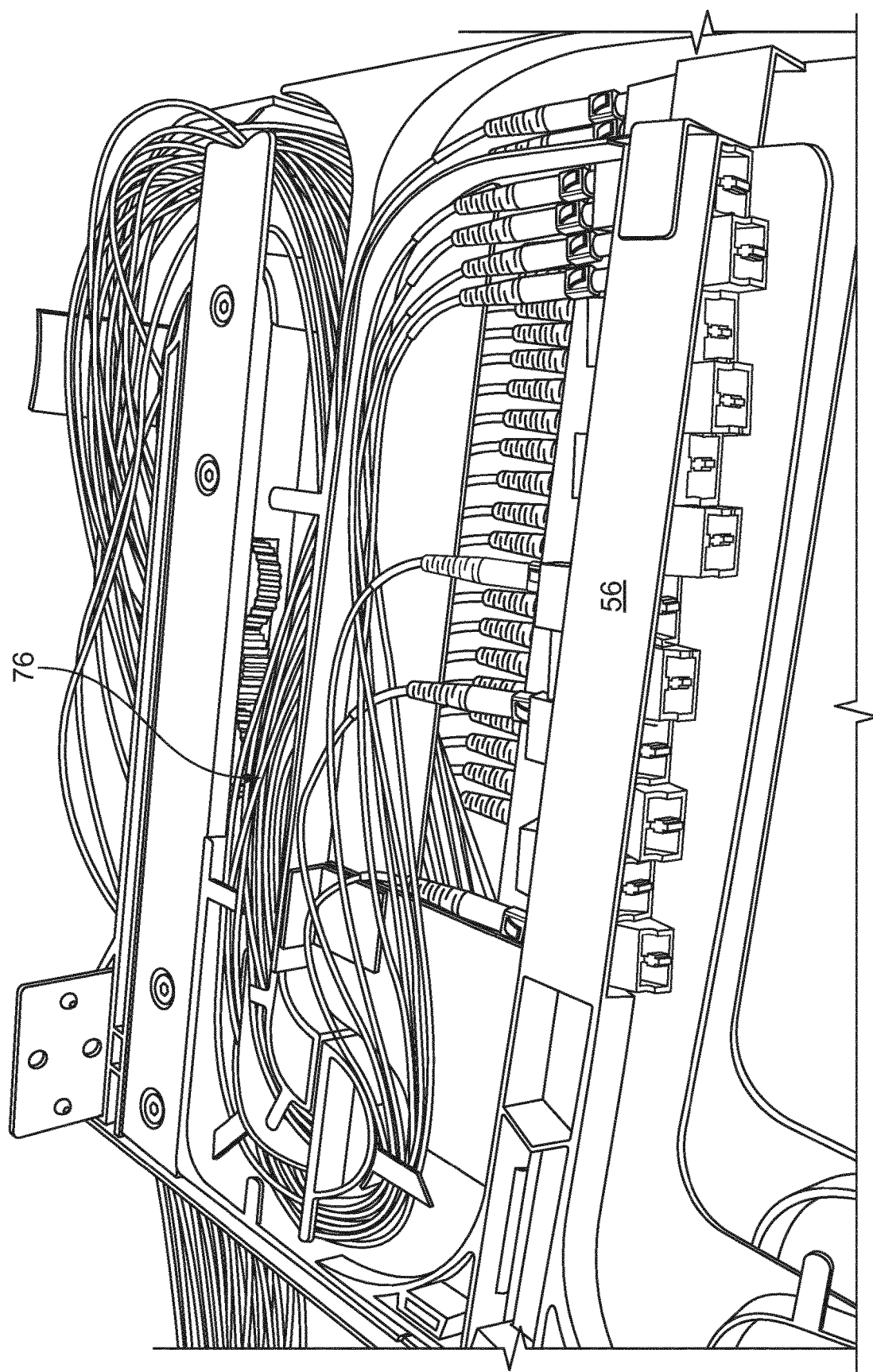
Figure 25:
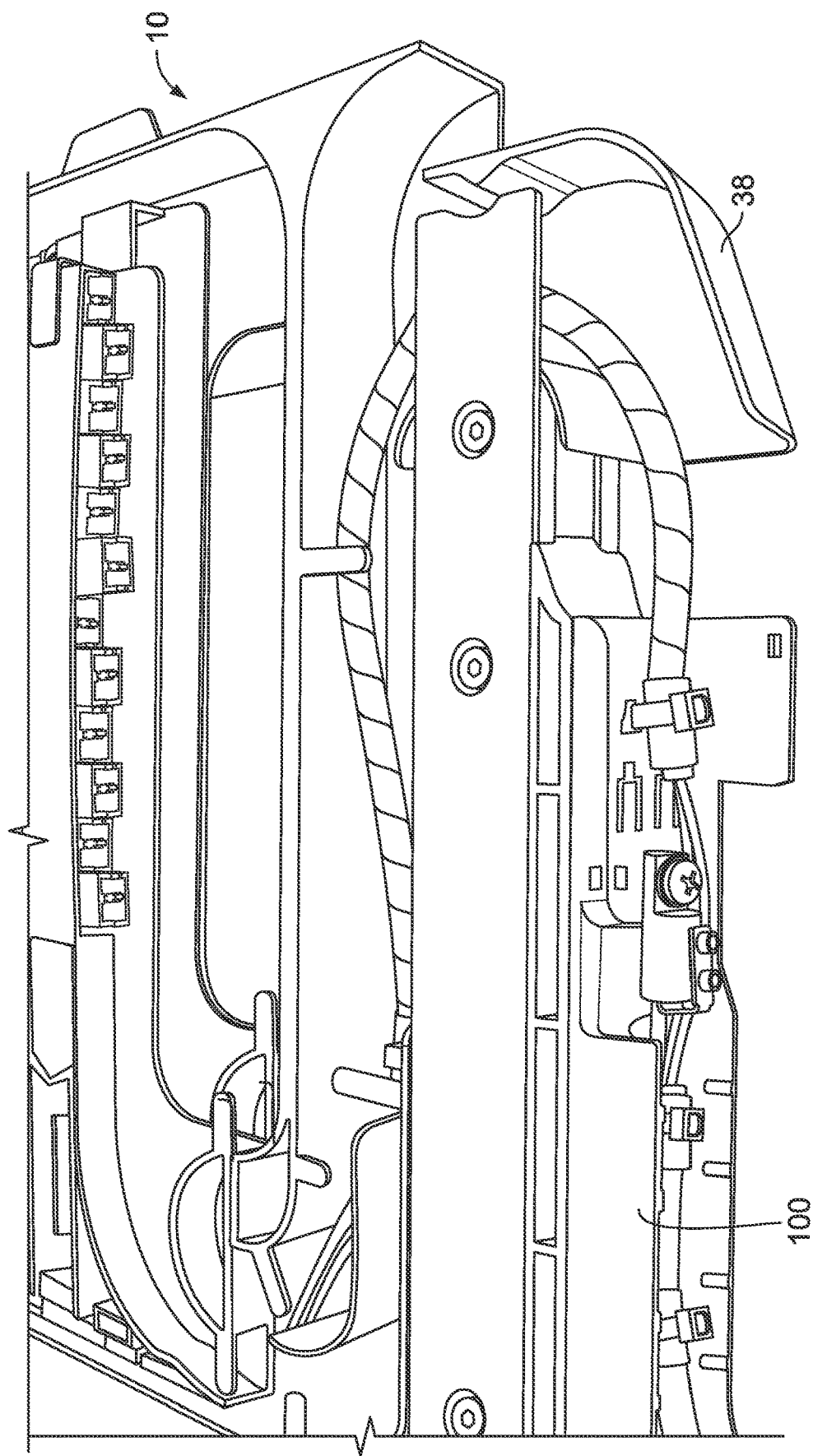
Figure 26:
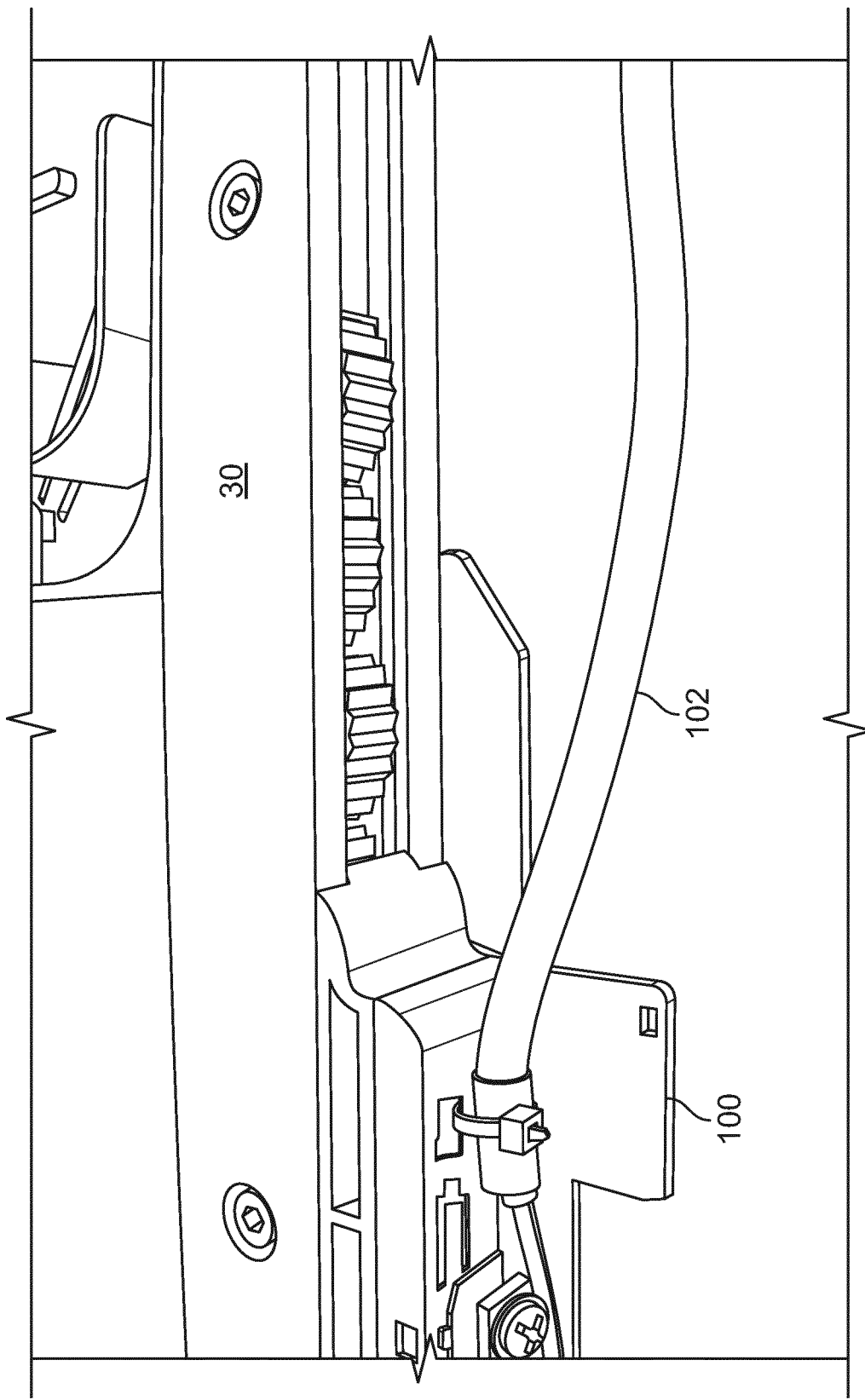
Figure 27:
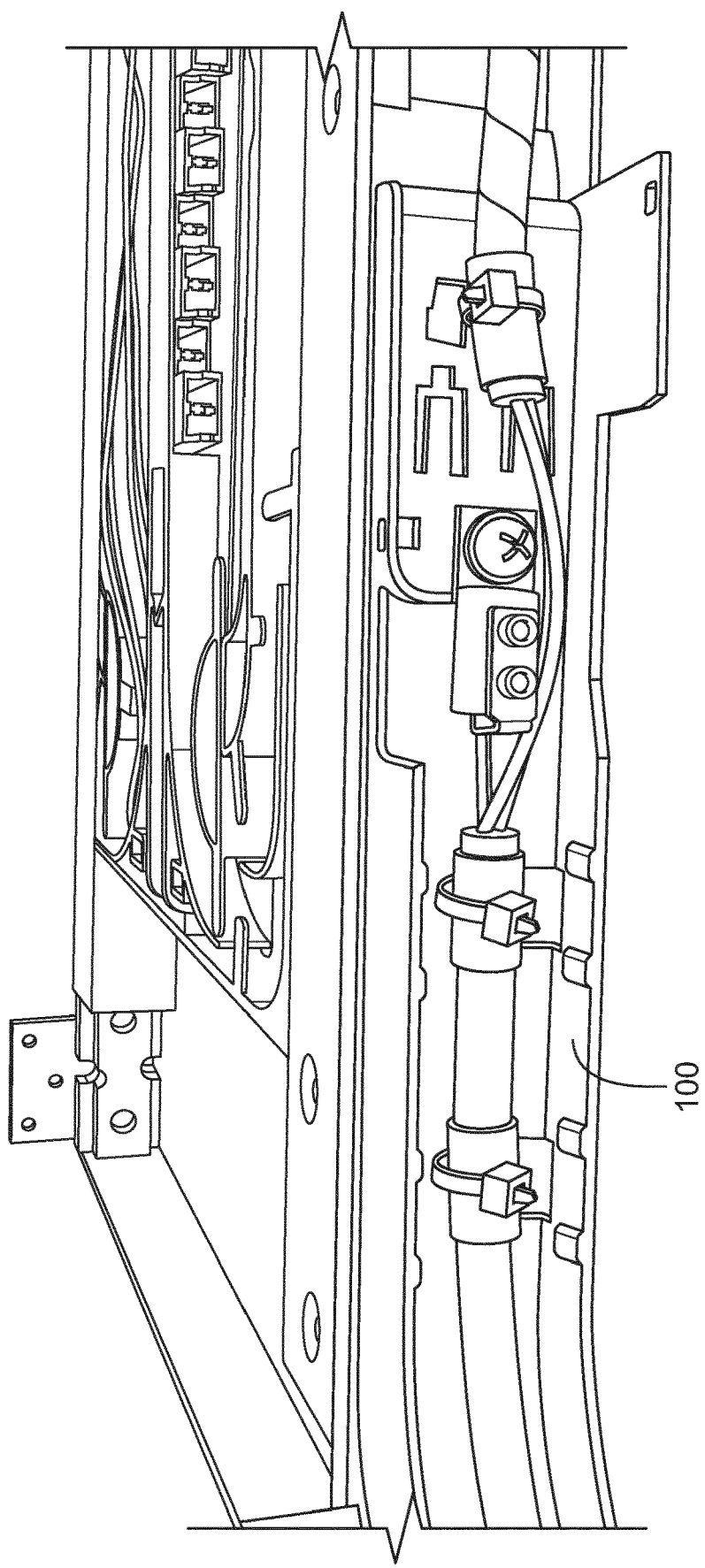
Figure 28:
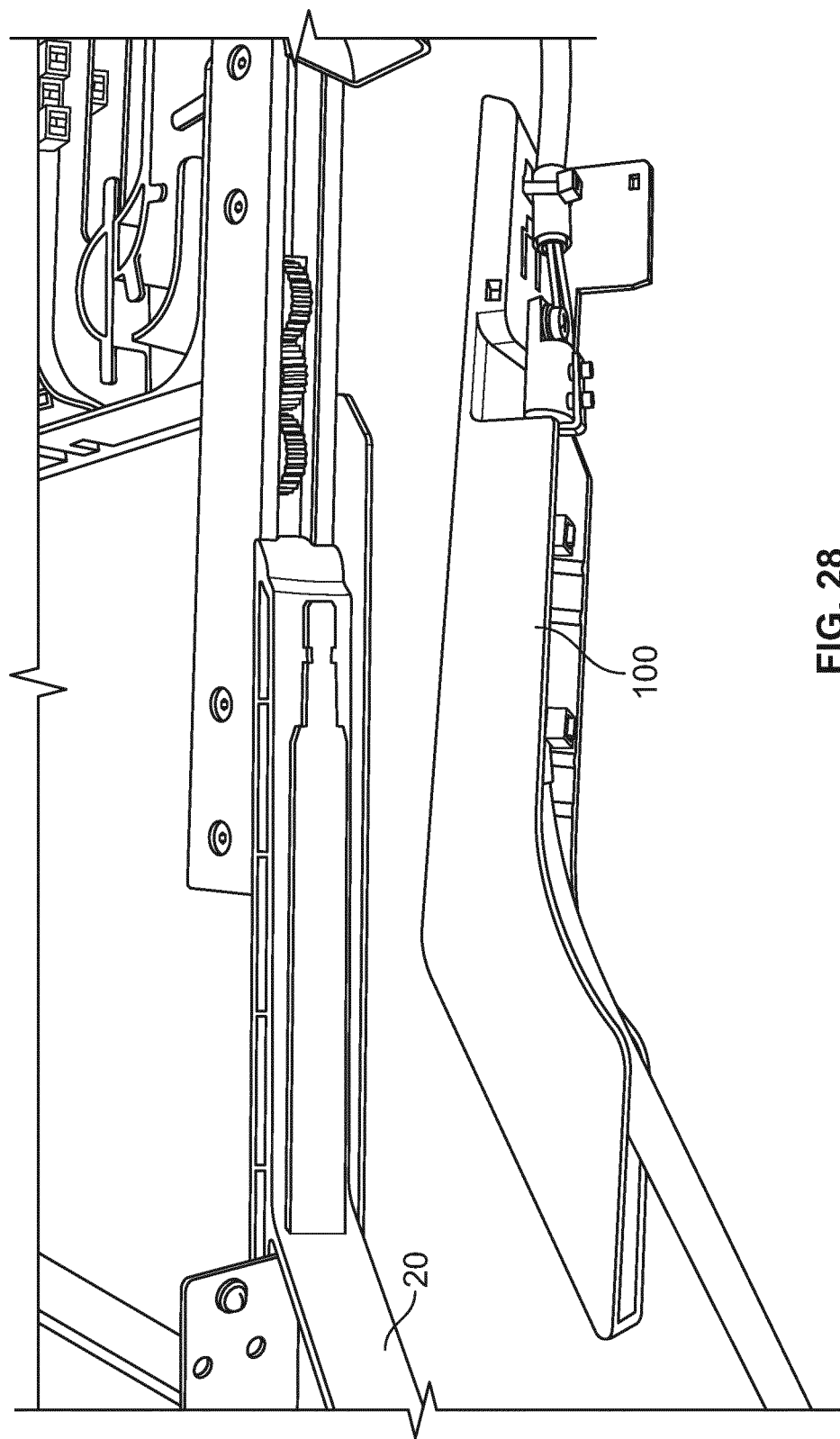
Figure 29:
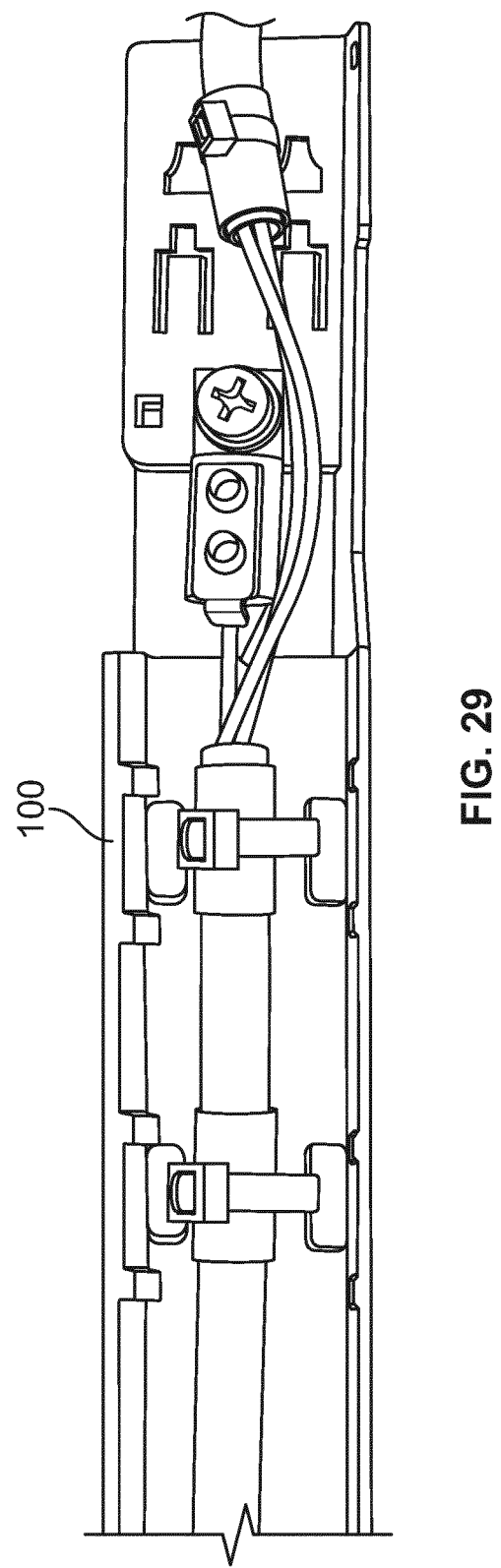
Figure 30:
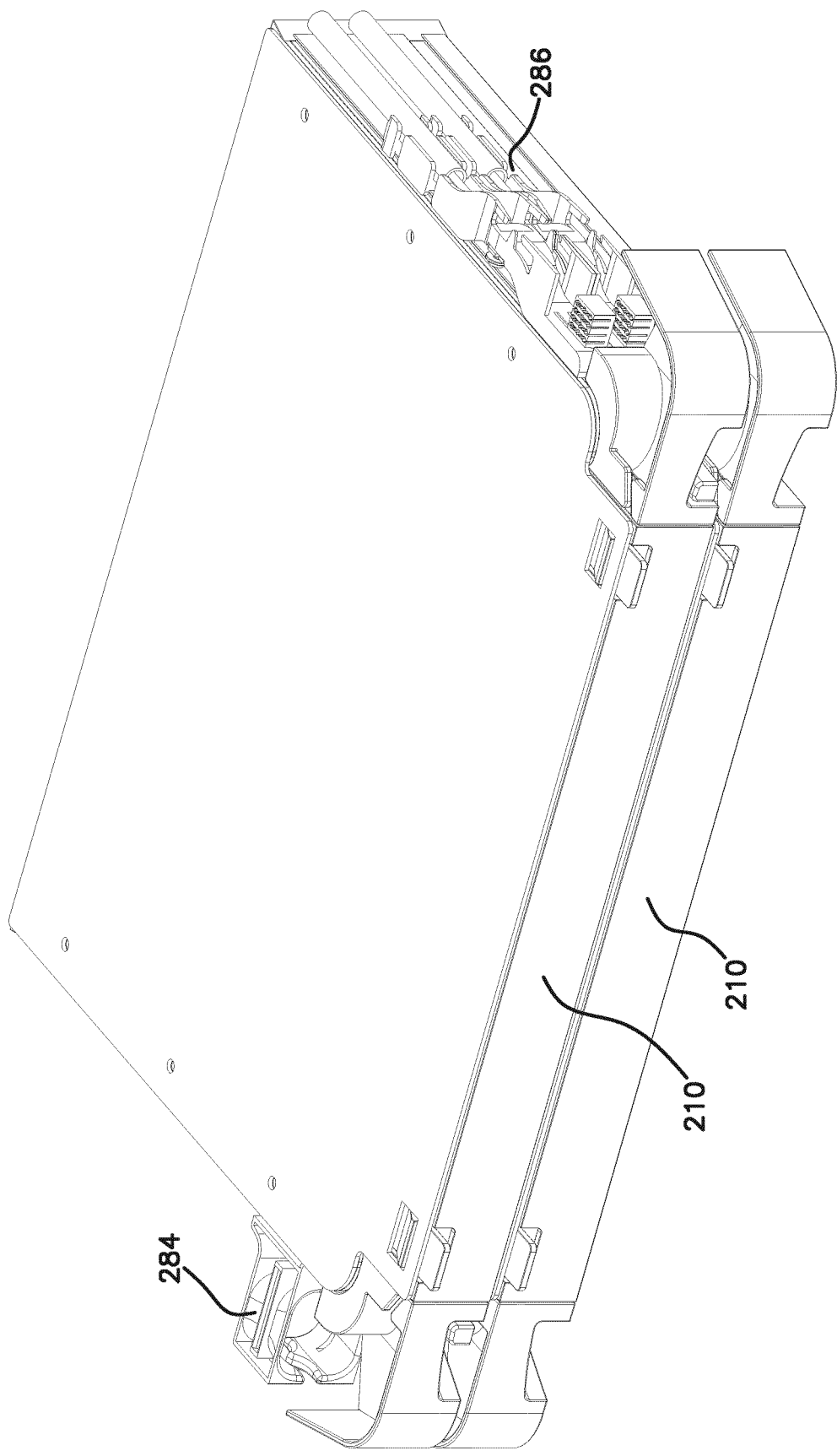
FIG. 30 shows an alternative embodiment of a block of two alternative elements.
Figure 31:
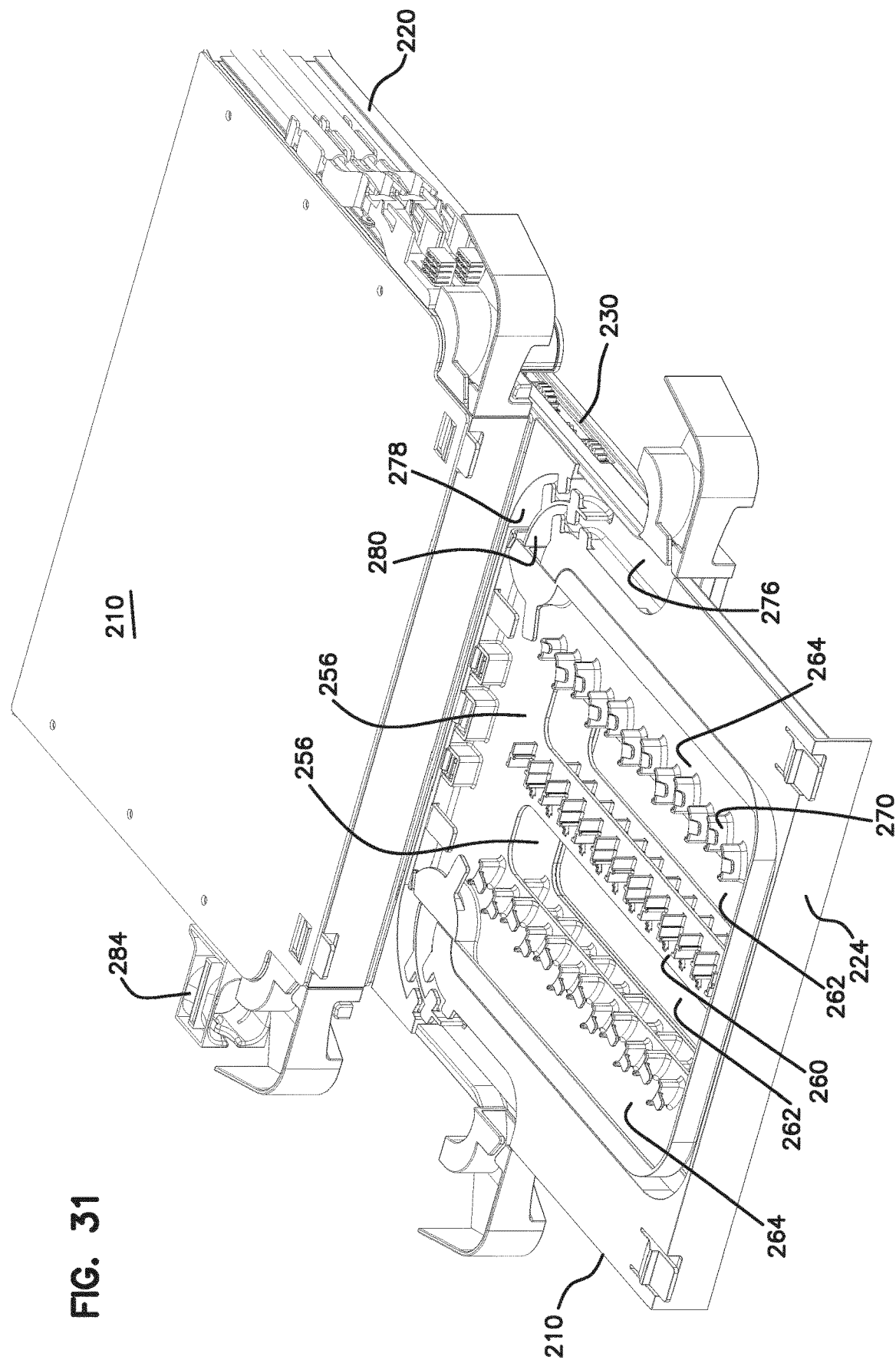
FIG. 31 shows a tray pulled forward from the chassis of one of the elements of the block of FIG. 30.
Figure 32:
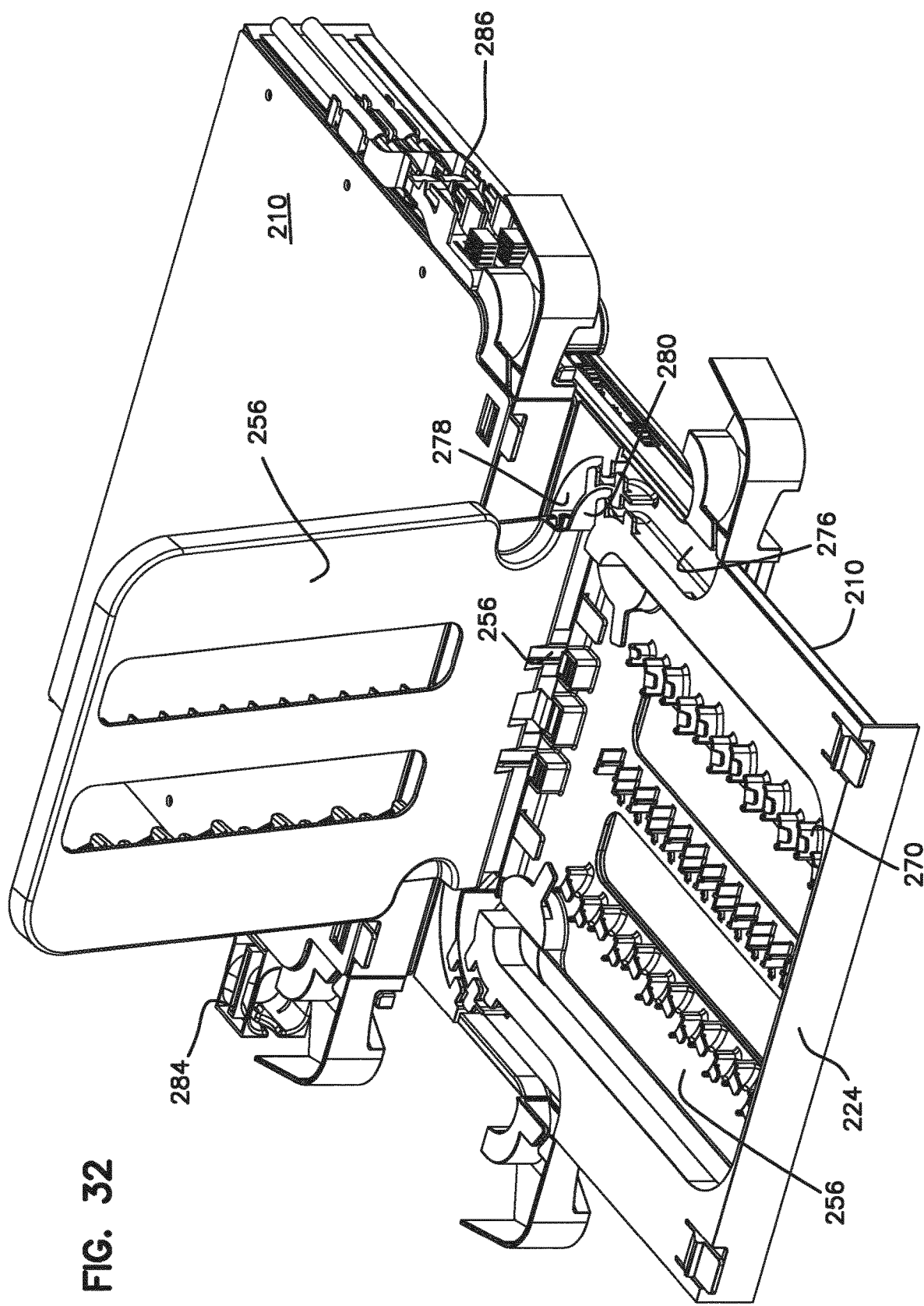
FIG. 32 shows the tray extended forward as in the view of FIG. 31, with one of the frame members pivoted upwardly.
Figure 33:
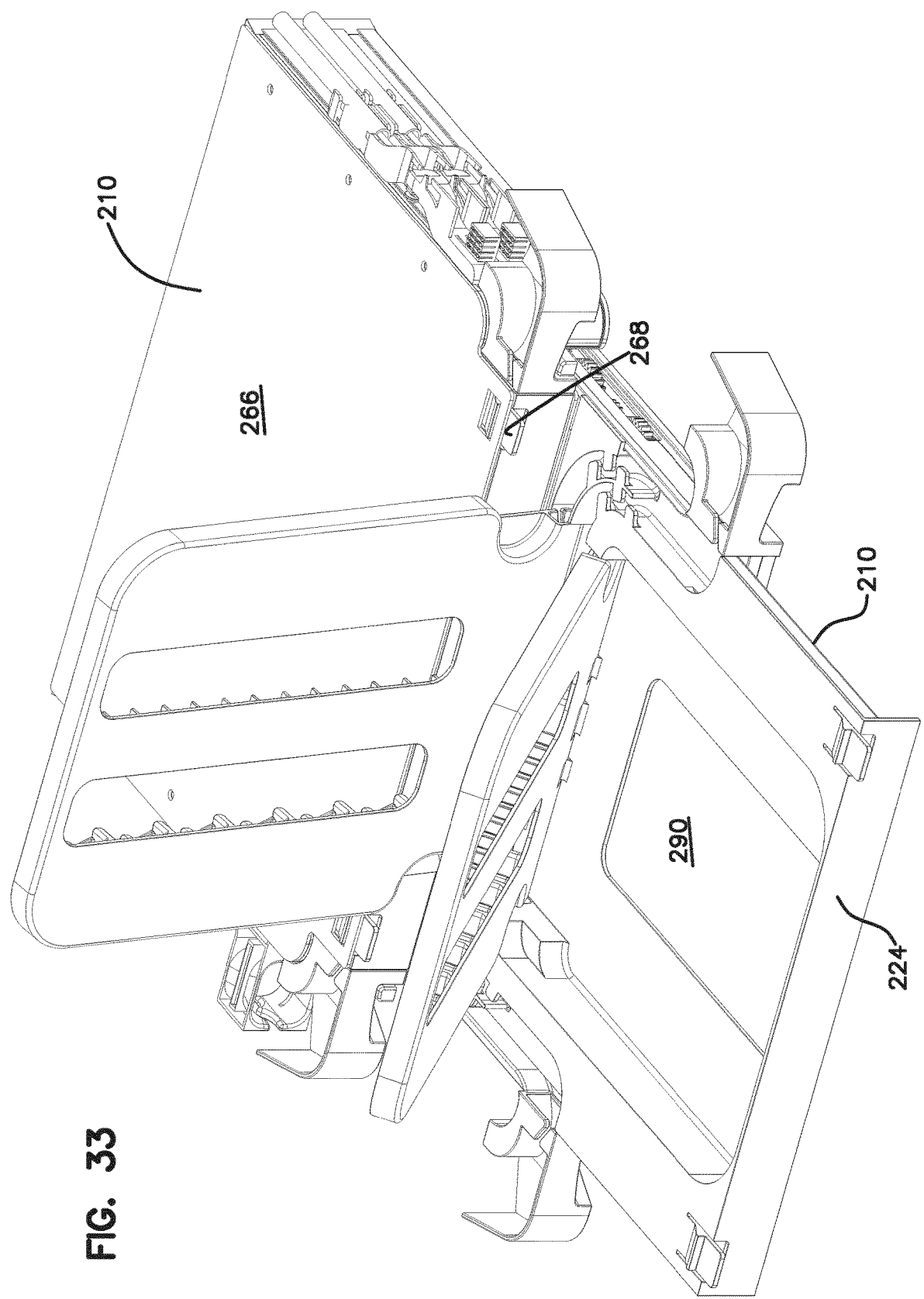
FIG. 33 is a view similar to the view of FIG. 32, with a second frame member pivoted upwardly.
Figure 34:
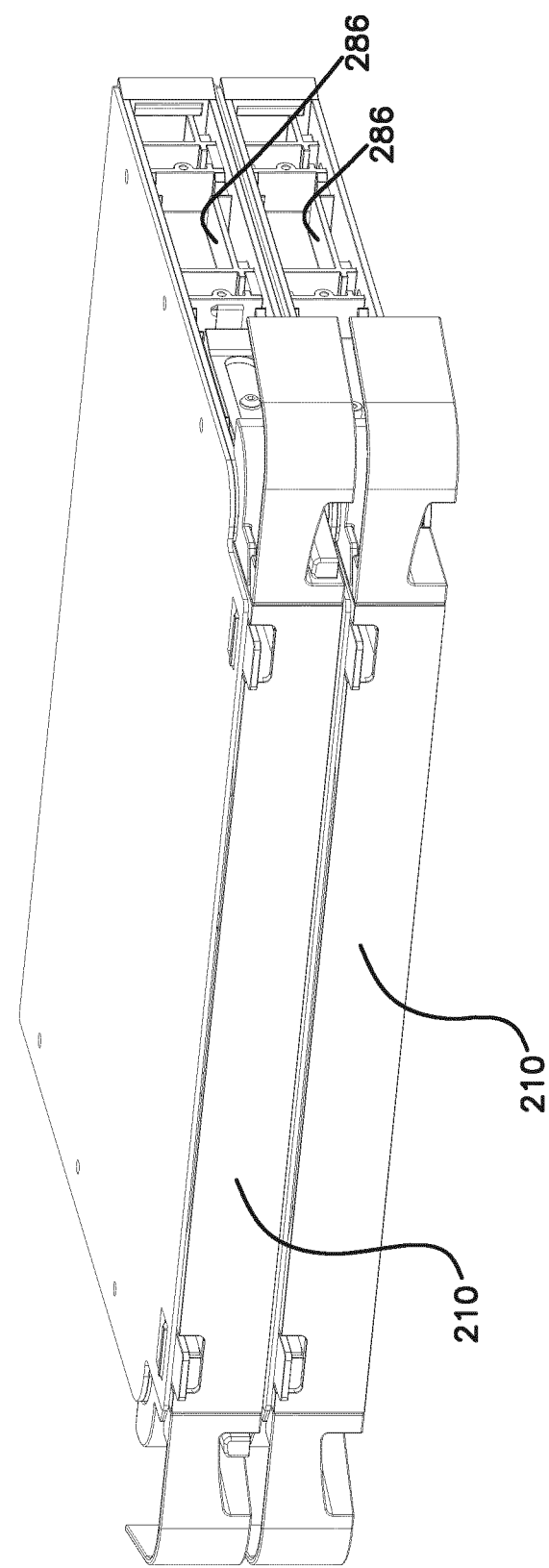
FIG. 34 shows a block including two elements.
Figure 35:
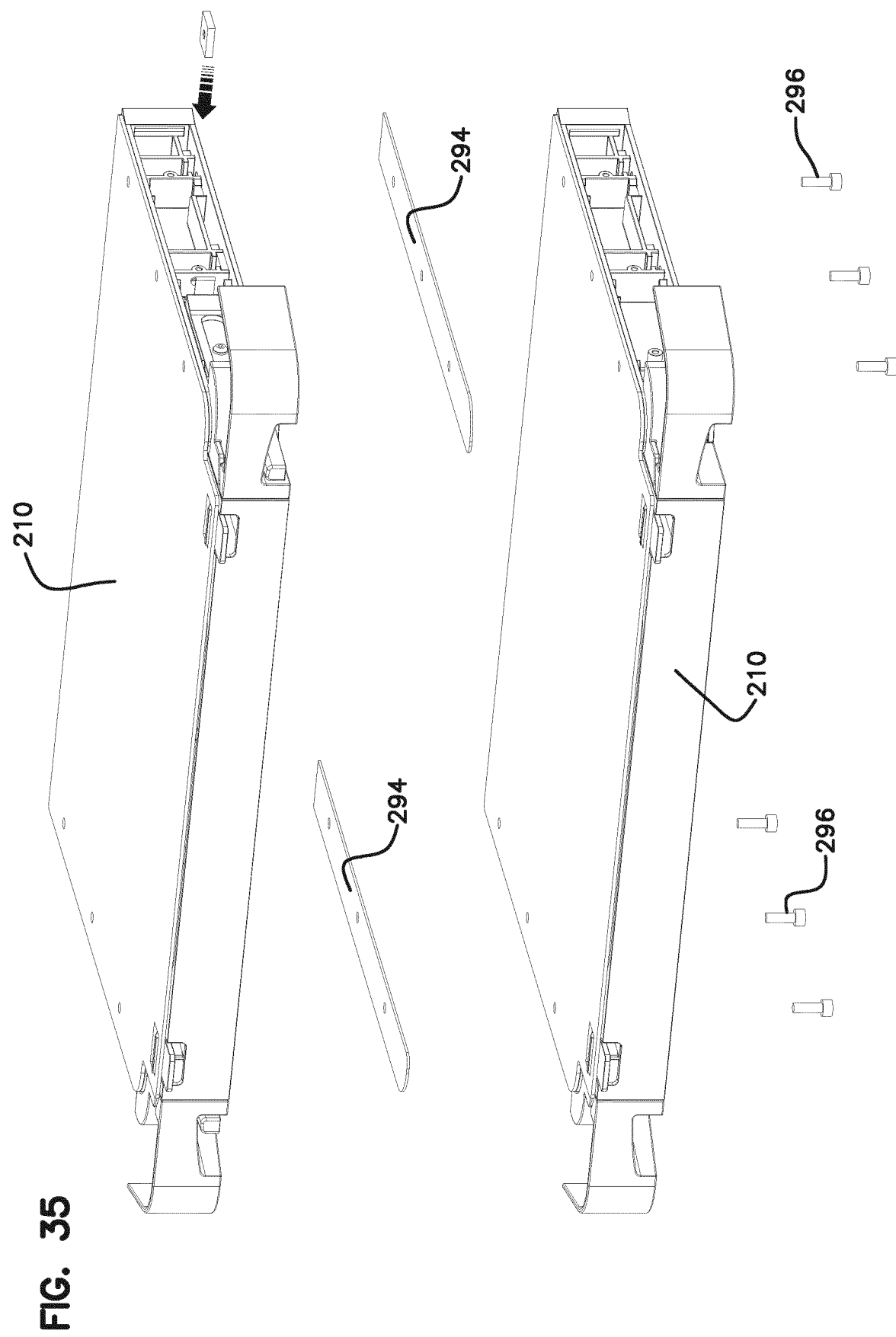
FIG. 35 shows an exploded view of the two elements of the block of FIG. 34.
Figure 36:
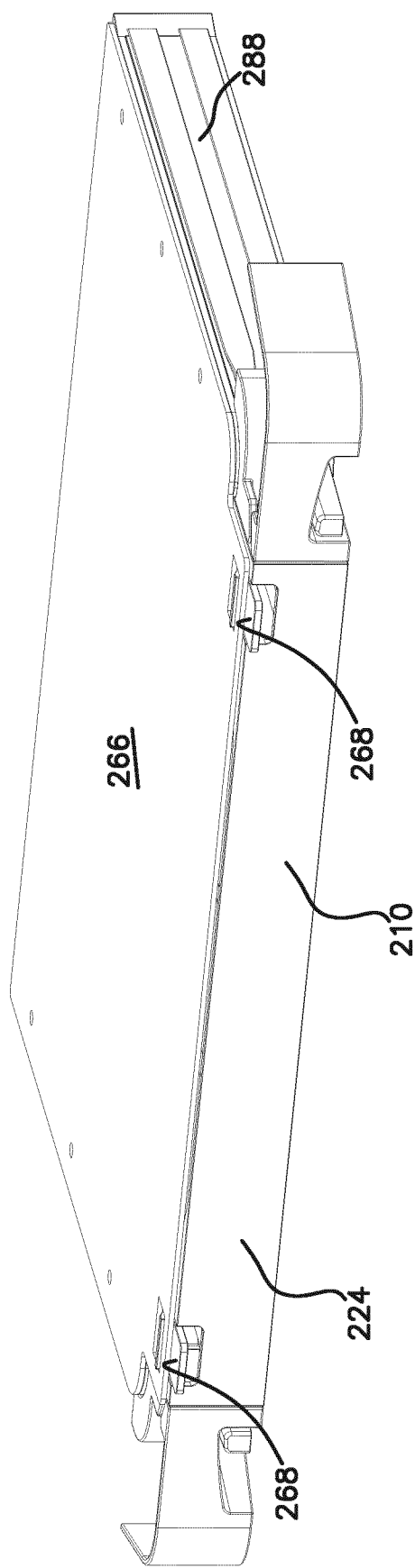
FIG. 36 shows a single element.
Figure 37:
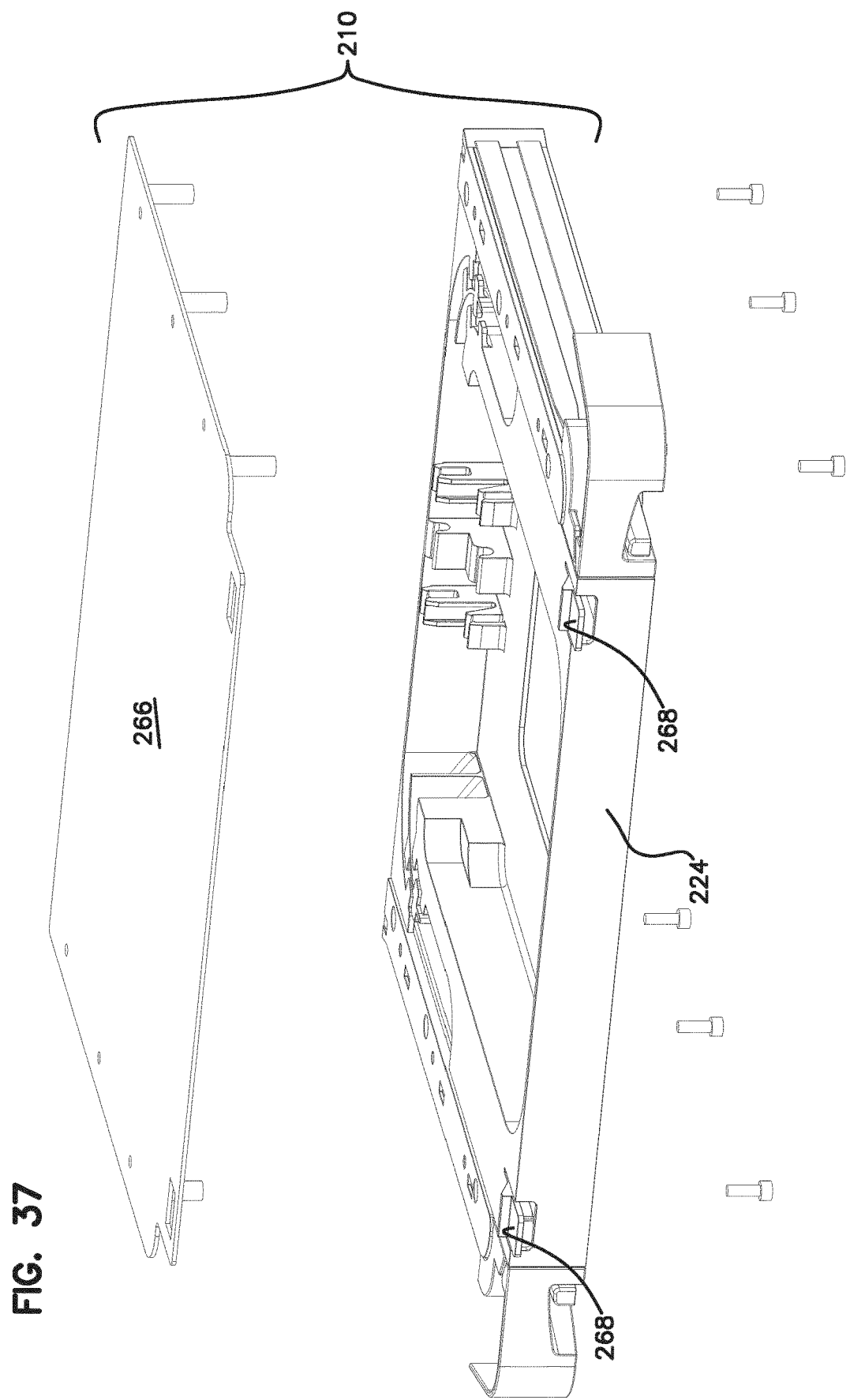
FIG. 37 shows an exploded view of the element of FIG. 36.
Figure 38:
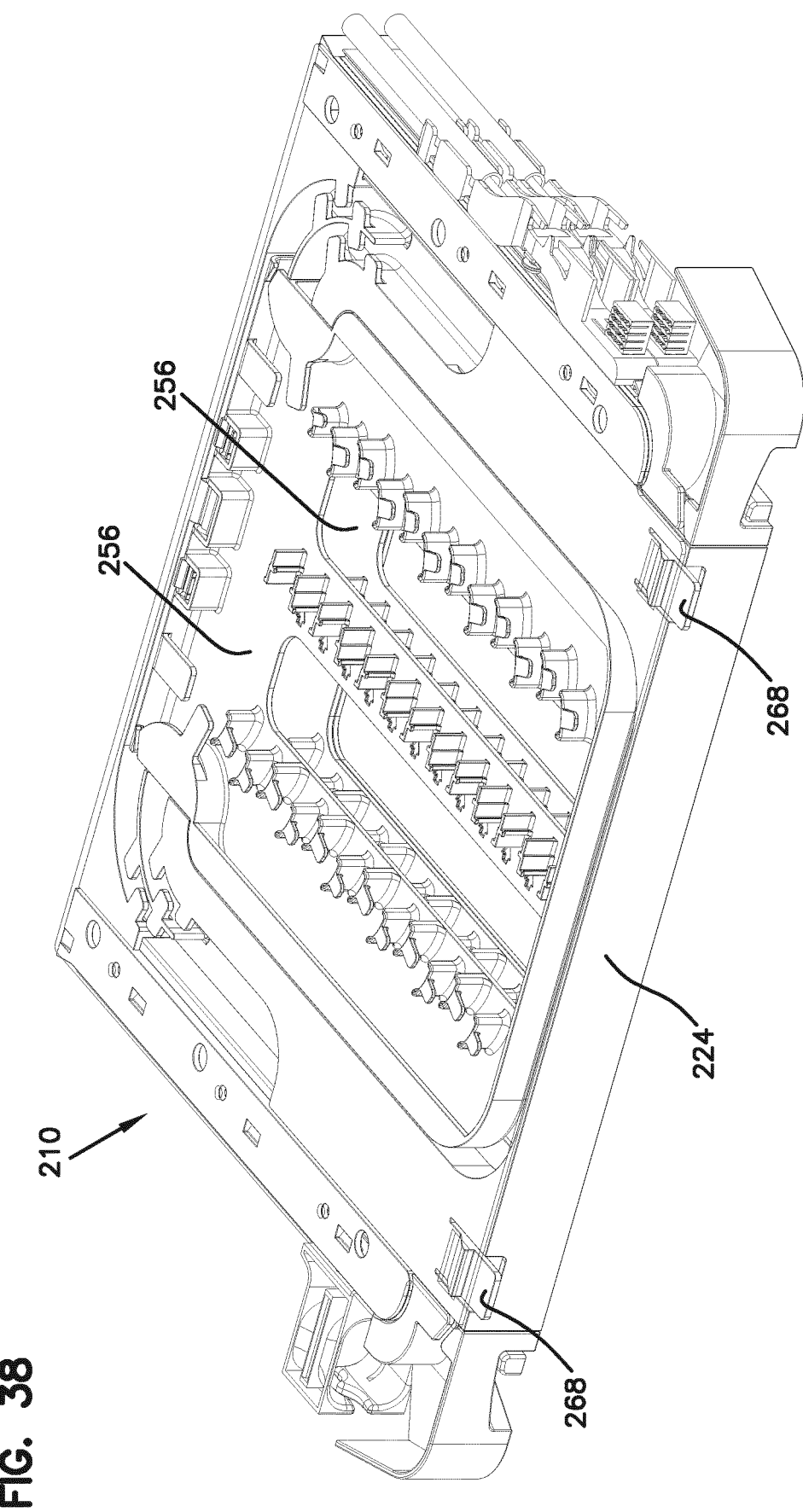
FIG. 38 shows the element of FIG. 37, without the top cover.
Figure 39:
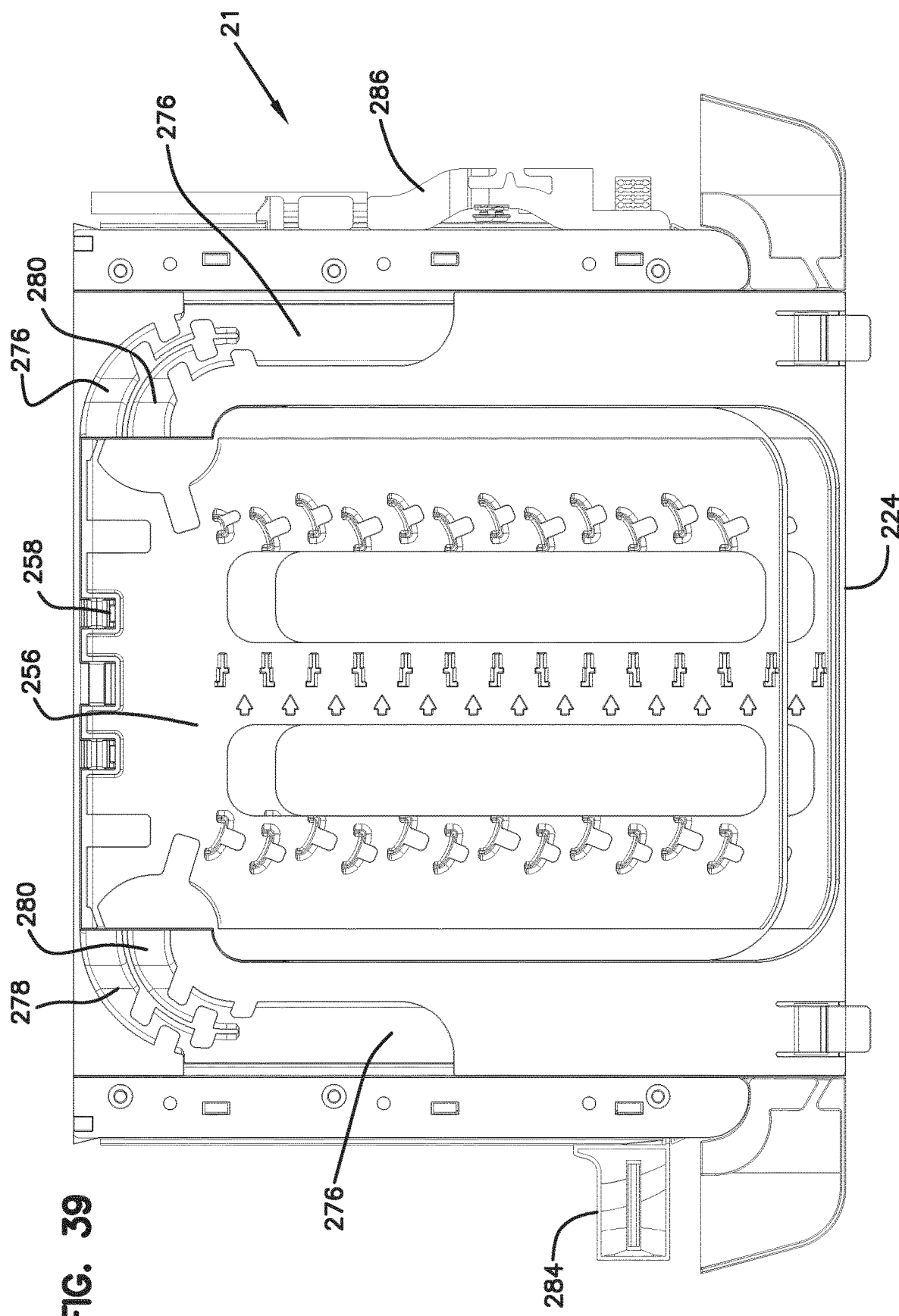
FIG. 39 is a top view of the element of FIG. 38.
Figure 40:
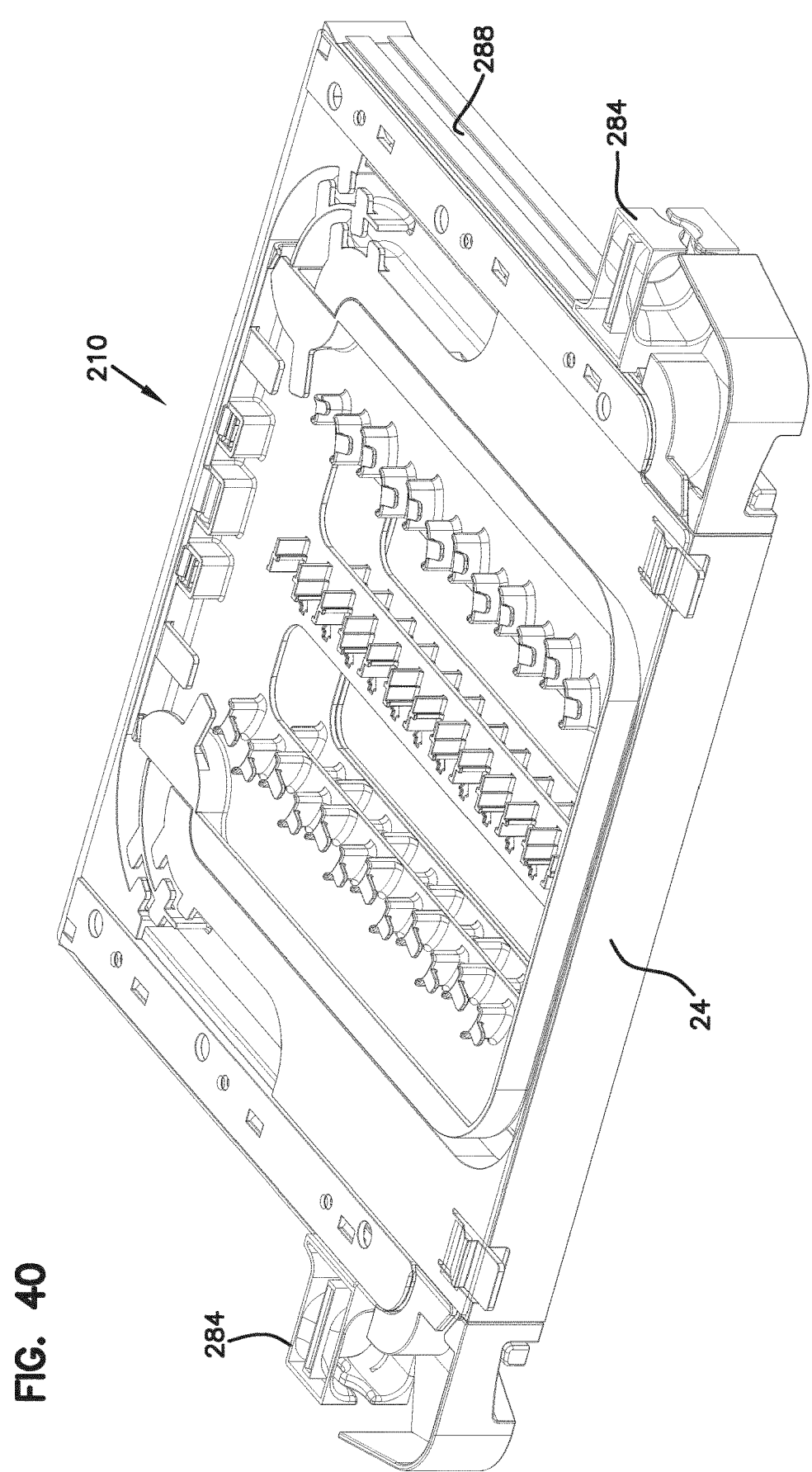
FIG. 40 is an alternative view of the element of FIG. 38, showing alternative devices at the cable entry points.
Figure 41:
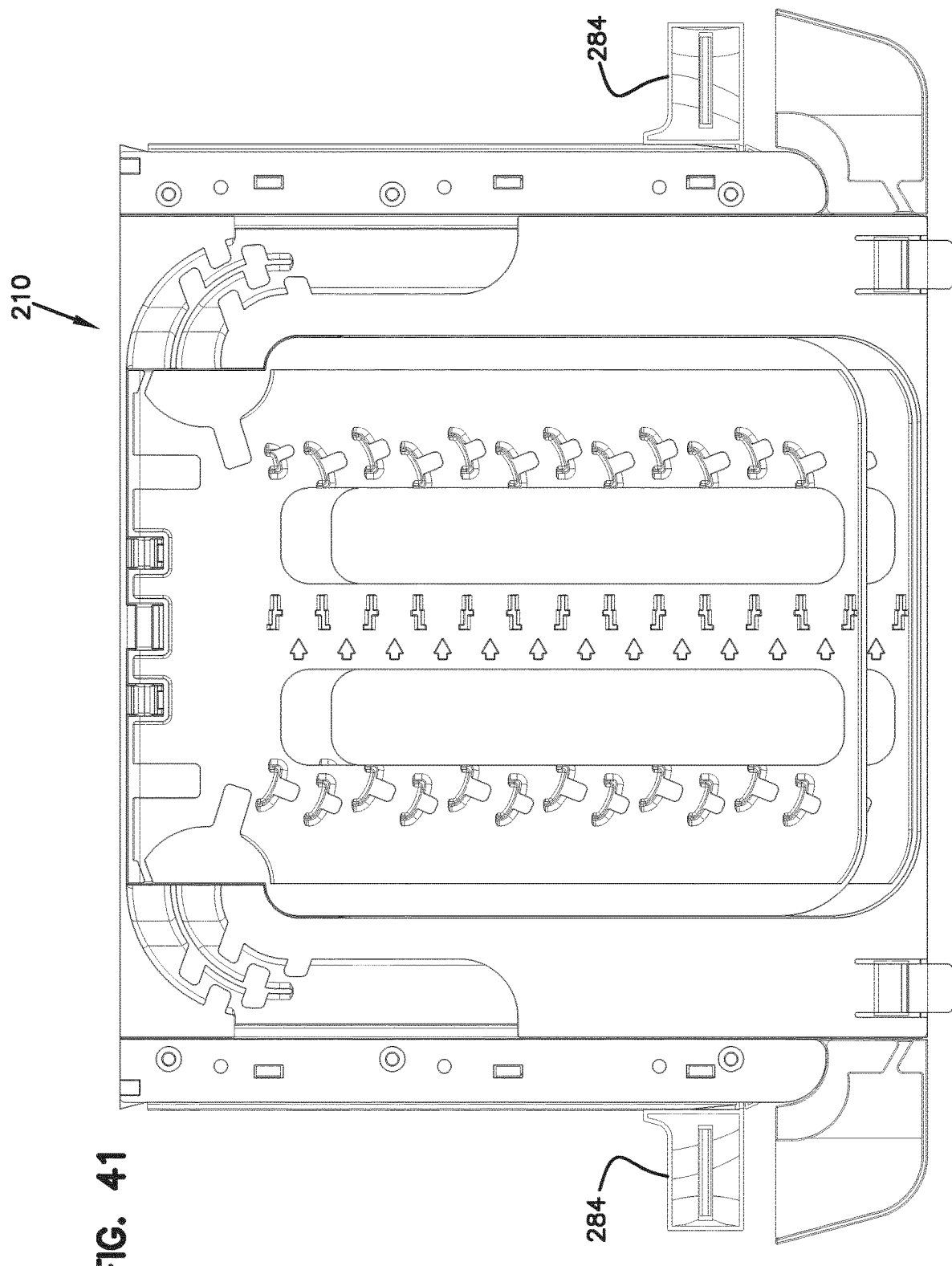
FIG. 41 is a top view of the element of FIG. 40.
Figure 42:
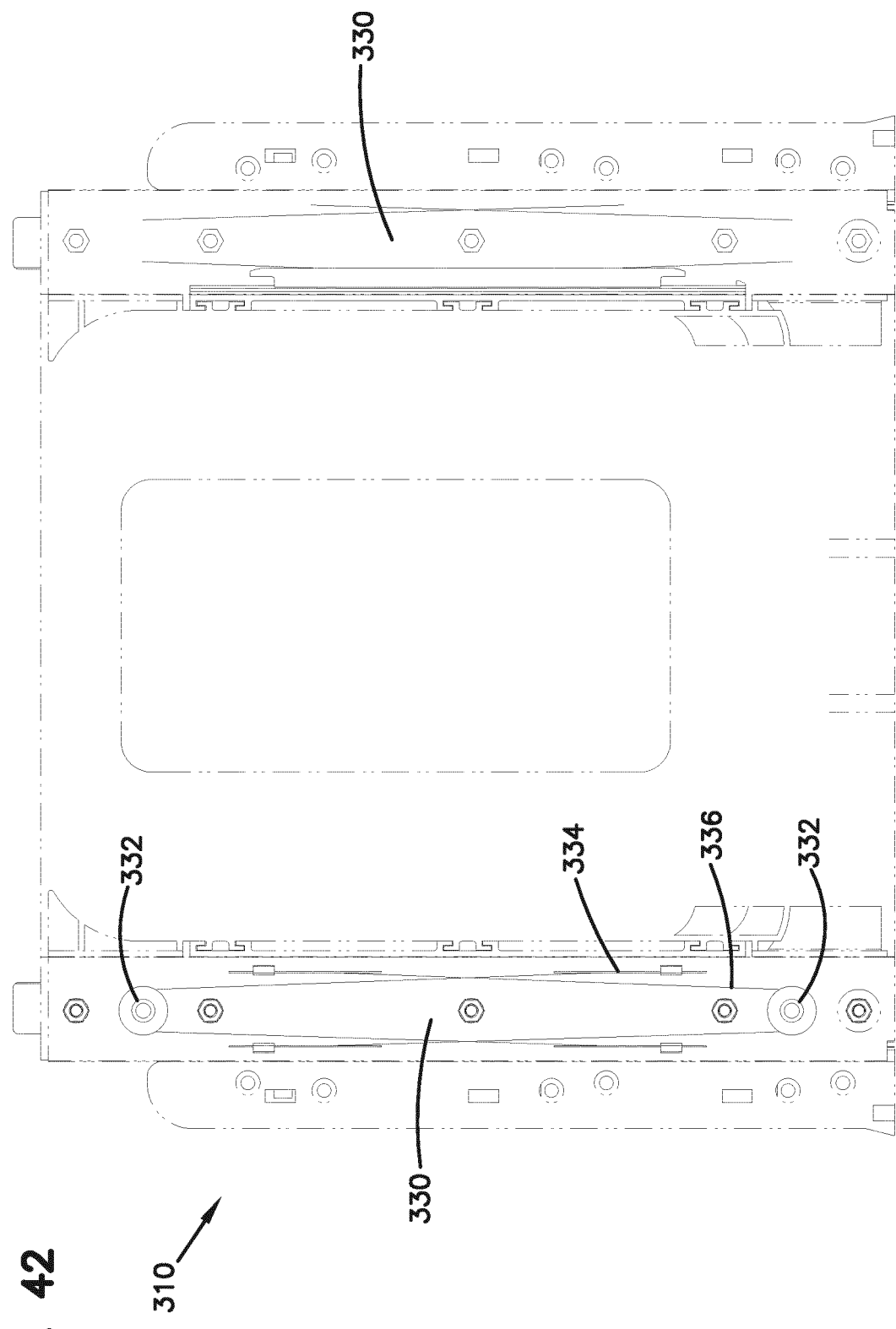
FIG. 42 shows an alternative embodiment of an element in a top view with an alternative synchronized movement feature.
Figure 43:
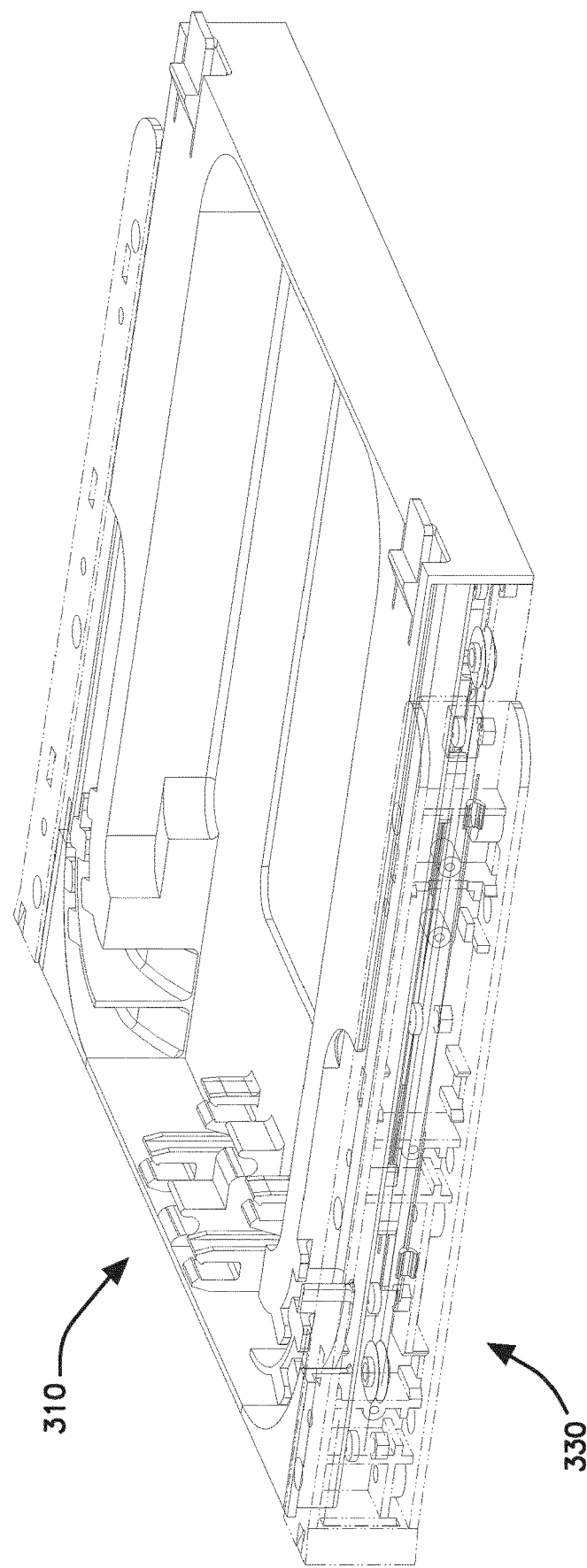
FIG. 43 is a perspective view of the element of FIG. 42.
Figure 44:
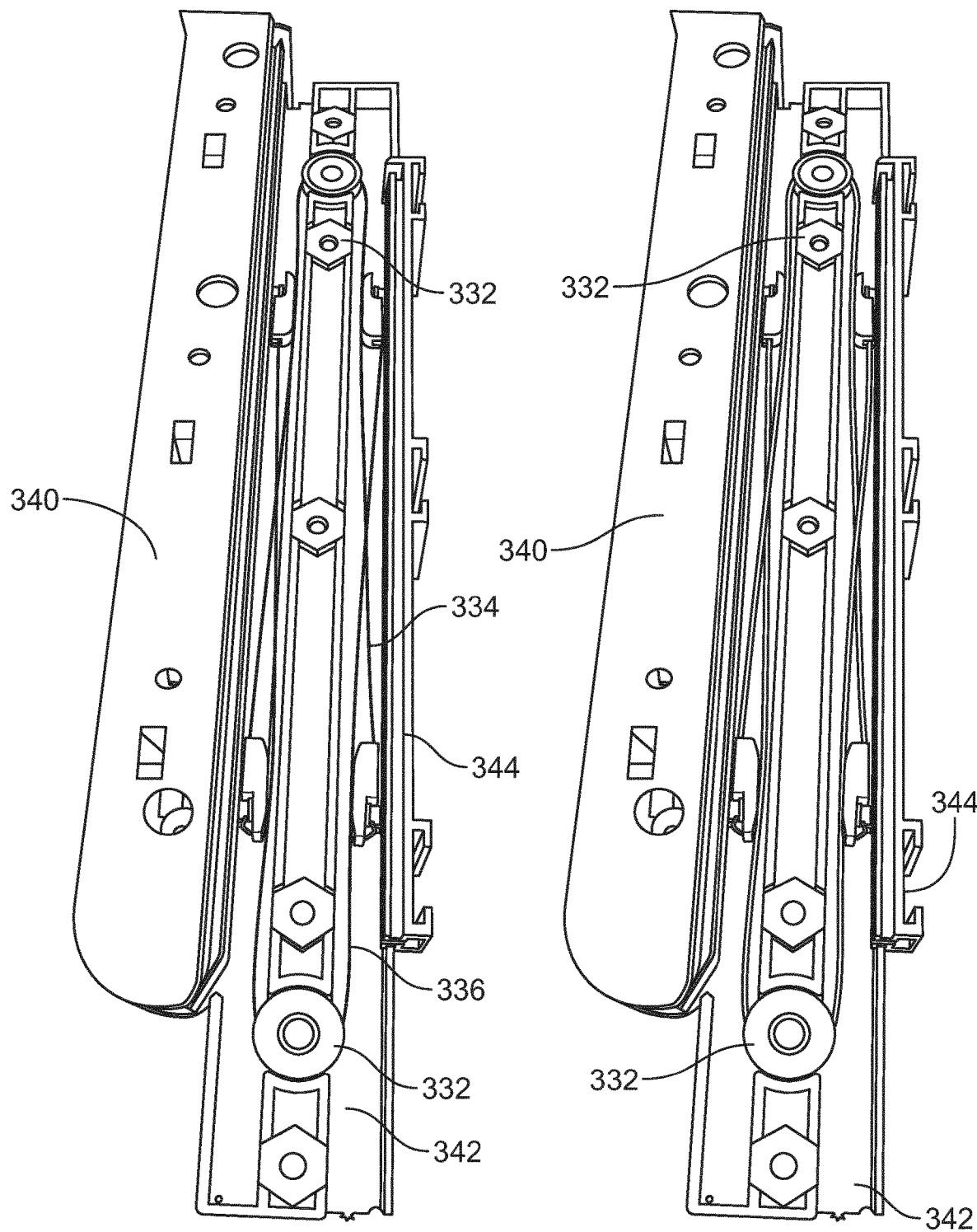
FIGS. 44 and 45 show movement of the various components of the synchronized movement feature of FIGS. 42 and 43.
Figure 45:
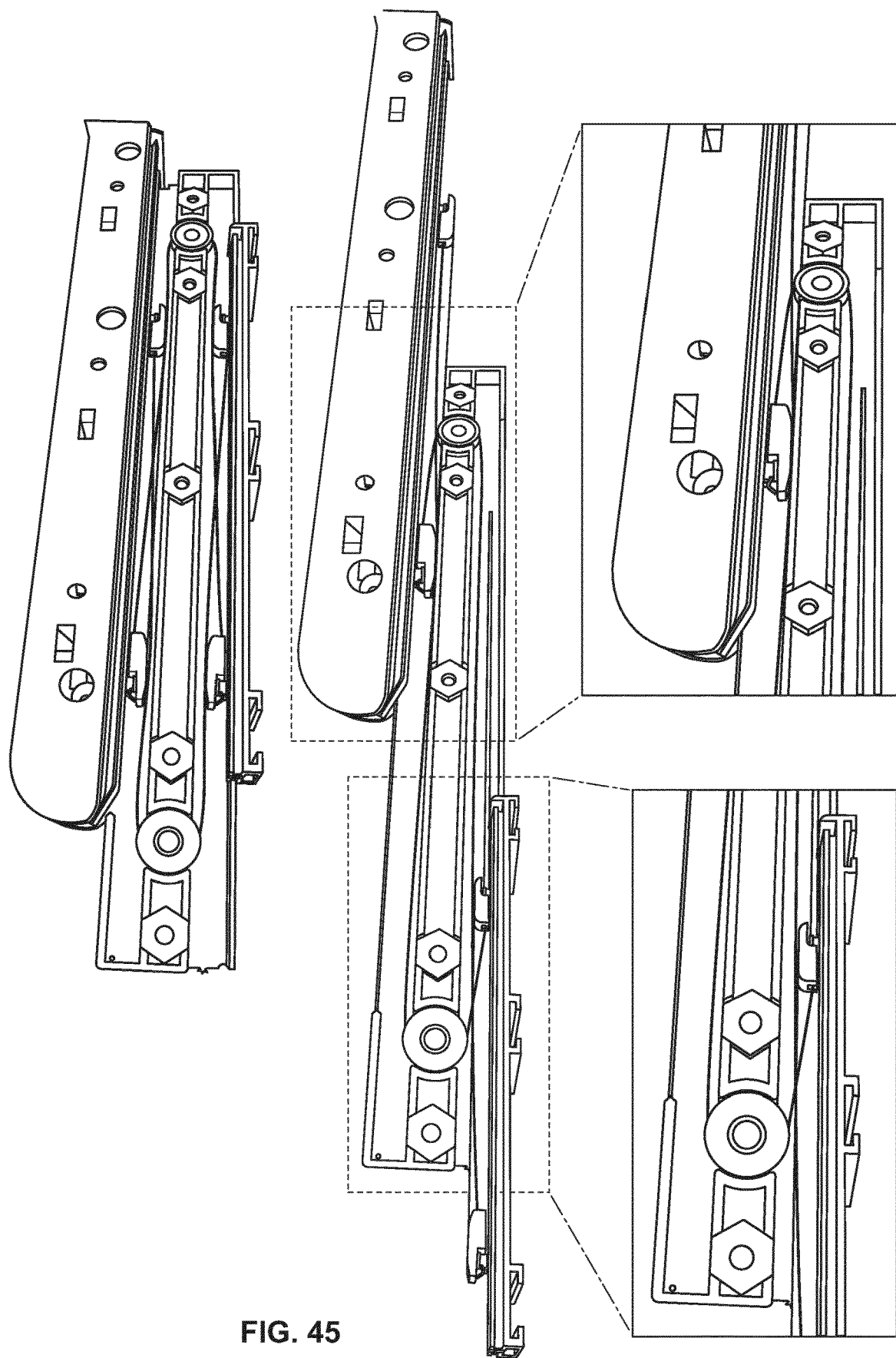

Referring now to FIGS. 1-16, various embodiments of an optical fiber distribution element 10, or element 10, are shown. The elements 10 can be individually mounted as desired to telecommunications equipment including racks, frames, or cabinets. The elements 10 can be mounted in groups or blocks 12 which forms a stacked arrangement. In one embodiment, a vertical stack of elements 10 populates an optical fiber distribution rack.

Each element 10 holds fiber terminations, or other fiber components including fiber splitters and/or fiber splices. In the case of fiber terminations, incoming cables are connected to outgoing cables through connectorized cable ends which are connected by adapters, as will be described below.

Each element includes a chassis 20 and a movable tray 24. Tray 24 is movable with a slide mechanism 30 including one or more gears 32 and a set of two toothed racks or linear members 34.

Slide mechanism 30 provides for synchronized movement for managing the cables extending to and from tray 24. Entry points 36 on either side of chassis 20 allow for fixation of the input and output cables associated with each element 10. The radius limiters 38 associated with each slide mechanism 30 move in synchronized movement relative to chassis 20 and tray 24 to maintain fiber slack, without causing fibers to be bent, pinched, or pulled.

Each tray 24 includes mounting structure 50 defining one or more of fiber terminations, fiber splitters, fiber splices, or other fiber components. As shown, mounting structure 50 holds adapters 52 which allow for interconnection of two connectorized ends of cables. Each tray 24 includes one or more frame members 56. In the example shown, two frame members 56 are provided. As illustrated, each frame member 56 is T-shaped. Also, each tray 24 includes two frame members 56 which are hingedly mounted at hinges 58. A top frame member 62 is positioned above a bottom frame member 64. The mounting structure 50 associated with each frame member 62, 64 includes one or more integrally formed adapter blocks 70. Adapter blocks 70 include a plurality of adapter ports for interconnecting to fiber optic connectors 72. A pathway 76 defines a generally S-shape from radius limiters 38 to adapter blocks 70. As shown, pathway 76 includes an upper level 78 and a lower level 80 in the interior. A portion 84 of pathway 76 is positioned adjacent to hinges 58 to avoid potentially damaging cable pull during pivoting movement of frame members 56. Flanges 86 and radius limiters 90 help maintain cables 74 in pathways 76.

Tray 24 includes openings 96 to allow for technician access to the cable terminations at adapter blocks 70. In addition, the T-shapes of frame members 56 further facilitate technician access to the connectors 72.

Cables 74 extending to and from element 10 can be affixed with a cable mount 100 as desired. Additional protection of the fiber breakouts can be handled with cable wraps 102. Radius limiters 106 can be additionally used to support and protect the cables 74.

Referring now to FIGS. 17-29, various examples of cable routings are illustrated for element 10.

If desired, more than one feeder cable can supply cabling to more than one element 10.

Referring now to FIGS. 30-41, various additional embodiments of elements 210 are shown. Element 210 includes a chassis 220 in a movable tray 224 mounted with a slide mechanism 230 which promotes synchronized movement of radius limiters 238. Each tray 224 includes two hingedly mounted frame members 256. Each frame member 256 has a middle portion 260 separated by openings 262 from side portions 264. Middle portion 260 can hold fiber terminations. Side portions 264 include radius limiters 270. Cover 266 goes over tray 224. Latches 268 latch tray 224 to cover 266 in the closed position.

A pathway 276 extends from either side from tray 224 to supply cables to each of trays 224. An upper level 278 and a lower level 280 supply the respective frame members 256 with cabling. A general S-shaped pathway 276 is defined wherein the pathway 276 passes close to hinges 258.

A dovetail 288 is used to hold cable mounts 286 and radius limiters 284.

An opening 290 in tray 224 allows for connector access by the technician. Similarly, openings 262 on each frame member 256 allow for technician access to the individual connectors.

To form a block 292 of plural elements 210, bars 294 and fasteners 296 are used. Bars 294 give a small spacing between each element 210.

Referring now to FIGS. 42-45, an alternative slide mechanism 330 is shown in alternative element 310. Slide mechanism 330 allows for movement of the trays and related radius limiters and synchronized movement similar to slide mechanism 30, 230. Alternative slide mechanism 330 includes two wheels 332 and two wires 334, 336. The wheels 332 are located on second part 342. The wires are looped in opposite directions and are connected to the first part 340 and the third part 344.

Figure 46:
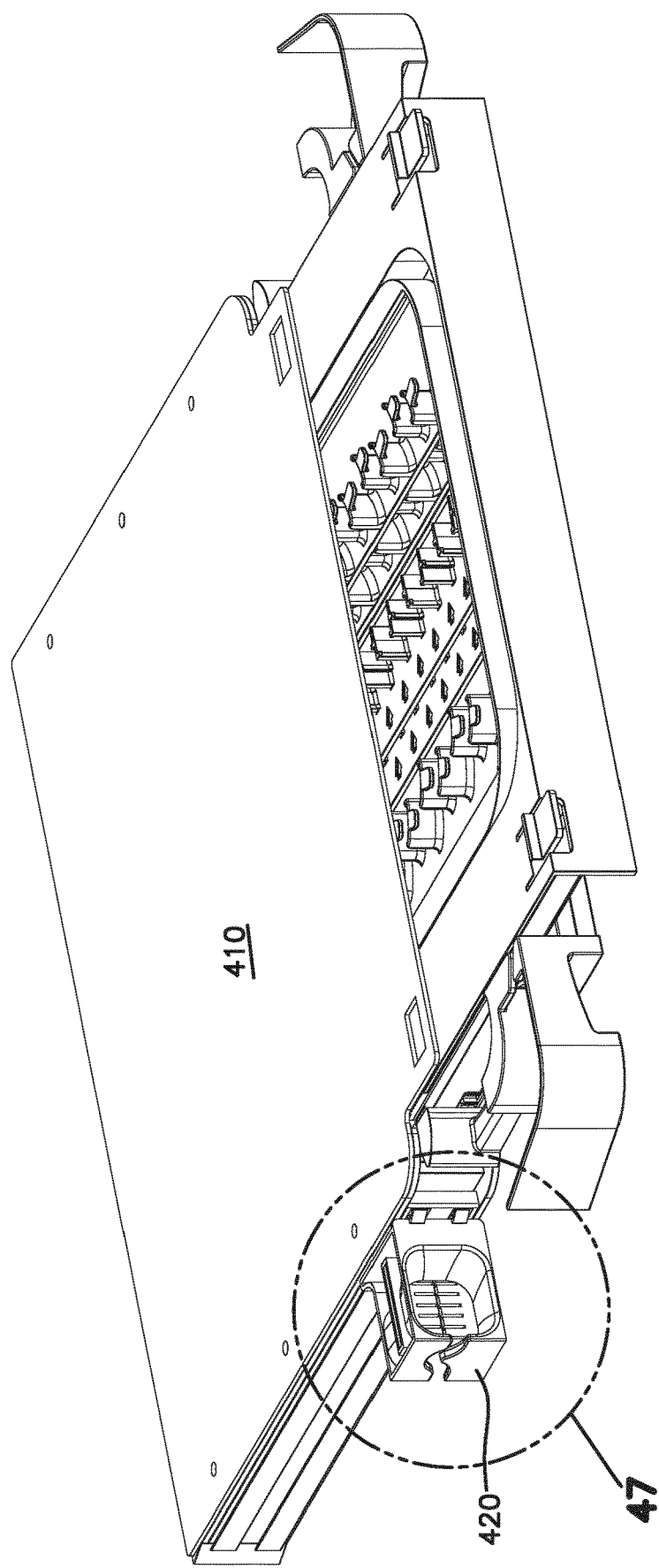
FIGS. 46 and 47 show an element with an alternative radius limiter at the cable entry and exit locations.
Figure 47:
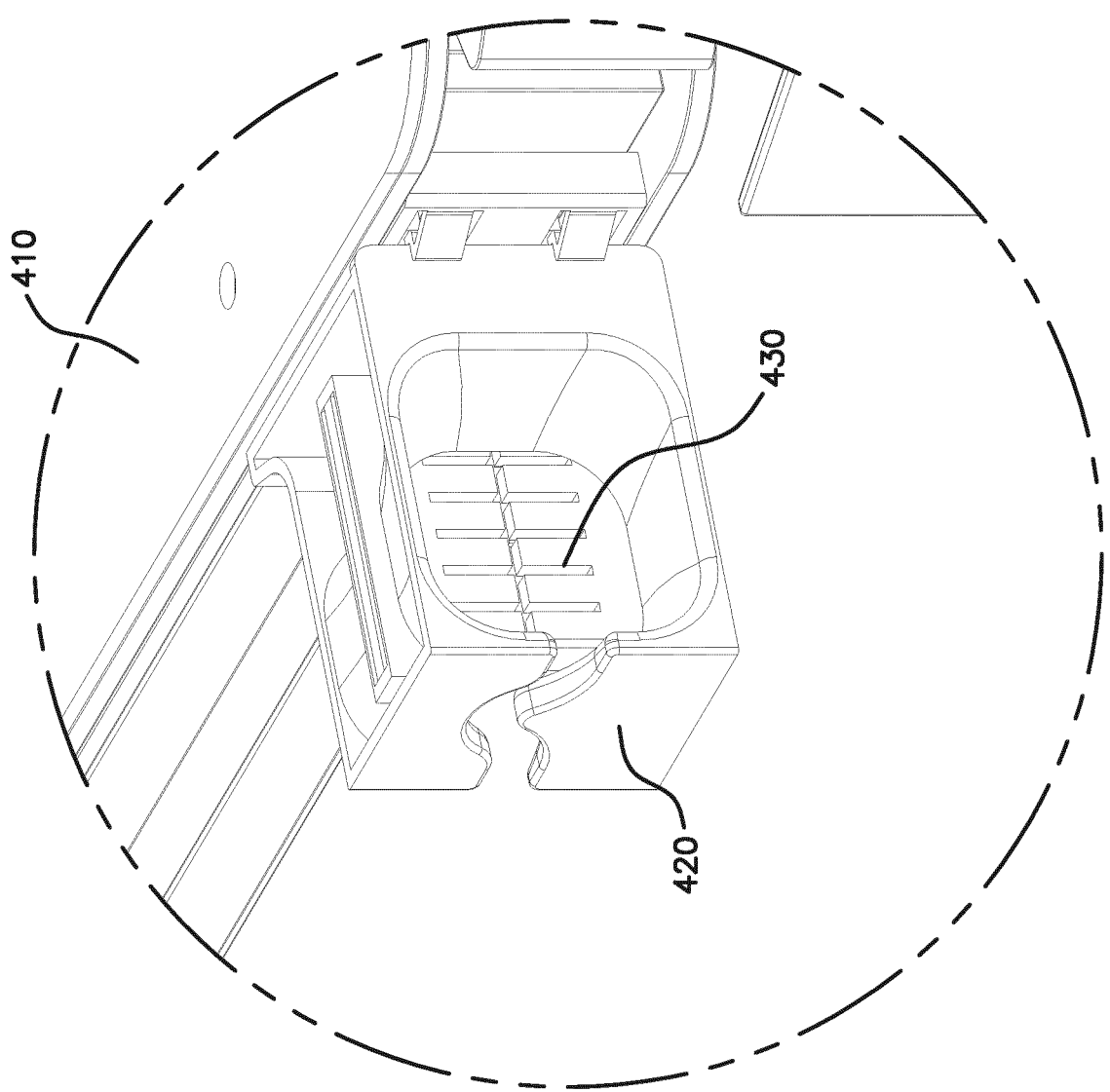

Referring now to FIGS. 46 and 47, an alternative radius limiter 420 is shown on alternative element 410. Radius limiter 420 includes friction members 430 which limit the amount of sliding movement of cables passing through radius limiter 420, to assist with cable management. Friction members 430 include flexible fingers which press lightly on the cables in radius limiter 420 to reduce or eliminate sliding movement of the cables in the radius limiter 420.

Figure 48:
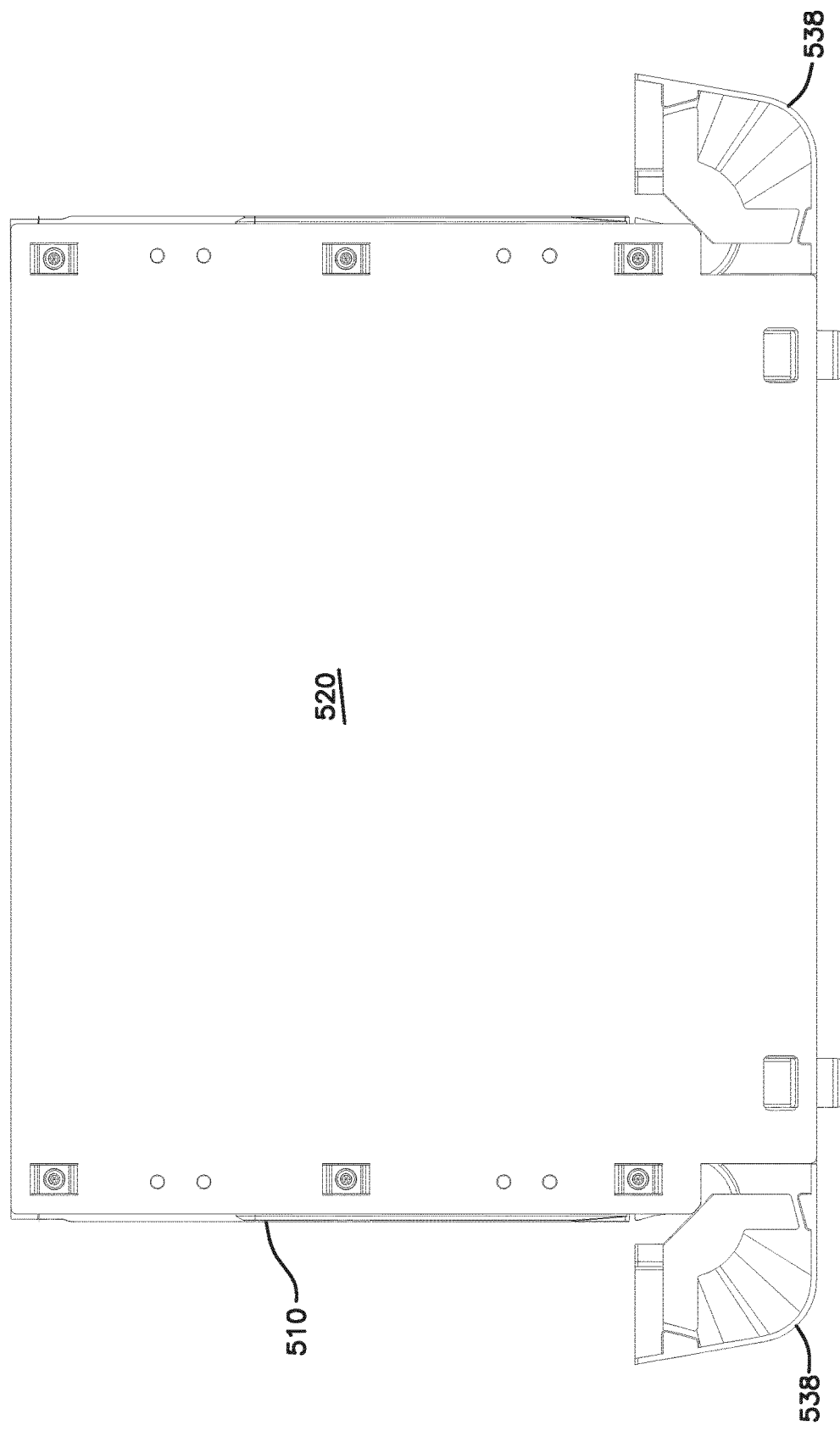
FIGS. 48 and 49 show an element with alternative radius limiters on the slide mechanism.
Figure 49:
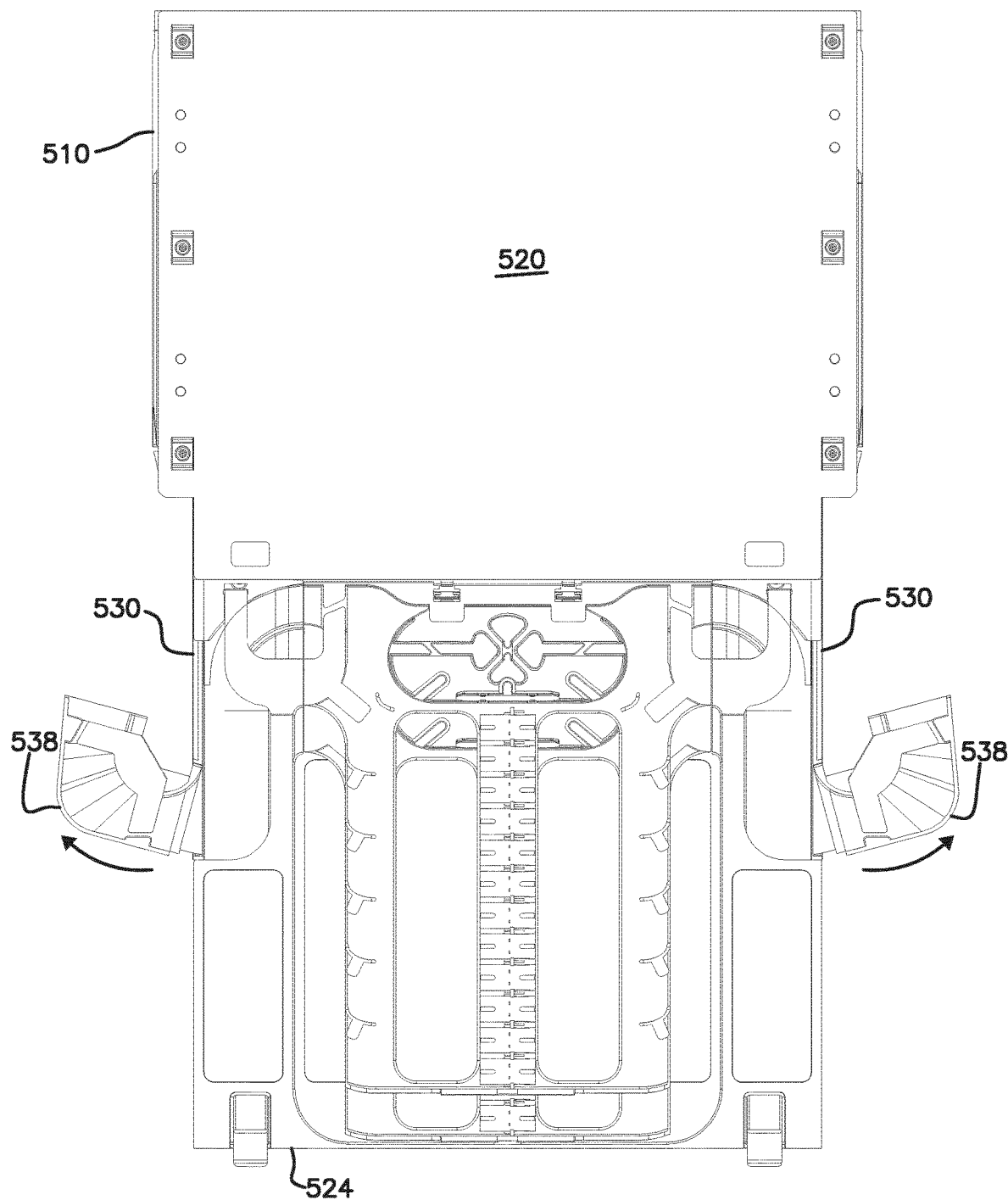

Referring now to FIGS. 48 and 49, an alternative element 510 is shown with a slide mechanism 530 which allows for synchronized movement of radius limiters 538 for cable management. Radius limiters 538 are also provided with a pivot feature to allow them to pivot rearwardly as the tray 524 is pulled out from chassis 520. Such rearward movement (pivot) allows for reduced pull on the cables, if pull is present, to allow the tray to be fully pulled out. Any angle can be provided. Fifteen degrees is one example angle.

Figure 50:
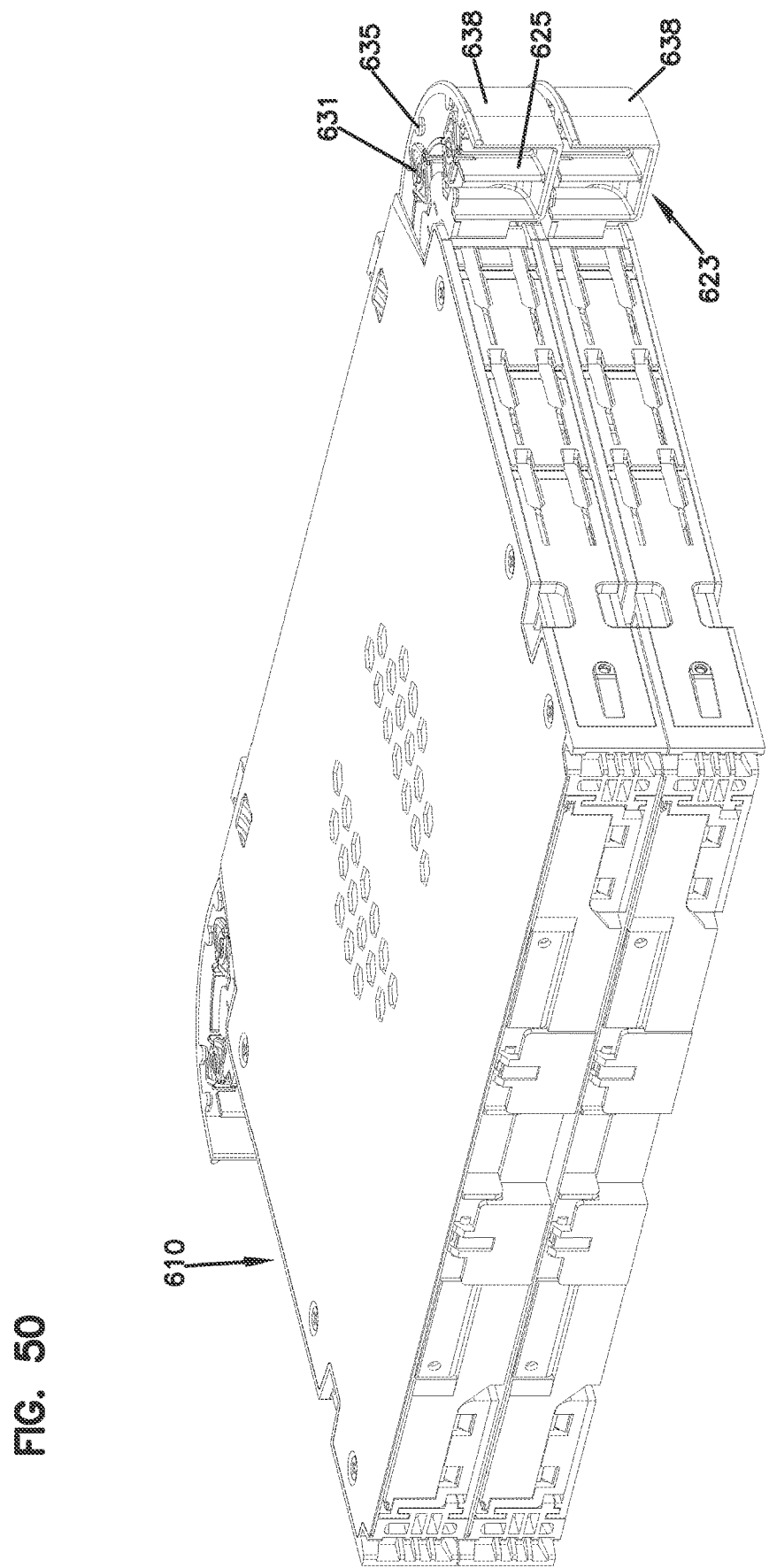
FIG. 50 shows a pair of elements in a stacked configuration, the elements shown with another alternative radius limiter on the slide mechanism.
Figure 51:
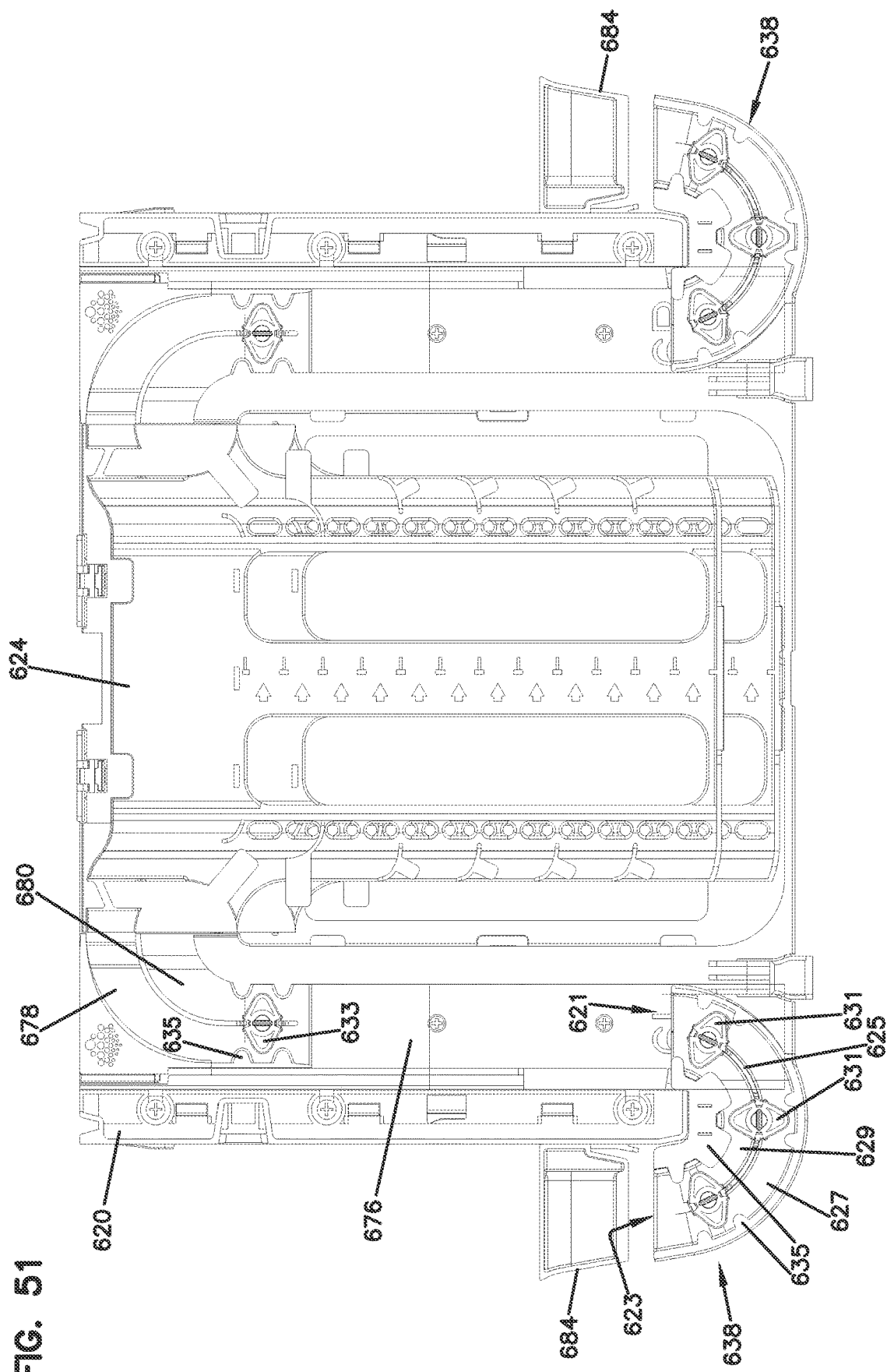
FIG. 51 is a top view of one of the elements of FIG. 50 illustrating the alternative radius limiter.

Referring now to FIGS. 50 and 51, an alternative radius limiter 638 is shown on the slide mechanisms of alternative elements 610. Elements 610 are generally similar in construction and function to those of the elements discussed previously. Radius limiter 638 defines a generally U-shaped configuration that leads cables from and to the element 610 while preserving minimum bend radius requirements.

The U-shaped radius limiter 638 defines an inner end 621 and an outer end 623 and a divider 625 extending from adjacent the inner end 621 to adjacent the outer end 623. According to one embodiment, the divider 625 does not extend all the way to the inner and outer ends 621, 623 of the U-shaped radius limiter 638. The outer end 623 of the radius limiter 638 cooperates with a cable guide 684 that is mounted to the chassis 620 of the element 610 for leading cables to and from the tray 624 of the element 610.

The divider 625 of the radius limiter 638 forms two separate troughs 627, 629 for the radius limiter 638. The two troughs 627, 629 isolate and separate the cables (e.g., coming in and going out) of the element 610 into two distinct paths. According to one example cable routing configuration, the two troughs 627, 629 may guide the cables to the upper and lower levels 678, 680 defined toward the rear of the tray 624 while maintaining the S-shaped pathway 676 created within the element 610. The divider 625 of the radius limiter 638 includes a plurality of cable management tabs 631 mounted thereon for retaining the cables within the troughs 627, 629. A similar tab 633 is also found at the rear of the tray 624 for retaining the cables that are being lead to the upper and lower levels 678, 680. The tabs 631 and 633 may be removable, snap-on structures.

The tabs 631 and 633 cooperate with additional cable management fingers 635 defined both on the radius limiter 638 and toward the rear of the tray 624 in retaining the cables within the S-shaped pathway 676.

PARTS LIST 10 element
12 block
20 chassis
24 tray
30 slide mechanism
32 gears
34 rack
36 entry points
38 radius limiters
50 mounting structure
52 adapters
56 T-shaped frame member
58 hinge
62 top frame member
64 bottom frame member
70 adapter blocks
72 connectors
74 cables
76 pathway
78 upper level
80 lower level
84 portion
86 flanges
90 radius limiters
96 openings
100 cable mount
102 cable wrap
106 radius limiters
210 element
220 chassis
224 tray
230 slide mechanism
238 radius limiters
256 frame members
258 hinges
260 middle portion
262 openings
264 side portions
266 cover
268 latches
270 radius limiters
276 pathway
278 upper level
280 lower level
284 radius limiters
286 cable mounts
288 dovetail
290 opening
292 block
294 bar
296 fasteners
310 element
330 slide mechanism
332 wheels
334 wire
336 wire
340 first part
342 second part
344 third part
410 element
420 radius limiter
430 friction members
510 element
520 chassis
524 tray
530 slide mechanism
538 radius limiters
610 element
620 chassis
621 inner end of radius limiter
623 outer end of radius limiter
624 tray
625 divider 627 trough
629 trough
631 cable management tab
633 cable management tab
635 cable management finger
638 radius limiter
676 pathway
678 upper level
680 lower level
684 cable guide

What is claimed is:

1. An optical fiber distribution rack comprising:
a plurality of optical fiber distribution elements mounted in a stacked arrangement along a column to the optical fiber distribution rack, each optical fiber distribution element comprising:
a chassis defining an interior;
a tray movable along a front-to-back direction relative to the chassis, wherein the tray is slidably movable from within the chassis to a position at least partially outside the chassis, the tray defining a bottom wall; and
a slide mechanism, which connects the movable tray to the chassis, wherein the slide mechanism includes a radius limiter which moves with synchronized movement relative to the chassis and the tray during slidable movement of the tray, wherein the entire radius limiter moves linearly along the front-to-back direction relative to both the chassis and the tray during slidable movement of the tray; —
wherein the tray further includes an array of adapters that are stacked within the tray front to back along a line which is generally parallel to the direction of travel of the movable tray; —
wherein a cable entering or exiting the movable tray follows an S-shaped pathway as the cable extends from an exterior of the movable tray toward the movable radius limiter in a first direction, winds around the movable radius limiter in a second direction generally opposite the first direction, and is routed back within the tray in a third direction generally opposite the second direction, wherein the first, second, and third directions are generally parallel to a direction taken along the front-to-back direction;
wherein the tray further includes at least one fixed radius limiter that is molded integrally with the bottom wall of the tray, wherein the at least one fixed radius limiter defines a curved surface for guiding the cable entering or exiting the movable tray between the array of adapters and movable radius limiter of the slide mechanism.

2. The optical fiber distribution rack of claim 1, wherein the tray of each optical fiber distribution element includes at least one hingedly mounted frame member which hinges about an axis perpendicular to the direction of movement of the movable tray, wherein the array of adapters is provided on the at least one hingedly mounted frame member.

3. The optical fiber distribution rack of claim 2, wherein the tray of each optical fiber distribution element includes two frame members hingedly mounted for independent movement and the S-shaped pathway includes an upper portion and a lower portion for leading to and from the two frame members.

4. The optical fiber distribution rack of claim 1, wherein at least one of the optical fiber distribution elements further comprises a cable mount along a side of the chassis.

5. The optical fiber distribution rack of claim 1, wherein at least one of the optical fiber distribution elements further comprises another non-movable cable radius limiter along a side of the chassis.

6. The optical fiber distribution rack of claim 3, wherein the movable radius limiter of the slide mechanism of each optical fiber distribution element defines a divider for separating and guiding cables to and/or from the upper portion and the lower portion of the S-shaped pathway.

7. The optical fiber distribution rack of claim 1, wherein the tray of each optical fiber distribution element includes a plurality of fixed radius limiters that are molded integrally with the bottom wall of the tray, wherein each fixed radius limiter defines a curved surface for guiding a cable entering or exiting the movable tray between the array of adapters and the movable radius limiter of the slide mechanism.

8. The optical fiber distribution rack of claim 1, wherein the at least one fixed radius limiter of the tray of each optical fiber distribution element includes laterally extending flanges for retaining cabling against the curved surface of the at least one fixed radius limiter.

9. The optical fiber distribution rack of claim 7, wherein each of the plurality of fixed radius limiters of the tray of each optical fiber distribution element includes laterally extending flanges for retaining cabling against the curved surfaces of the fixed radius limiters.

10. The optical fiber distribution rack of claim 1, wherein the tray of each optical fiber distribution element defines a pull handle at a front of the tray that is molded integrally with the tray for providing a grip surface to allow the tray to be slidably moved.

11. The optical fiber distribution rack of claim 10, wherein the tray of each optical fiber distribution element defines a pair of pull handles that are molded integrally with the tray for providing grip surfaces, wherein the pull handles are provided at a front of the tray on right and left sides.

12. The optical fiber distribution rack of claim 1, wherein the array of adapters that is stacked within the tray of each optical fiber distribution element defines at least twelve adapters.

13. An optical fiber distribution rack comprising:
a plurality of optical fiber distribution elements mounted in a stacked arrangement along a column to the optical fiber distribution rack, each optical fiber distribution element comprising:
a chassis;
a tray slidably movable with respect to the chassis along a direction of movement, the tray defining a front end and a rear end; and
a slide mechanism, which connects the movable tray to the chassis, wherein the slide mechanism includes a radius limiter which moves with synchronized movement relative to the chassis and the tray during slidable movement of the tray;
wherein the tray includes at least one frame member that defines a front end and a rear end, the frame member including a frame member hinge at the rear end of the frame member that is coupled to a tray hinge positioned at the rear end of the tray, wherein the frame member hinge and the tray hinge are configured to, and cooperate to, allow the at least one frame member to pivot with respect to the tray about an axis perpendicular to the direction of movement of the movable tray such that the at least one frame member can be pivotally lifted and a bottom of the at least one frame member can be accessed from the front end of the tray;

wherein a cable entering or exiting the movable tray is routed around the radius limiter.

14. The optical fiber distribution rack of claim 13, wherein the tray of each optical fiber distribution element includes two frame members hingedly mounted for independent movement.

15. The optical fiber distribution rack of claim 13, wherein at least one of the optical fiber distribution elements further comprises a cable mount along a side of the chassis.

16. The optical fiber distribution rack of claim 13, wherein at least one of the optical fiber distribution elements further comprises another non-movable cable radius limiter along a side of the chassis.

17. The optical fiber distribution rack of claim 13, wherein the radius limiter of the slide mechanism of at least one of the optical fiber distribution elements includes a rotatable portion that is configured to rotate rearwardly for cable management.

18. The optical fiber distribution rack of claim 13, wherein each frame member of the tray of each of the optical fiber distribution elements defines an array of adapters, each adapter defining ports for receiving connectors to be interconnected through the adapter.

19. The optical fiber distribution rack of claim 18, wherein each array of adapters defines a line which is generally parallel to the direction of movement of the movable tray.

20. The optical fiber distribution rack of claim 13, wherein the movable radius limiter defines a U-shaped configuration.

21. The optical fiber distribution rack of claim 13, wherein the cable entering or exiting the movable tray of each of the optical fiber distribution elements follows an S-shaped pathway as the cable extends from an exterior of the movable tray toward the movable radius limiter in a first direction, winds around the radius limiter in a second direction generally opposite the first direction, and is routed back within the at least one hingedly mounted frame member in a third direction generally opposite the second direction.

22. The optical fiber distribution rack of claim 21, wherein the S-shaped pathway includes an upper portion and a lower portion.

23. The optical fiber distribution rack of claim 22, wherein the radius limiter of the slide mechanism defines a divider for separating and guiding cables to and/or from the upper portion and the lower portion of the S-shaped pathway.

* * * * *

UNITED STATES PATENT AND TRADEMARK OFFICE
CERTIFICATE OF CORRECTION

| | | |
|---|---|---|
| PATENT NO. | : 11,614,594 B2 | Page 1 of 1 |
| APPLICATION NO. | : 17/709698 | |
| DATED | : March 28, 2023 | |
| INVENTOR(S) | : Johan Geens et al. | |

It is certified that error appears in the above-identified patent and that said Letters Patent is hereby corrected as shown below:

In the Claims

Column 7, Claim 1, Line 31: "of the "tray; —" should read --of the tray;--

Column 7, Claim 1, Line 35: "movable tray; —" should read --movable tray;--

Signed and Sealed this
Seventeenth Day of October, 2023

*Katherine Kelly Vidal*

Katherine Kelly Vidal
*Director of the United States Patent and Trademark Office*